United States Patent
Dharmapurikar et al.

(10) Patent No.: US 11,957,974 B2
(45) Date of Patent: Apr. 16, 2024

(54) SYSTEM ARCHITECTURE FOR CLOUD GAMING

(71) Applicant: Intel Corporation, Santa Clara, CA (US)

(72) Inventors: Makarand Dharmapurikar, Saratoga, CA (US); Rajabali Koduri, Saratoga, CA (US); Vijay Bahirji, Hillsboro, OR (US); Toby Opferman, Beaverton, OR (US); Scott G. Christian, Aberdeen, WA (US); Rajeev Penmatsa, Folsom, CA (US); Selvakumar Panneer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 256 days.

(21) Appl. No.: 17/168,299

(22) Filed: Feb. 5, 2021

(65) Prior Publication Data

US 2021/0245046 A1 Aug. 12, 2021

Related U.S. Application Data

(60) Provisional application No. 63/064,141, filed on Aug. 11, 2020, provisional application No. 62/972,180, (Continued)

(51) Int. Cl.
*A63F 13/355* (2014.01)

(52) U.S. Cl.
CPC ................. *A63F 13/355* (2014.09)

(58) Field of Classification Search
CPC .... H04N 19/46; H04N 19/70; H04N 21/8547; H04N 19/30; H04N 19/40; H04N 21/234381; H04N 21/2358; H04N 21/25825; H04N 21/4781; H04N 21/6582; H04N 21/8146; H04N 21/8455;
(Continued)

(56) References Cited

U.S. PATENT DOCUMENTS

| 5,619,256 A | 4/1997 | Haskell et al. |
| 5,768,122 A | 6/1998 | Motoc |

(Continued)

FOREIGN PATENT DOCUMENTS

| EP | 3862060 A1 | 8/2021 |
| EP | 3862061 A2 | 8/2021 |

OTHER PUBLICATIONS

Office Action for U.S. Appl. No. 17/168,388, dated Jul. 3, 2023, 6 pages.
(Continued)

*Primary Examiner* — William H McCulloch, Jr.
*Assistant Examiner* — Ankit B Doshi
(74) *Attorney, Agent, or Firm* — Jaffery Watson Mendonsa & Hamilton LLP

(57) ABSTRACT

Described herein is a cloud-based gaming system in which graphics processing operations of a cloud-based game can be performed on a client device. Client-based graphics processing can be enabled in response to a determination that the client includes a graphics processor having a performance that exceeds a minimum threshold. When a game is remotely executed and streamed to a client, the client is configurable to provide network feedback that can be used to adjust execution and/or encoding for the game.

20 Claims, 36 Drawing Sheets

Related U.S. Application Data filed on Feb. 10, 2020, provisional application No. 62/972,197, filed on Feb. 10, 2020.

(58) Field of Classification Search
CPC .......... H04N 21/8456; H04N 21/85406; A63F 13/355; G06F 16/71; H04W 72/1268; H04W 72/23; H04W 72/54; H04L 12/2861; H04L 41/0659; H04L 41/0806; H04L 41/0894; H04L 41/0895; H04L 41/122; H04L 41/142; H04L 41/342; H04L 41/40; H04L 41/5054; H04L 43/026; H04L 43/20; H04L 45/24; H04L 45/308; H04L 45/38; H04L 45/42; H04L 45/64

See application file for complete search history.

(56) References Cited

U.S. PATENT DOCUMENTS

| | | | |
|---|---|---|---|
| 5,781,194 | A | 7/1998 | Ponomarev et al. |
| 5,966,672 | A | 10/1999 | Knupp |
| 6,476,803 | B1 | 11/2002 | Zhang et al. |
| 6,785,640 | B1 | 8/2004 | Lu et al. |
| 7,003,136 | B1 | 2/2006 | Harville |
| 7,831,087 | B2 | 11/2010 | Harville |
| 8,106,924 | B2 | 1/2012 | Aliprandi et al. |
| 8,619,082 | B1 | 12/2013 | Ciurea et al. |
| 9,164,874 | B1 | 10/2015 | Tomay et al. |
| 9,483,868 | B1 | 11/2016 | Tang |
| 9,819,879 | B2 | 11/2017 | Kim et al. |
| 9,852,351 | B2 | 12/2017 | Perez et al. |
| 10,762,394 | B2 | 9/2020 | Distler et al. |
| 10,783,698 | B2 | 9/2020 | Mishaev et al. |
| 11,151,424 | B2 | 10/2021 | Distler et al. |
| 2003/0218606 | A1 | 11/2003 | Zhirkov et al. |
| 2004/0027259 | A1 | 2/2004 | Soliman et al. |
| 2007/0103464 | A1 | 5/2007 | Kaufman et al. |
| 2007/0206008 | A1 | 9/2007 | Kaufman et al. |
| 2008/0152191 | A1 | 6/2008 | Fujimura et al. |
| 2009/0027391 | A1 | 1/2009 | Burley et al. |
| 2009/0135191 | A1 | 5/2009 | Azar et al. |
| 2009/0262206 | A1 | 10/2009 | Park |
| 2010/0034457 | A1 | 2/2010 | Berliner et al. |
| 2010/0195716 | A1 | 8/2010 | Gunnewiek et al. |
| 2010/0231689 | A1 | 9/2010 | Bruls et al. |
| 2010/0296750 | A1 | 11/2010 | Castelnuovo |
| 2011/0202538 | A1 | 8/2011 | Salemann |
| 2012/0004042 | A1 | 1/2012 | Perry et al. |
| 2012/0042209 | A1 | 2/2012 | Brock et al. |
| 2012/0044476 | A1 | 2/2012 | Earhart et al. |
| 2012/0242796 | A1 | 9/2012 | Ciurea et al. |
| 2012/0275702 | A1 | 11/2012 | Tuzel et al. |
| 2013/0089259 | A1 | 4/2013 | Cha et al. |
| 2013/0127837 | A1 | 5/2013 | Hyodo et al. |
| 2014/0267243 | A1 | 9/2014 | Venkataraman et al. |
| 2014/0300775 | A1 | 10/2014 | Fan et al. |
| 2014/0334541 | A1 | 11/2014 | Nakanishi et al. |
| 2015/0016712 | A1 | 1/2015 | Rhoads et al. |
| 2015/0070355 | A1 | 3/2015 | Clarberg et al. |
| 2015/0145966 | A1 | 5/2015 | Krieger et al. |
| 2015/0154232 | A1 | 6/2015 | Ovsjanikov et al. |
| 2015/0154467 | A1 | 6/2015 | Feng et al. |
| 2015/0156473 | A1 | 6/2015 | Bennett et al. |
| 2015/0201207 | A1* | 7/2015 | Yie ...................... H04N 21/631 375/240.26 |
| 2015/0264404 | A1 | 9/2015 | Hannuksela |
| 2015/0341663 | A1 | 11/2015 | Zhang et al. |
| 2015/0371110 | A1 | 12/2015 | Hwang et al. |
| 2016/0005234 | A1 | 1/2016 | Boivin et al. |
| 2016/0035124 | A1 | 2/2016 | Sinha et al. |
| 2016/0071325 | A1 | 3/2016 | Callaghan |
| 2016/0104294 | A1 | 4/2016 | Gandolph et al. |
| 2016/0109284 | A1 | 4/2016 | Hammershøi et al. |
| 2016/0110910 | A1 | 4/2016 | Obert et al. |
| 2016/0154999 | A1 | 6/2016 | Fan et al. |
| 2016/0232703 | A1 | 8/2016 | Duan et al. |
| 2016/0266256 | A1 | 9/2016 | Allen et al. |
| 2016/0299661 | A1 | 10/2016 | Alpert et al. |
| 2017/0109611 | A1 | 4/2017 | Luo |
| 2017/0150150 | A1 | 5/2017 | Thirumalai et al. |
| 2017/0177954 | A1 | 6/2017 | Micks et al. |
| 2017/0184721 | A1 | 6/2017 | Sun et al. |
| 2017/0244956 | A1 | 8/2017 | Stiglic et al. |
| 2017/0310945 | A1 | 10/2017 | Juang et al. |
| 2017/0331666 | A1* | 11/2017 | Walker .................. H04L 65/611 |
| 2017/0339391 | A1 | 11/2017 | Zhou et al. |
| 2017/0339392 | A1 | 11/2017 | Forutanpour et al. |
| 2017/0347120 | A1 | 11/2017 | Chou et al. |
| 2017/0347122 | A1 | 11/2017 | Chou et al. |
| 2017/0374379 | A1 | 12/2017 | Chen et al. |
| 2018/0007307 | A1* | 1/2018 | Walker ............... H04N 21/4363 |
| 2018/0035134 | A1 | 2/2018 | Pang et al. |
| 2018/0075320 | A1 | 3/2018 | Zermas et al. |
| 2018/0075635 | A1 | 3/2018 | Choi et al. |
| 2018/0108151 | A1 | 4/2018 | Hemmer et al. |
| 2018/0117897 | A1 | 5/2018 | Zeng et al. |
| 2018/0124419 | A1 | 5/2018 | He |
| 2018/0144458 | A1 | 5/2018 | Xu et al. |
| 2018/0150994 | A1 | 5/2018 | Foutzitzis et al. |
| 2018/0184000 | A1 | 6/2018 | Lee et al. |
| 2018/0189647 | A1 | 7/2018 | Calvo et al. |
| 2018/0225515 | A1 | 8/2018 | Jiang et al. |
| 2018/0232583 | A1 | 8/2018 | Wang et al. |
| 2018/0268570 | A1 | 9/2018 | Budagavi et al. |
| 2018/0300937 | A1 | 10/2018 | Chien et al. |
| 2018/0352207 | A1 | 12/2018 | Kern et al. |
| 2018/0373326 | A1 | 12/2018 | Gatson et al. |
| 2019/0007679 | A1 | 1/2019 | Coban et al. |
| 2019/0104324 | A1 | 4/2019 | Han et al. |
| 2019/0156520 | A1 | 5/2019 | Mammou et al. |
| 2019/0159868 | A1 | 5/2019 | Chen et al. |
| 2019/0197739 | A1 | 6/2019 | Sinharoy et al. |
| 2019/0206059 | A1 | 7/2019 | Landman |
| 2019/0251673 | A1 | 8/2019 | Kim et al. |
| 2019/0313199 | A1 | 10/2019 | Laaksonen et al. |
| 2019/0321727 | A1 | 10/2019 | Rodgers et al. |
| 2019/0325614 | A1 | 10/2019 | Krishnaprasad et al. |
| 2019/0373326 | A1 | 12/2019 | Han et al. |
| 2020/0021847 | A1 | 1/2020 | Kim et al. |
| 2020/0042834 | A1 | 2/2020 | Distler et al. |
| 2020/0043121 | A1 | 2/2020 | Boyce et al. |
| 2020/0043122 | A1 | 2/2020 | Xiao et al. |
| 2020/0043182 | A1 | 2/2020 | Janus et al. |
| 2020/0043190 | A1 | 2/2020 | Tanner et al. |
| 2020/0043217 | A1 | 2/2020 | Cilingir et al. |
| 2020/0043220 | A1 | 2/2020 | Mishaev et al. |
| 2020/0043221 | A1 | 2/2020 | Kaufman et al. |
| 2020/0045289 | A1 | 2/2020 | Raziel et al. |
| 2020/0045290 | A1 | 2/2020 | Ruhm et al. |
| 2020/0045343 | A1 | 2/2020 | Boyce et al. |
| 2020/0045348 | A1 | 2/2020 | Boyce et al. |
| 2020/0059668 | A1 | 2/2020 | Ikonin |
| 2020/0134857 | A1 | 4/2020 | Khatoonabadi et al. |
| 2020/0169716 | A1 | 5/2020 | Horvitz et al. |
| 2020/0267753 | A1* | 8/2020 | Adjakple ............... H04W 72/54 |
| 2020/0364514 | A1 | 11/2020 | Distler et al. |
| 2020/0389469 | A1* | 12/2020 | Litichever ............... H04W 4/40 |
| 2021/0083967 | A1* | 3/2021 | Joshi ....................... H04L 43/20 |
| 2021/0250617 | A1* | 8/2021 | Hannuksela ....... H04N 21/8455 |
| 2021/0339130 | A1* | 11/2021 | Sameer Kalathil ......................... H04N 21/6582 |
| 2022/0040573 | A1* | 2/2022 | Fear ...................... A63F 13/358 |
| 2022/0101067 | A1 | 3/2022 | Distler et al. |

OTHER PUBLICATIONS

Notice of Allowance for U.S. Appl. No. 17/333,772, dated Jun. 22, 2023, 7 pages.
Notification of CN Publication for Application No. 202110177337. X, Pub No. 113256476, 79 pages, Aug. 20, 2021.
Notification of CN Publication for Application No. 202110184672. 2, Pub No. 113253979, 4 pages, Aug. 20, 2021.

(56) References Cited

OTHER PUBLICATIONS

Extended European Search Report for Application No. 21156160.0, 11 pages, Sep. 22, 2021.
Extended European Search Report for Application No. 21156239.2, 9 pages, Jun. 30, 2021.
Anonymous: "Cloud gaming—Wikipedia, the free encyclopedia", Aug. 16, 2015, XP055308747, 8 pages.
Xiaoming et al., "Delay-rate-distortion optimization for cloud-based collaborative rendering", 2016 IEEE 18th Int'l. Workshop on Multimedia Signal Processing, Sep. 21, 2016, 6 pages.

* cited by examiner

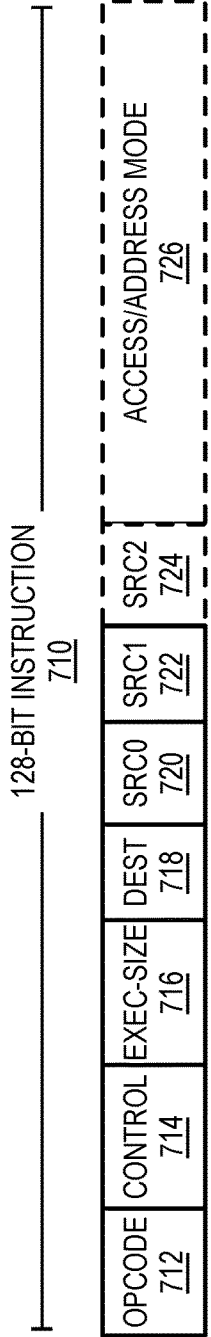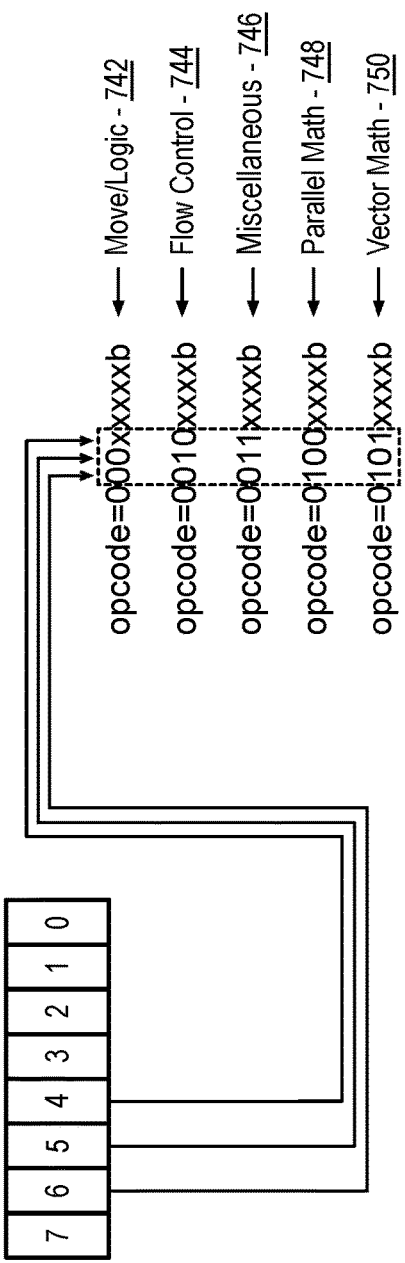
FIG. 7

FIG. 9A  GRAPHICS PROCESSOR COMMAND FORMAT 900

FIG. 9B  GRAPHICS PROCESSOR COMMAND SEQUENCE 910

SYSTEM ARCHITECTURE FOR CLOUD GAMING

CROSS-REFERENCE

This application claims priority to U.S. Provisional Application No. 62/972,180 and U.S. Provisional Application No. 62/972,197, each filed Feb. 10, 2020, the entire contents of which are incorporated herein by reference. This application further claims priority to U.S. Provisional Application No. 63/064,141 filed Aug. 11, 2020, which is hereby incorporated herein by reference.

BACKGROUND

Cloud-based gaming systems enable a potentially graphically intensive 3D gaming application to be experienced across a variety of devices, including devices with limited graphics processing capability. Game applications may be executed on one or server devices. Input received at a client device is transmitted to the server device and provided to the executing game application. The response to those inputs is then returned to the client device. The response can be provided in the form of a stream of encoded video frames that are decoded by the client device for display. While current video-streaming based cloud gaming systems enable a game to be experienced on a variety of client devices, client devices with powerful graphics processing capabilities may not be fully utilized.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings.

FIG. 7 is a block diagram illustrating graphics processor instruction formats according to some embodiments;

DESCRIPTION OF EMBODIMENTS

Figure 1:
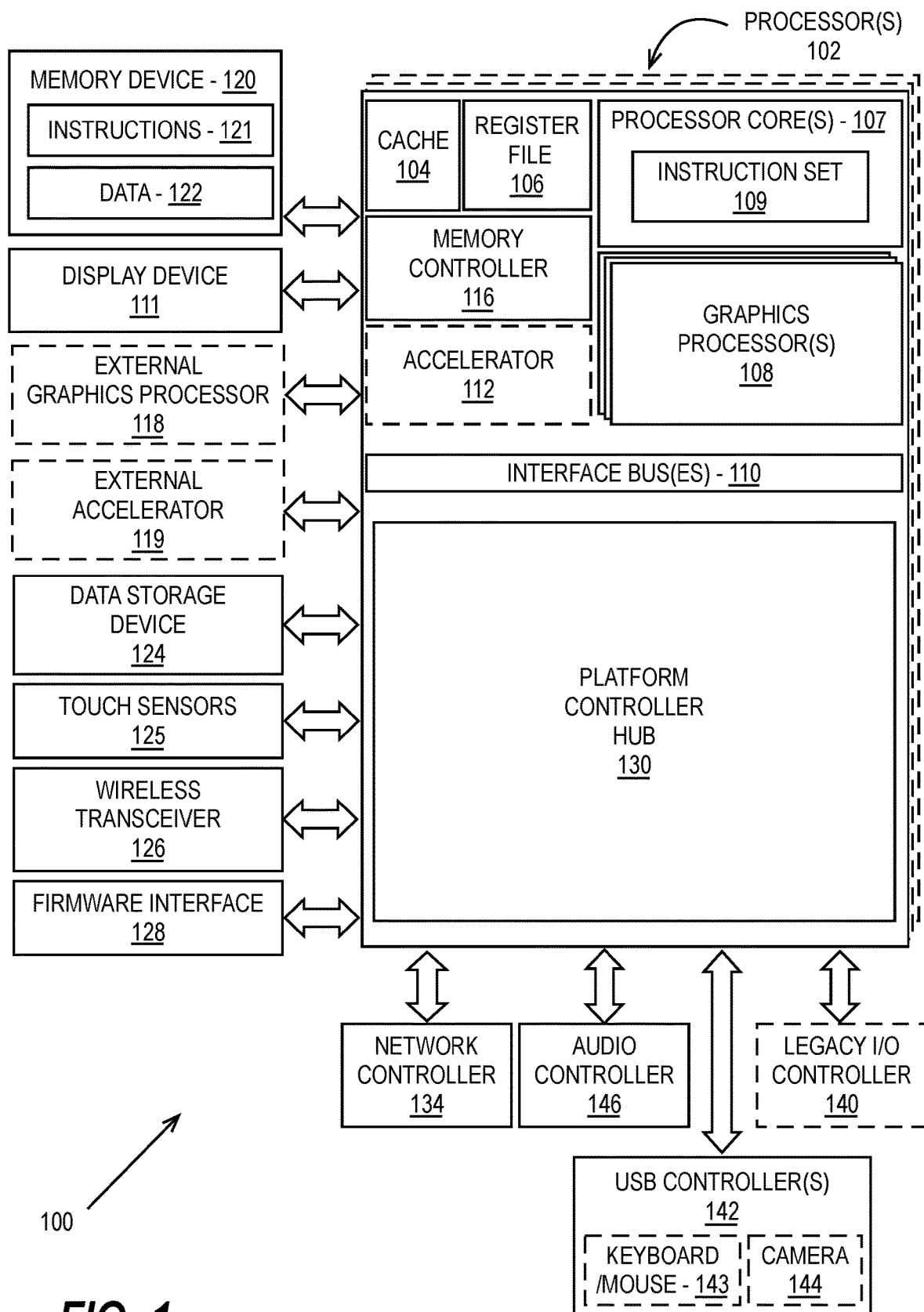
FIG. 1 is a block diagram of a processing system, according to an embodiment.

Described herein is cloud gaming system in which graphics processing operations can be performed using cloud, edge, or client-based compute resources. If a client network environment includes a client having sufficient graphics processing resources to remotely execute a game, the game server stack can be downloaded by the client and the game server can be executed locally on the client. During the download of the game server stack to the client, the game can be executed by a remote server and rendered output can be streamed to the client.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-12 and 13A-13B provide an overview of exemplary data processing system and graphics processor logic that incorporates or relates to the various embodiments. FIGS. 14-23 provide specific details of the various embodiments. Some aspects of the following embodiments are described with reference to a graphics processor, while other aspects are described with respect to a general-purpose processor, such as a central processing unit (CPU). Similar techniques and teachings can be applied to other types of circuits or semiconductor devices, including but not limited to a many integrated core processor, a GPU cluster, or one or more instances of a field programmable gate array (FPGA). In general, the teachings are applicable to any processor or machine that manipulates or processes image (e.g., sample, pixel), vertex data, or geometry data.

System Overview

FIG. 1 is a block diagram of a processing system 100, according to an embodiment. Processing system 100 may be used in a single processor desktop system, a multiprocessor workstation system, or a server system having a large number of processors 102 or processor cores 107. In one embodiment, the processing system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, processing system 100 can include, couple with, or be integrated within: a server-based gaming platform; a game console, including a game and media console; a mobile gaming console, a handheld game console, or an online game console. In some embodiments the processing system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, processing system 100 can include, couple with, or be integrated within a self-driving vehicle such as a bus, tractor trailer, car, motor or electric power cycle, plane or glider (or any combination thereof). The self-driving vehicle may use processing system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the processing system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include an integrated memory controller 116 and a platform controller hub 130. The memory controller 116 facilitates communication between a memory device and other components of the processing system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the processing system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the processing system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the processing system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the processing system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to processing system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIG. 2A-2D illustrate computing systems and graphics processors provided by embodiments described herein. The elements of FIG. 2A-2D having the same reference numbers (or names) as the elements of any other figure herein can operate or function in any manner similar to that described elsewhere herein, but are not limited to such.

Figure 2A:
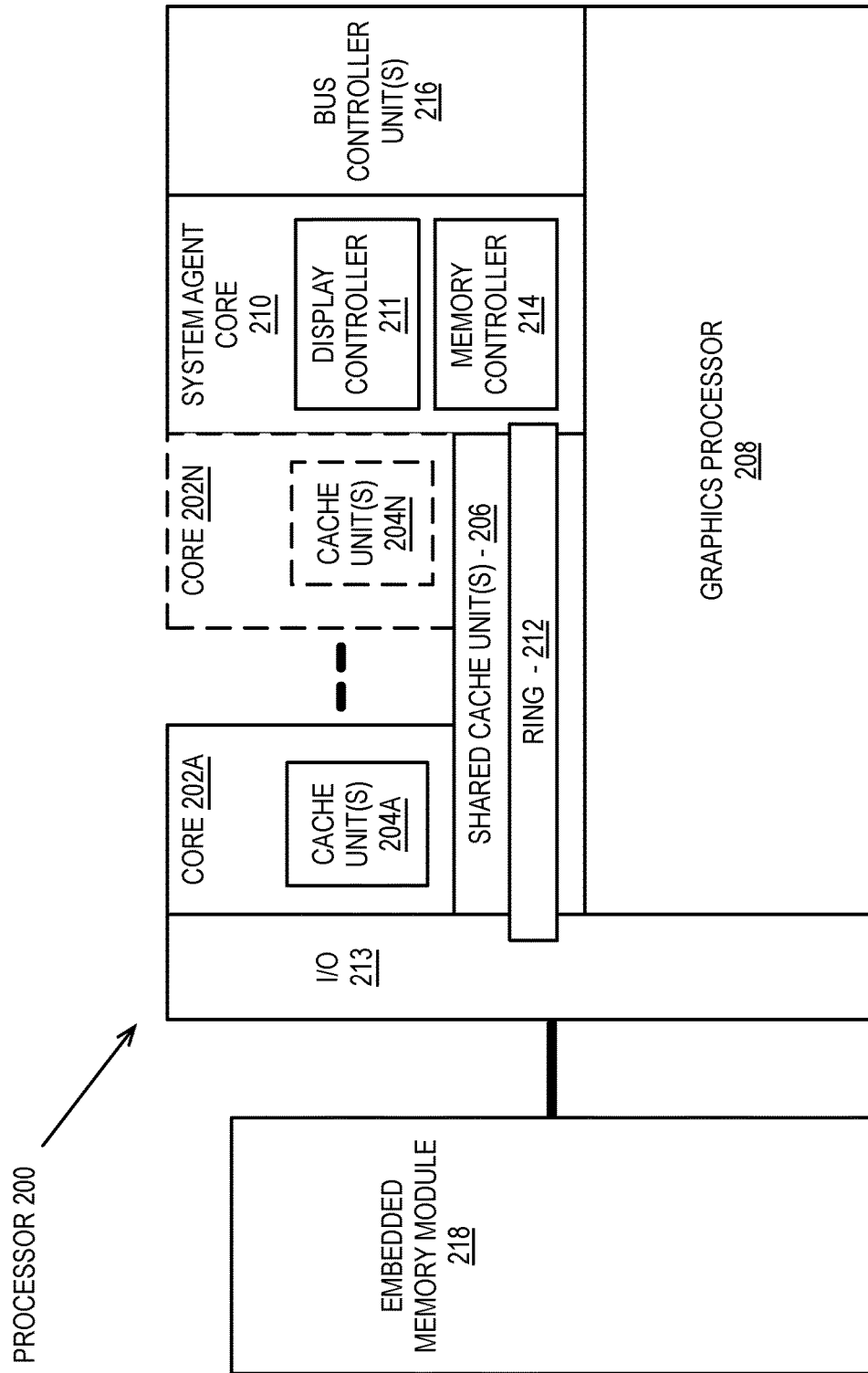
FIG. 2A-2D illustrate computing systems and graphics processors provided by embodiments described herein.

FIG. 2A is a block diagram of an embodiment of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring-based interconnect 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring-based interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 can use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 2B:
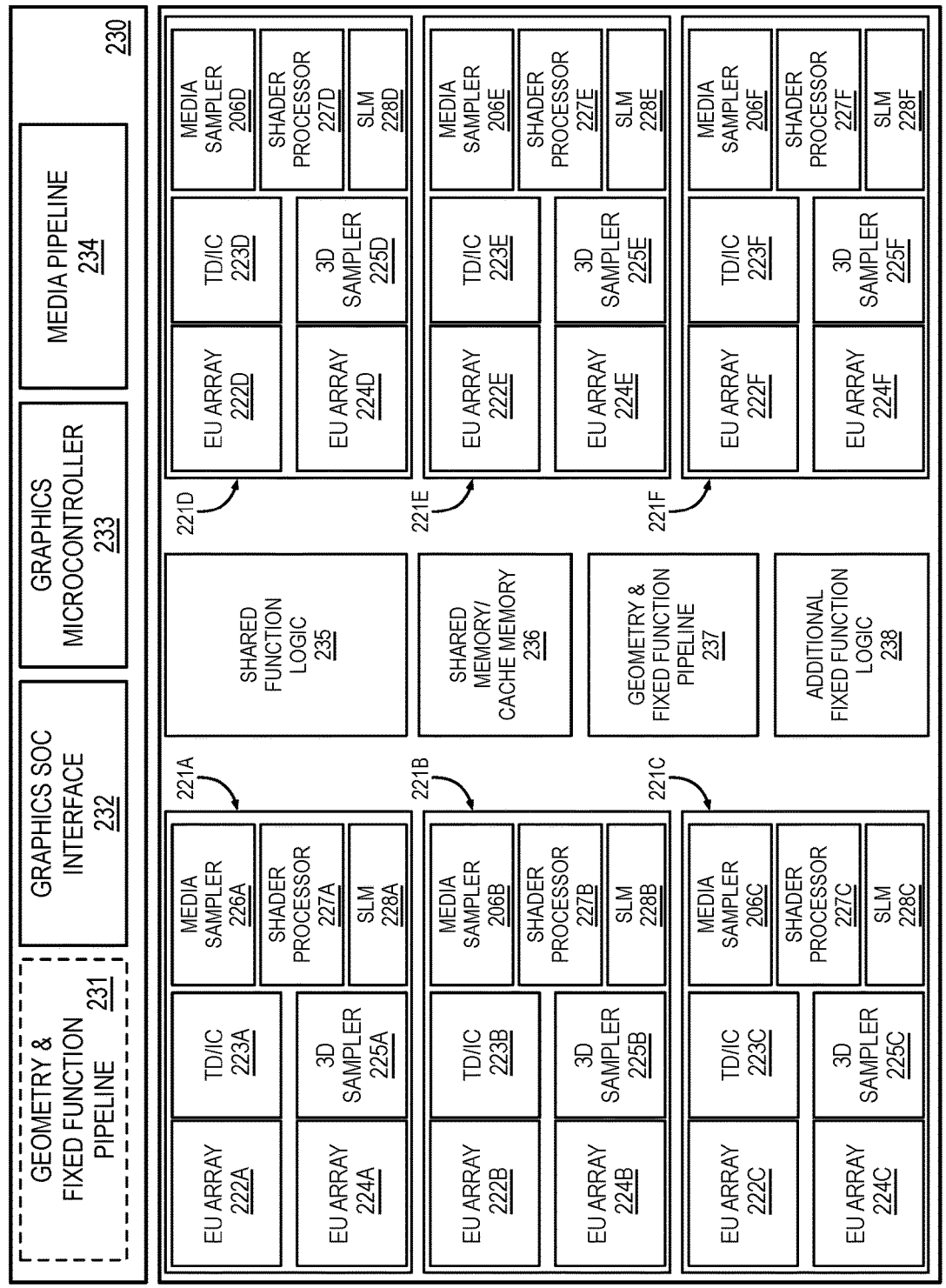

FIG. 2B is a block diagram of hardware logic of a graphics processor core 219, according to some embodiments described herein. Elements of FIG. 2B having the same reference numbers (or names) as the elements of any other figure herein can operate or function in any manner similar to that described elsewhere herein, but are not limited to such. The graphics processor core 219, sometimes referred to as a core slice, can be one or multiple graphics cores within a modular graphics processor. The graphics processor core 219 is exemplary of one graphics core slice, and a graphics processor as described herein may include multiple graphics core slices based on target power and performance envelopes. Each graphics processor core 219 can include a fixed function block 230 coupled with multiple sub-cores 221A-221F, also referred to as sub-slices, that include modular blocks of general-purpose and fixed function logic.

In some embodiments, the fixed function block 230 includes a geometry/fixed function pipeline 231 that can be shared by all sub-cores in the graphics processor core 219, for example, in lower performance and/or lower power graphics processor implementations. In various embodiments, the geometry/fixed function pipeline 231 includes a 3D fixed function pipeline (e.g., 3D pipeline 312 as in FIG. 3A and FIG. 4, described below) a video front-end unit, a thread spawner and thread dispatcher, and a unified return buffer manager, which manages unified return buffers (e.g., unified return buffer 418 in FIG. 4, as described below).

In one embodiment the fixed function block 230 also includes a graphics SoC interface 232, a graphics microcontroller 233, and a media pipeline 234. The graphics SoC interface 232 provides an interface between the graphics processor core 219 and other processor cores within a system on a chip integrated circuit. The graphics microcontroller 233 is a programmable sub-processor that is configurable to manage various functions of the graphics processor core 219, including thread dispatch, scheduling, and preemption. The media pipeline 234 (e.g., media pipeline 316 of FIG. 3A and FIG. 4) includes logic to facilitate the decoding, encoding, pre-processing, and/or post-processing of multimedia data, including image and video data. The media pipeline 234 implement media operations via requests to compute or sampling logic within the sub-cores 221-221F.

In one embodiment the SoC interface 232 enables the graphics processor core 219 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 232 can also enable communication with fixed function devices within the SoC, such as camera imaging pipelines, and enables the use of and/or implements global memory atomics that may be shared between the graphics processor core 219 and CPUs within the SoC. The SoC interface 232 can also implement power management controls for the graphics processor core 219 and enable an interface between a clock domain of the graphics processor core 219 and other clock domains within the SoC. In one embodiment the SoC interface 232 enables receipt of command buffers from a command streamer and global thread dispatcher that are configured to provide commands and instructions to each of one or more graphics cores within a graphics processor. The commands and instructions can be dispatched to the media pipeline 234, when media operations are to be performed, or a geometry and fixed function pipeline (e.g., geometry and fixed function pipeline 231, geometry and fixed function pipeline 237) when graphics processing operations are to be performed.

The graphics microcontroller 233 can be configured to perform various scheduling and management tasks for the graphics processor core 219. In one embodiment the graphics microcontroller 233 can perform graphics and/or compute workload scheduling on the various graphics parallel engines within execution unit (EU) arrays 222A-222F, 224A-224F within the sub-cores 221A-221F. In this scheduling model, host software executing on a CPU core of an SoC including the graphics processor core 219 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 233 can also facilitate low-power or idle states for the graphics processor core 219, providing the graphics processor core 219 with the ability to save and restore registers within the graphics processor core 219 across low-power state transitions independently from the operating system and/or graphics driver software on the system.

The graphics processor core 219 may have greater than or fewer than the illustrated sub-cores 221A-221F, up to N modular sub-cores. For each set of N sub-cores, the graphics processor core 219 can also include shared function logic 235, shared and/or cache memory 236, a geometry/fixed function pipeline 237, as well as additional fixed function logic 238 to accelerate various graphics and compute processing operations. The shared function logic 235 can include logic units associated with the shared function logic 420 of FIG. 4 (e.g., sampler, math, and/or inter-thread communication logic) that can be shared by each N sub-cores within the graphics processor core 219. The shared and/or cache memory 236 can be a last-level cache for the set of N sub-cores 221A-221F within the graphics processor core 219, and can also serve as shared memory that is accessible by multiple sub-cores. The geometry/fixed function pipeline 237 can be included instead of the geometry/fixed function pipeline 231 within the fixed function block 230 and can include the same or similar logic units.

In one embodiment the graphics processor core 219 includes additional fixed function logic 238 that can include various fixed function acceleration logic for use by the graphics processor core 219. In one embodiment the additional fixed function logic 238 includes an additional geometry pipeline for use in position only shading. In position-only shading, two geometry pipelines exist, the full geometry pipeline within the geometry/fixed function pipeline 231 and a cull pipeline, which is an additional geometry pipeline which may be included within the additional fixed function logic 238. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 238 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 238 can also include machine-learning acceleration logic, such as fixed function matrix multiplication logic, for implementations including optimizations for machine learning training or inferencing.

Within each graphics sub-core 221A-221F includes a set of execution resources that may be used to perform graphics, media, and compute operations in response to requests by graphics pipeline, media pipeline, or shader programs. The graphics sub-cores 221A-221F include multiple EU arrays 222A-222F, 224A-224F, thread dispatch and inter-thread communication (TD/IC) logic 223A-223F, a 3D (e.g., texture) sampler 225A-225F, a media sampler 206A-206F, a shader processor 227A-227F, and shared local memory (SLM) 228A-228F. The EU arrays 222A-222F, 224A-224F each include multiple execution units, which are general-purpose graphics processing units capable of performing floating-point and integer/fixed-point logic operations in service of a graphics, media, or compute operation, including graphics, media, or compute shader/GPGPU programs. The TD/IC logic 223A-223F performs local thread dispatch and thread control operations for the execution units within a sub-core and facilitate communication between threads executing on the execution units of the sub-core. The 3D sampler 225A-225F can read texture or other 3D graphics related data into memory. The 3D sampler can read texture data differently based on a configured sample state and the texture format associated with a given texture. The media sampler 206A-206F can perform similar read operations based on the type and format associated with media data. In one embodiment, each graphics sub-core 221A-221F can alternately include a unified 3D and media sampler. Threads executing on the execution units within each of the sub-cores 221A-221F can make use of shared local memory 228A-228F within each sub-core, to enable threads executing within a thread group to execute using a common pool of on-chip memory.

Figure 2C:
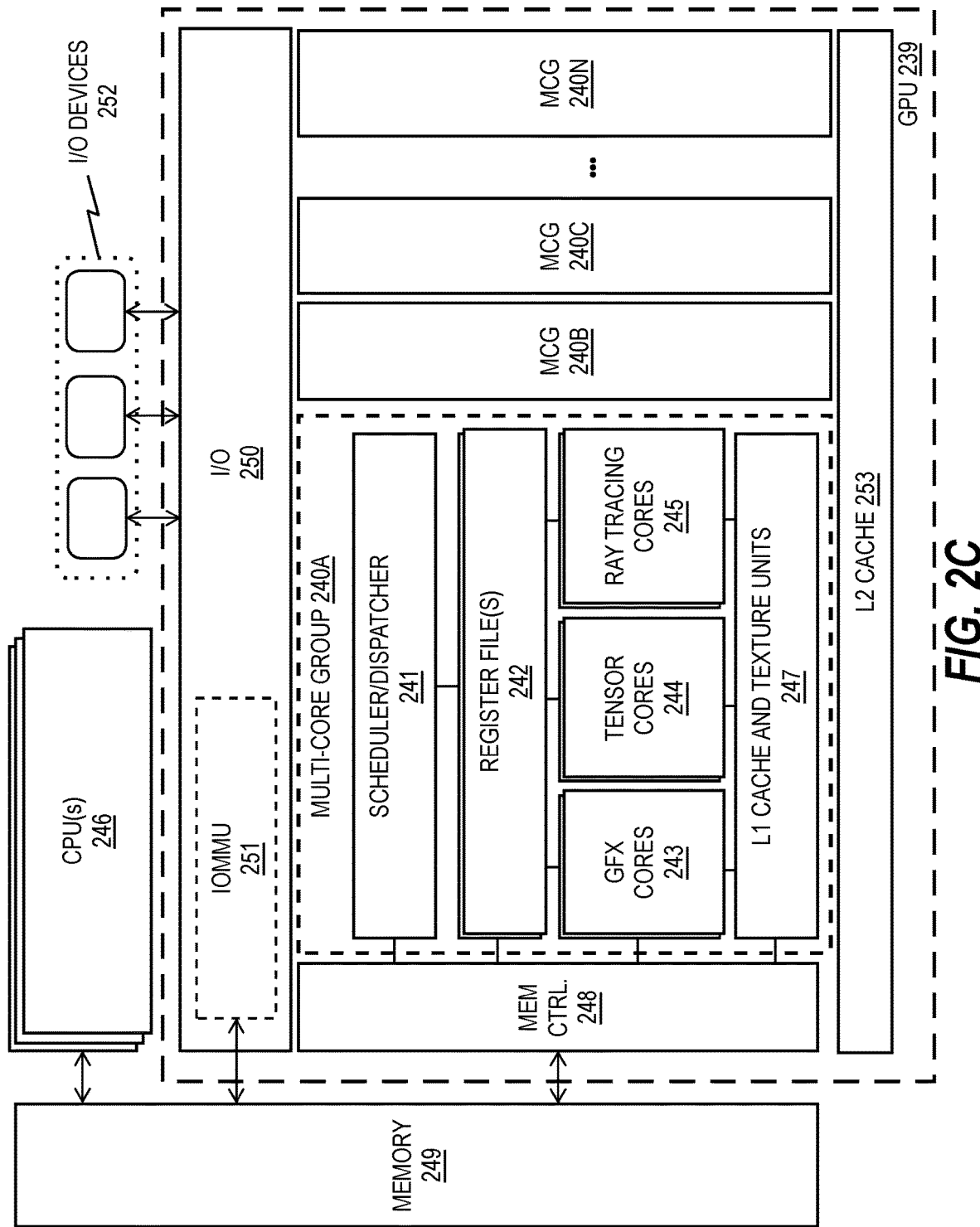

FIG. 2C illustrates a graphics processing unit (GPU) 239 that includes dedicated sets of graphics processing resources arranged into multi-core groups 240A-240N. The details of multi-core group 240A are illustrated. Multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. In one embodiment the tensor cores 244 are sparse tensor cores with hardware to enable multiplication operations having a zero value input to be bypassed.

A set of register files 242 can store operand values used by the cores 243, 244, 245 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the memory 249. In one embodiment, the IOMMU 251 manages multiple sets of page tables to map virtual addresses to physical addresses in memory 249. In this embodiment, the I/O devices 252, CPU(s) 246, and GPU 239 may share the same virtual address space.

In one implementation, the IOMMU 251 supports virtualization. In this case, it may manage a first set of page tables to map guest/graphics virtual addresses to guest/graphics physical addresses and a second set of page tables to map the guest/graphics physical addresses to system/host physical addresses (e.g., within memory 249). The base addresses of each of the first and second sets of page tables may be stored in control registers and swapped out on a context switch (e.g., so that the new context is provided with access to the relevant set of page tables). While not illustrated in FIG. 2C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one embodiment, the CPUs 246, GPU 239, and I/O devices 252 are integrated on a single semiconductor chip and/or chip package. The memory 249 may be integrated on the same chip or may be coupled to the memory controllers 248 via an off-chip interface. In one implementation, the memory 249 comprises GDDR6 memory which shares the same virtual address space as other physical system-level memories, although the underlying principles of the invention are not limited to this specific implementation.

In one embodiment, the tensor cores 244 include a plurality of execution units specifically designed to perform matrix operations, which are the fundamental compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, requires a significant number of matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one embodiment, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one embodiment, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 245 process all BVH traversal and ray-primitive intersections, saving the graphics cores 243 from being overloaded with thousands of instructions per ray. In one embodiment, each ray tracing core 245 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one embodiment, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular embodiment described below, a hybrid rasterization/ray tracing approach is used in which work is distributed between the graphics cores 243 and ray tracing cores 245.

In one embodiment, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 245, graphics cores 243 and tensor cores 244 is Vulkan 1.1.85. Note, however, that the underlying principles of the invention are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

In one embodiment the ray tracing cores 245 may be adapted to accelerate general-purpose compute operations that can be accelerated using computational techniques that are analogous to ray intersection tests. A compute framework can be provided that enables shader programs to be compiled into low level instructions and/or primitives that perform general-purpose compute operations via the ray tracing cores. Exemplary computational problems that can benefit from compute operations performed on the ray tracing cores 245 include computations involving beam, wave, ray, or particle propagation within a coordinate space. Interactions associated with that propagation can be computed relative to a geometry or mesh within the coordinate space. For example, computations associated with electromagnetic signal propagation through an environment can be accelerated via the use of instructions or primitives that are executed via the ray tracing cores. Diffraction and reflection of the signals by objects in the environment can be computed as direct ray-tracing analogies.

Ray tracing cores 245 can also be used to perform computations that are not directly analogous to ray tracing. For example, mesh projection, mesh refinement, and volume sampling computations can be accelerated using the ray tracing cores 245. Generic coordinate space calculations, such as nearest neighbor calculations can also be performed. For example, the set of points near a given point can be discovered by defining a bounding box in the coordinate space around the point. BVH and ray probe logic within the ray tracing cores 245 can then be used to determine the set of point intersections within the bounding box. The intersections constitute the origin point and the nearest neighbors to that origin point. Computations that are performed using the ray tracing cores 245 can be performed in parallel with computations performed on the graphics cores 243 and tensor cores 244. A shader compiler can be configured to compile a compute shader or other general-purpose graphics processing program into low level primitives that can be parallelized across the graphics cores 243, tensor cores 244, and ray tracing cores 245.

Figure 2D:
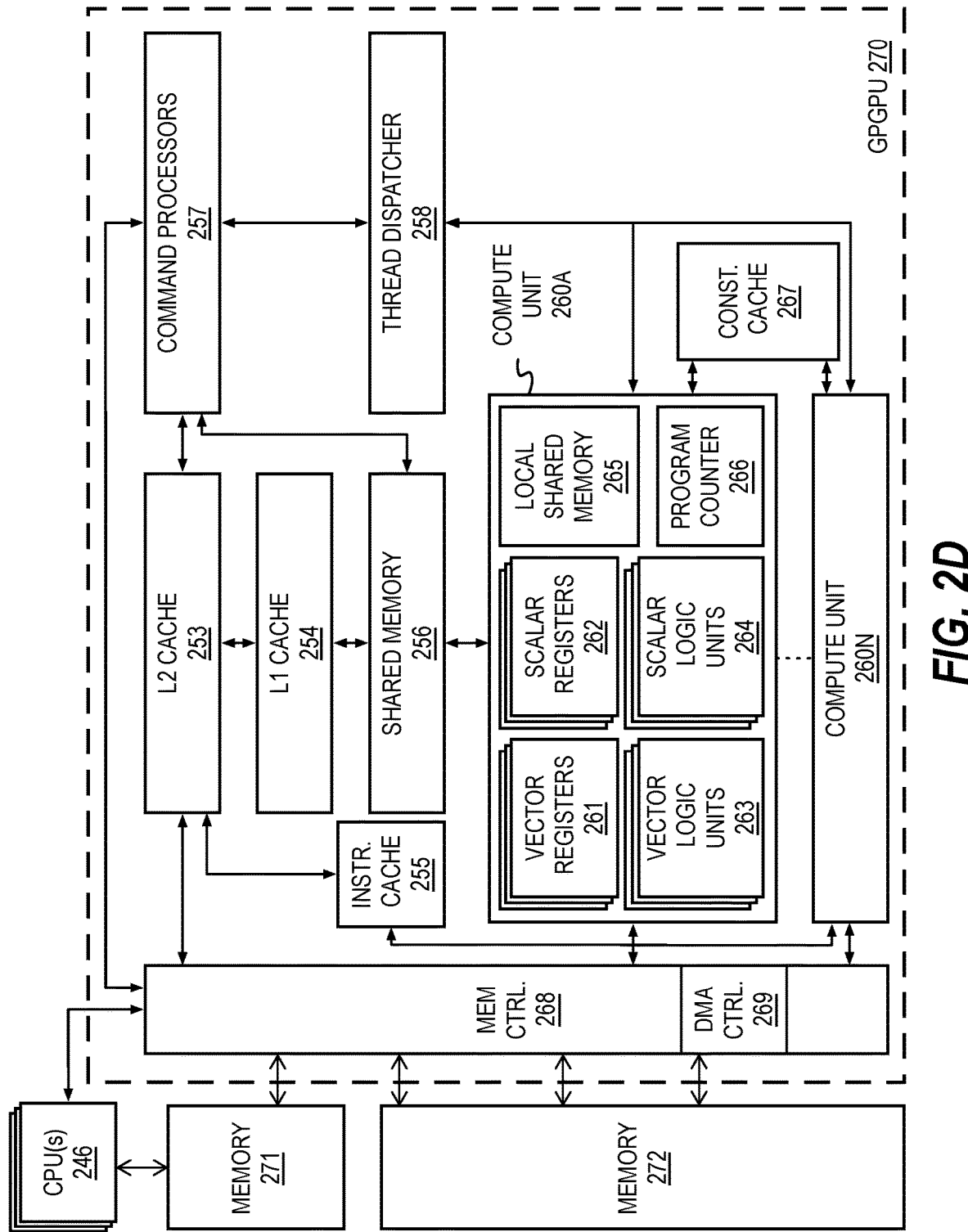

FIG. 2D is a block diagram of general purpose graphics processing unit (GPGPU) 270 that can be configured as a graphics processor and/or compute accelerator, according to embodiments described herein. The GPGPU 270 can interconnect with host processors (e.g., one or more CPU(s) 246) and memory 271, 272 via one or more system and/or memory busses. In one embodiment the memory 271 is system memory that may be shared with the one or more CPU(s) 246, while memory 272 is device memory that is dedicated to the GPGPU 270. In one embodiment, components within the GPGPU 270 and memory 272 may be mapped into memory addresses that are accessible to the one or more CPU(s) 246. Access to memory 271 and 272 may be facilitated via a memory controller 268. In one embodiment the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one embodiment the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands. Each compute unit 260A-260N can execute threads independently of the other compute units. Additionally, each compute unit 260A-260N can be independently configured for conditional computation and can conditionally output the results of computation to memory. The command processors 257 can interrupt the one or more CPU(s) 246 when the submitted commands are complete.

Figure 3A:
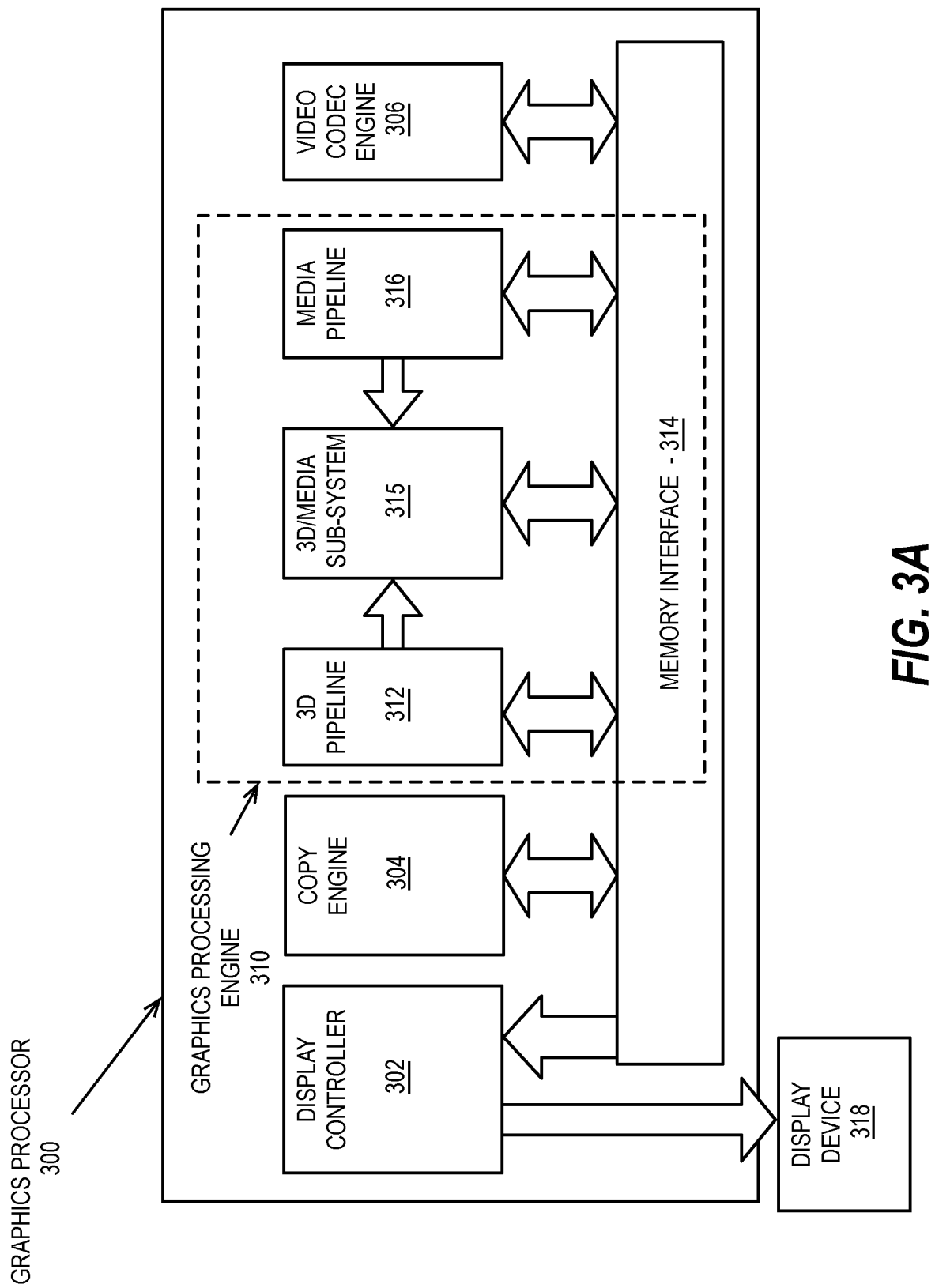
FIG. 3A-3C illustrate block diagrams of additional graphics processor and compute accelerator architectures provided by embodiments described herein.
Figure 3B:
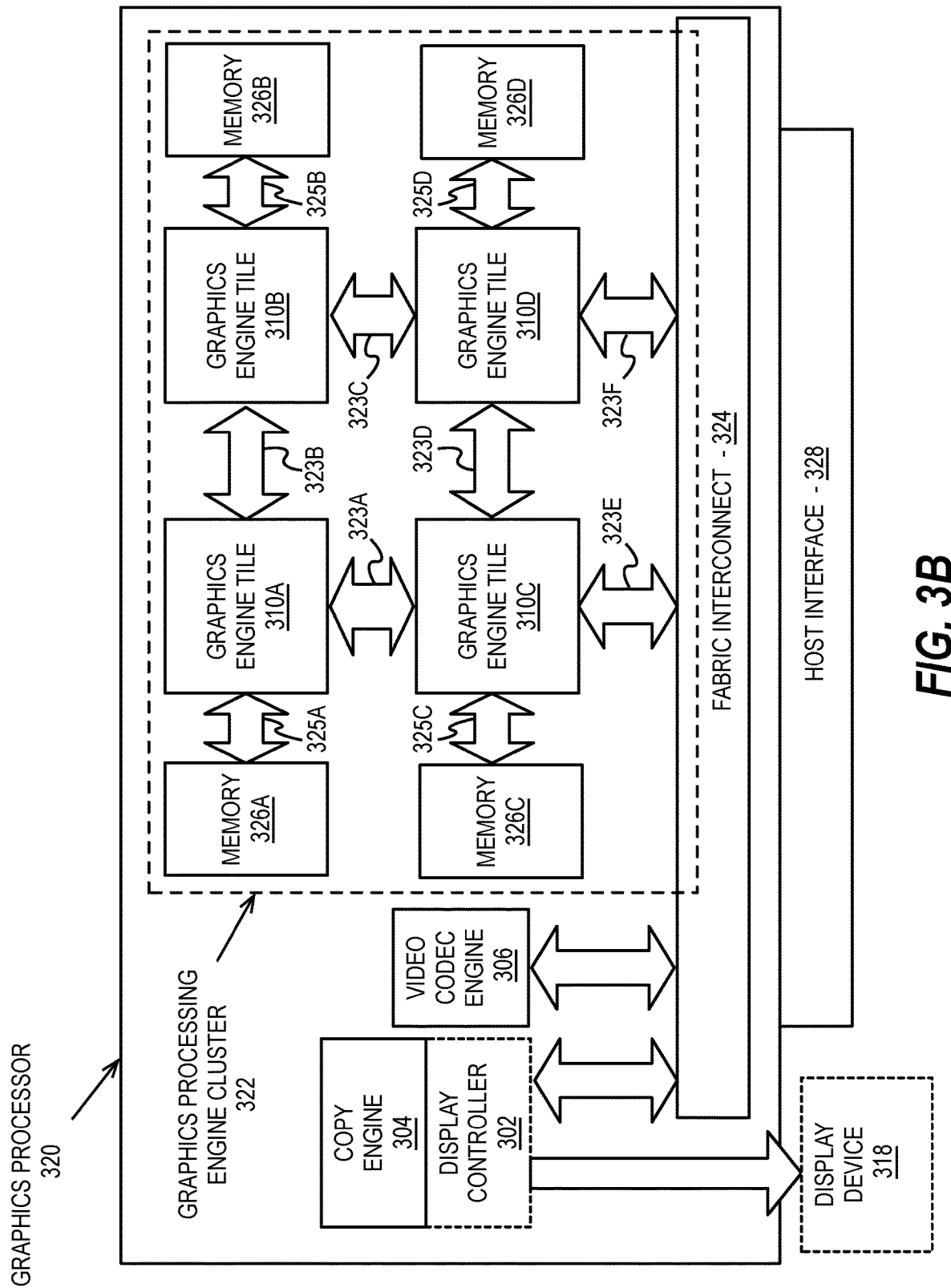
Figure 3C:
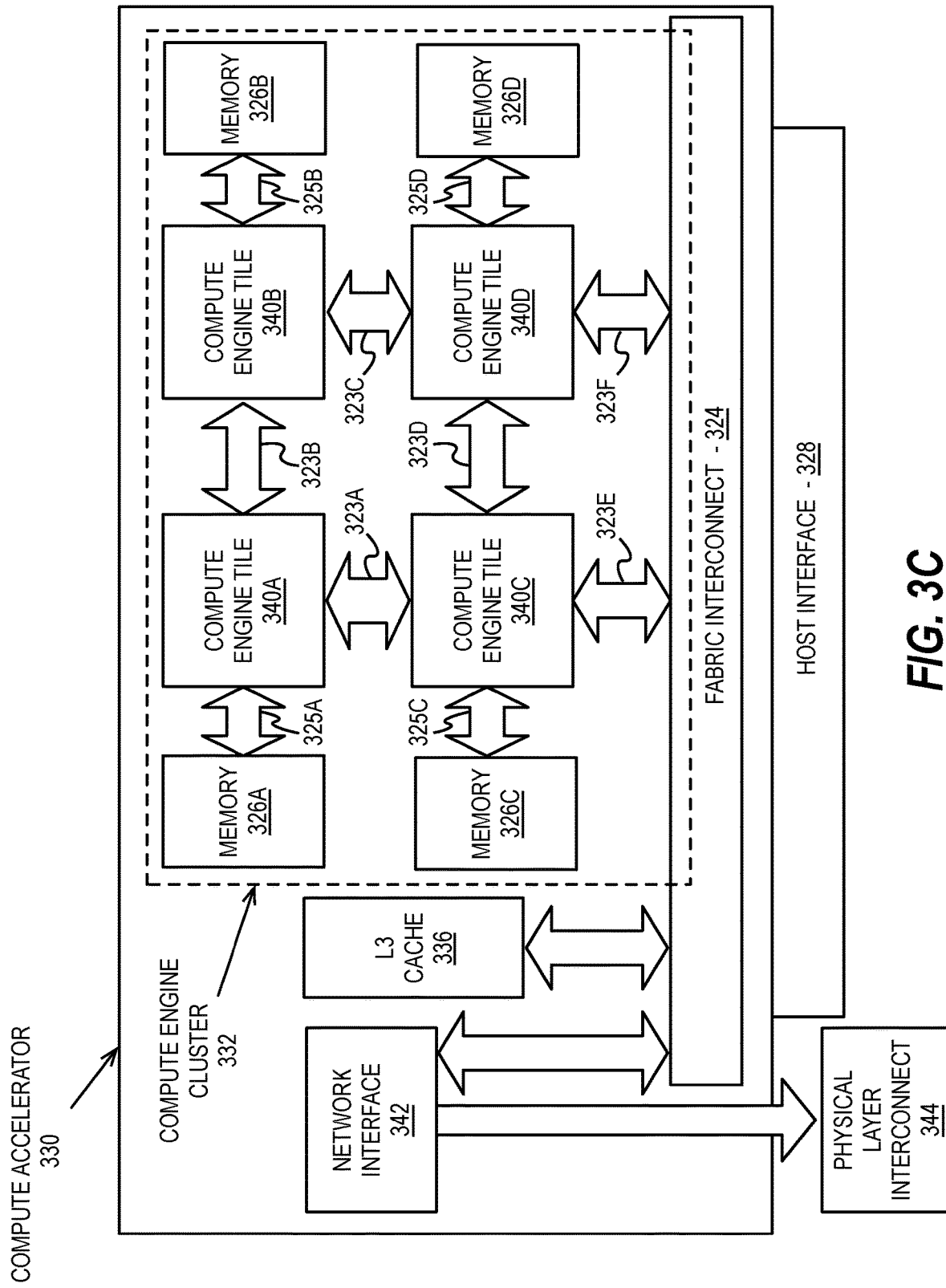

FIG. 3A-3C illustrate block diagrams of additional graphics processor and compute accelerator architectures provided by embodiments described herein. The elements of FIG. 3A-3C having the same reference numbers (or names) as the elements of any other figure herein can operate or function in any manner similar to that described elsewhere herein, but are not limited to such.

FIG. 3A is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one embodiment the display device 318 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, AV1 as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media subsystem 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media subsystem 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

FIG. 3B illustrates a graphics processor 320 having a tiled architecture, according to embodiments described herein. In one embodiment the graphics processor 320 includes a graphics processing engine cluster 322 having multiple instances of the graphics processing engine 310 of FIG. 3A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D. The memory devices 326A-326D can use any graphics memory technology. For example, the memory devices 326A-326D may be graphics double data rate (GDDR) memory. The memory devices 326A-326D, in one embodiment, are high-bandwidth memory (HBM) modules that can be on-die with their respective graphics engine tile 310A-310D. In one embodiment the memory devices 326A-326D are stacked memory devices that can be stacked on top of their respective graphics engine tile 310A-310D. In one embodiment, each graphics engine tile 310A-310D and associated memory 326A-326D reside on separate chiplets, which are bonded to a base die or base substrate, as described on further detail in FIG. 11B-11D.

The graphics processor 320 may be configured with a non-uniform memory access (NUMA) system in which memory devices 326A-326D are coupled with associated graphics engine tiles 310A-310D. A given memory device may be accessed by graphics engine tiles other than the tile to which it is directly connected. However, access latency to the memory devices 326A-326D may be lowest when accessing a local tile. In one embodiment, a cache coherent NUMA (ccNUMA) system is enabled that uses the tile interconnects 323A-323F to enable communication between cache controllers within the graphics engine tiles 310A-310D to maintain a consistent memory image when more than one cache stores the same memory location.

The graphics processing engine cluster 322 can connect with an on-chip or on-package fabric interconnect 324. In one embodiment the fabric interconnect 324 includes a network processor, network on a chip (NoC), or another switching processor to enable the fabric interconnect 324 to act as a packet switched fabric interconnect that switches data packets between components of the graphics processor 320. The fabric interconnect 324 can enable communication between graphics engine tiles 310A-310D and components such as the video codec engine 306 and one or more copy engines 304. The copy engines 304 can be used to move data out of, into, and between the memory devices 326A-326D and memory that is external to the graphics processor 320 (e.g., system memory). The fabric interconnect 324 can also couple with one or more of the tile interconnects 323A-323F to facilitate or enhance the interconnection between the graphics engine tiles 310A-310D. The fabric interconnect 324 is also configurable to interconnect multiple instances of the graphics processor 320 (e.g., via the host interface 328), enabling tile-to-tile communication between graphics engine tiles 310A-310D of multiple GPUs. In one embodiment, the graphics engine tiles 310A-310D of multiple GPUs can be presented to a host system as a single logical device.

The graphics processor 320 may optionally include a display controller 302 to enable a connection with the display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface. For example, the host interface 328 may be an NVLink or NVSwitch interface. The host interface 328 and fabric interconnect 324 can cooperate to enable multiple instances of the graphics processor 320 to act as single logical device. Cooperation between the host interface 328 and fabric interconnect 324 can also enable the individual graphics engine tiles 310A-310D to be presented to the host system as distinct logical graphics devices.

FIG. 3C illustrates a compute accelerator 330, according to embodiments described herein. The compute accelerator 330 can include architectural similarities with the graphics processor 320 of FIG. 3B and is optimized for compute acceleration. A compute engine cluster 332 can include a set of compute engine tiles 340A-340D that include execution logic that is optimized for parallel or vector-based general-purpose compute operations. In some embodiments, the compute engine tiles 340A-340D do not include fixed function graphics processing logic, although in one embodiment one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320, or can be different. The graphics compute engine tiles 340A-340D can also be interconnected via a set of tile interconnects 323A-323F and may be connected with and/or interconnected by a fabric interconnect 324. Cross-tile communications can be facilitated via the fabric interconnect 324. The fabric interconnect 324 (e.g., via the host interface 328) can also facilitate communication between compute engine tiles 340A-340D of multiple instances of the compute accelerator 330. In one embodiment the compute accelerator 330 includes a large L3 cache 336 that can be configured as a device-wide cache. The compute accelerator 330 can also connect to a host processor and memory via a host interface 328 in a similar manner as the graphics processor 320 of FIG. 3B.

The compute accelerator 330 can also include an integrated network interface 342. In one embodiment the network interface 342 includes a network processor and controller logic that enables the compute engine cluster 332 to communicate over a physical layer interconnect 344 without requiring data to traverse memory of a host system. In one embodiment, one of the compute engine tiles 340A-340D is replaced by network processor logic and data to be transmitted or received via the physical layer interconnect 344 may be transmitted directly to or from memory 326A-326D. Multiple instances of the compute accelerator 330 may be joined via the physical layer interconnect 344 into a single logical device. Alternatively, the various compute engine tiles 340A-340D may be presented as distinct network accessible compute accelerator devices.

Graphics Processing Engine

Figure 4:
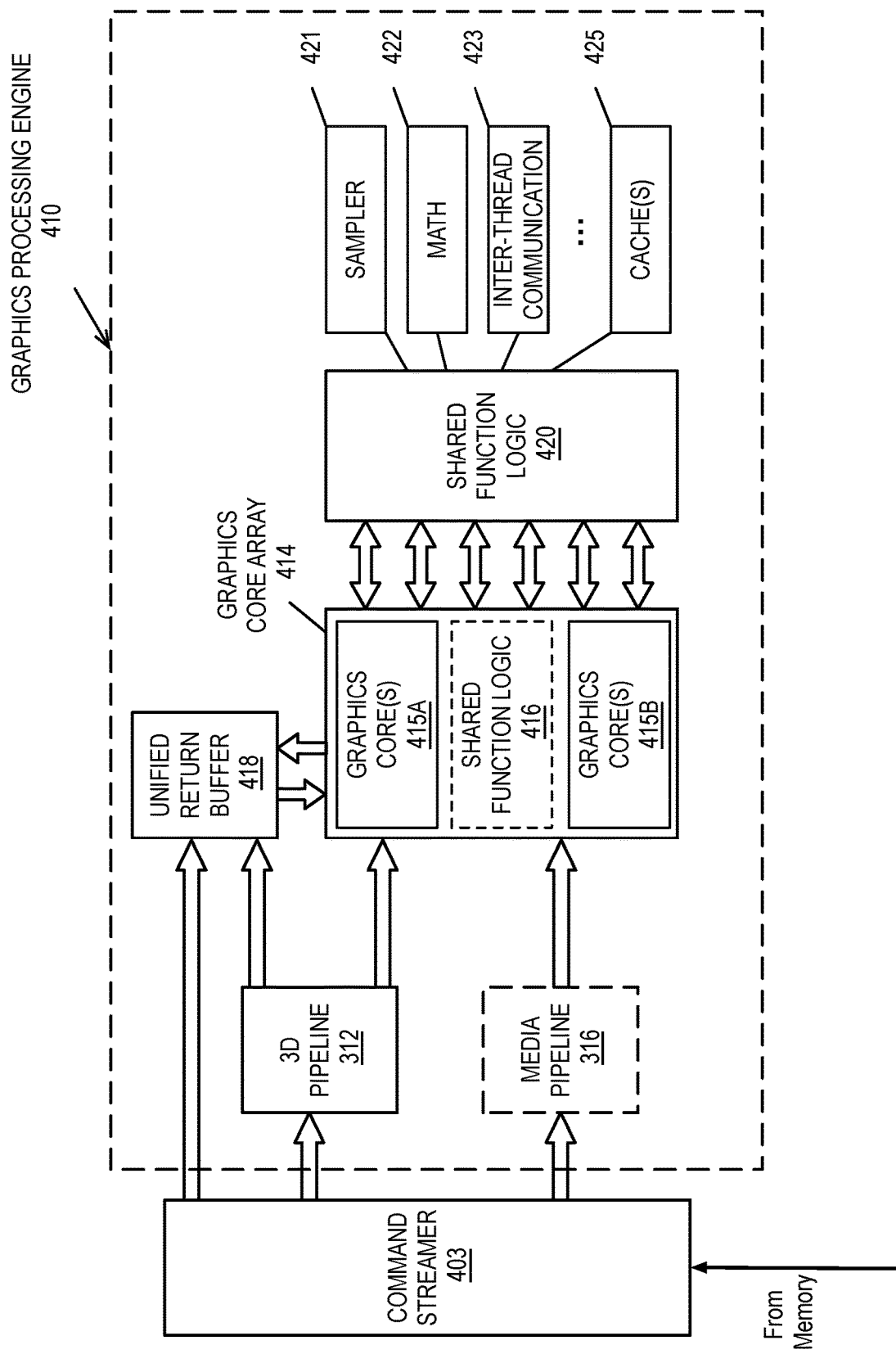
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3A, and may also represent a graphics engine tile 310A-310D of FIG. 3B. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3A are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. Alternatively or additionally, the command streamer 403 may be directly coupled to a unified return buffer 418. The unified return buffer 418 may be communicatively coupled to a graphics core array 414. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 can include fixed function and programmable logic to process one or more shader programs, such as vertex shaders, geometry shaders, pixel shaders, fragment shaders, compute shaders, or other shader and/or GPGPU programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphics core array 414 includes support for various 3D API shader languages and can execute multiple simultaneous execution threads associated with multiple shaders.

In some embodiments, the graphics core array 414 includes execution logic to perform media functions, such as video and/or image processing. In one embodiment, the execution units include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2A.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented at least in a case where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Execution Units

Figure 5A:
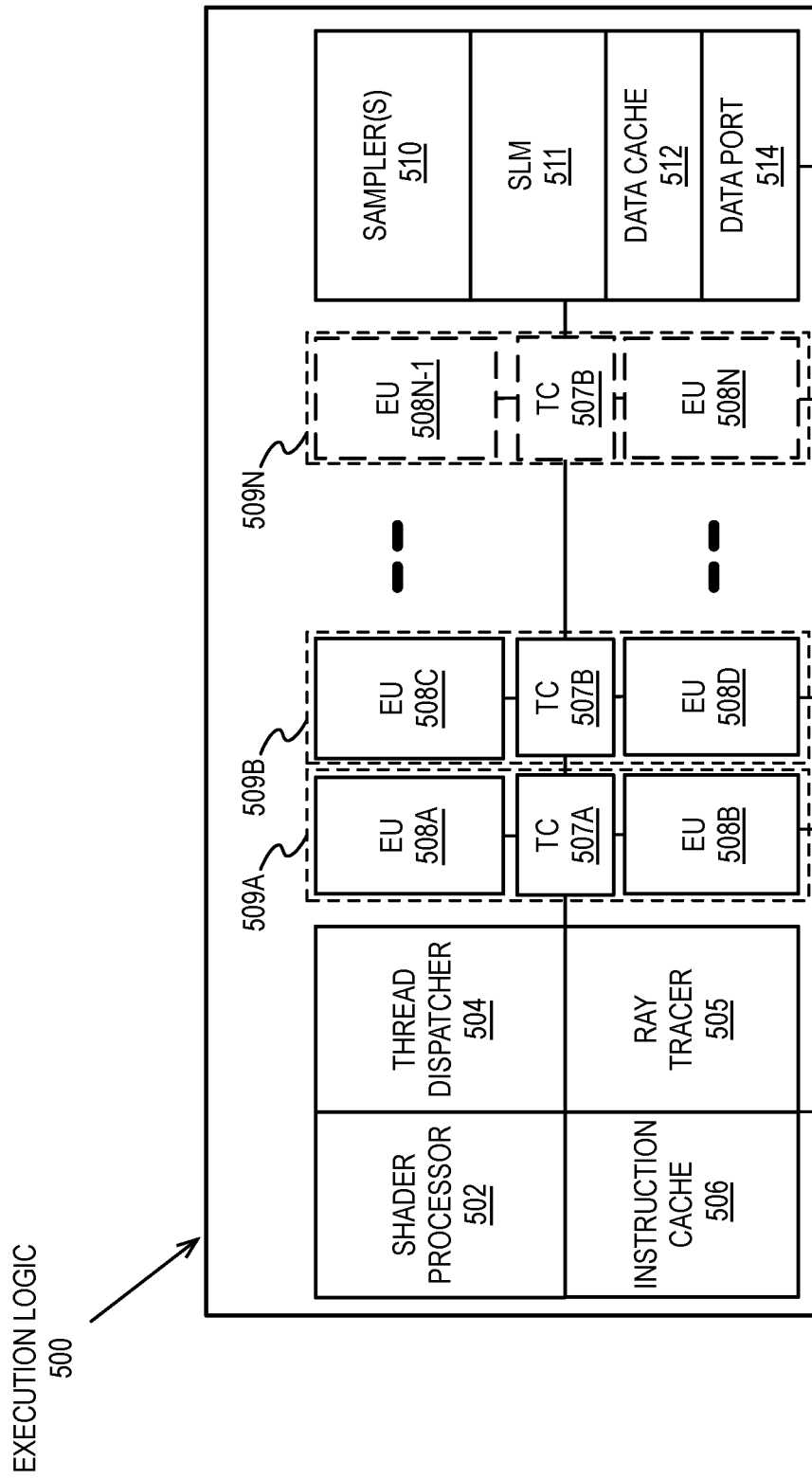
FIG. 5A-5B illustrate thread execution logic including an array of processing elements employed in a graphics processor core according to embodiments described herein.
Figure 5B:
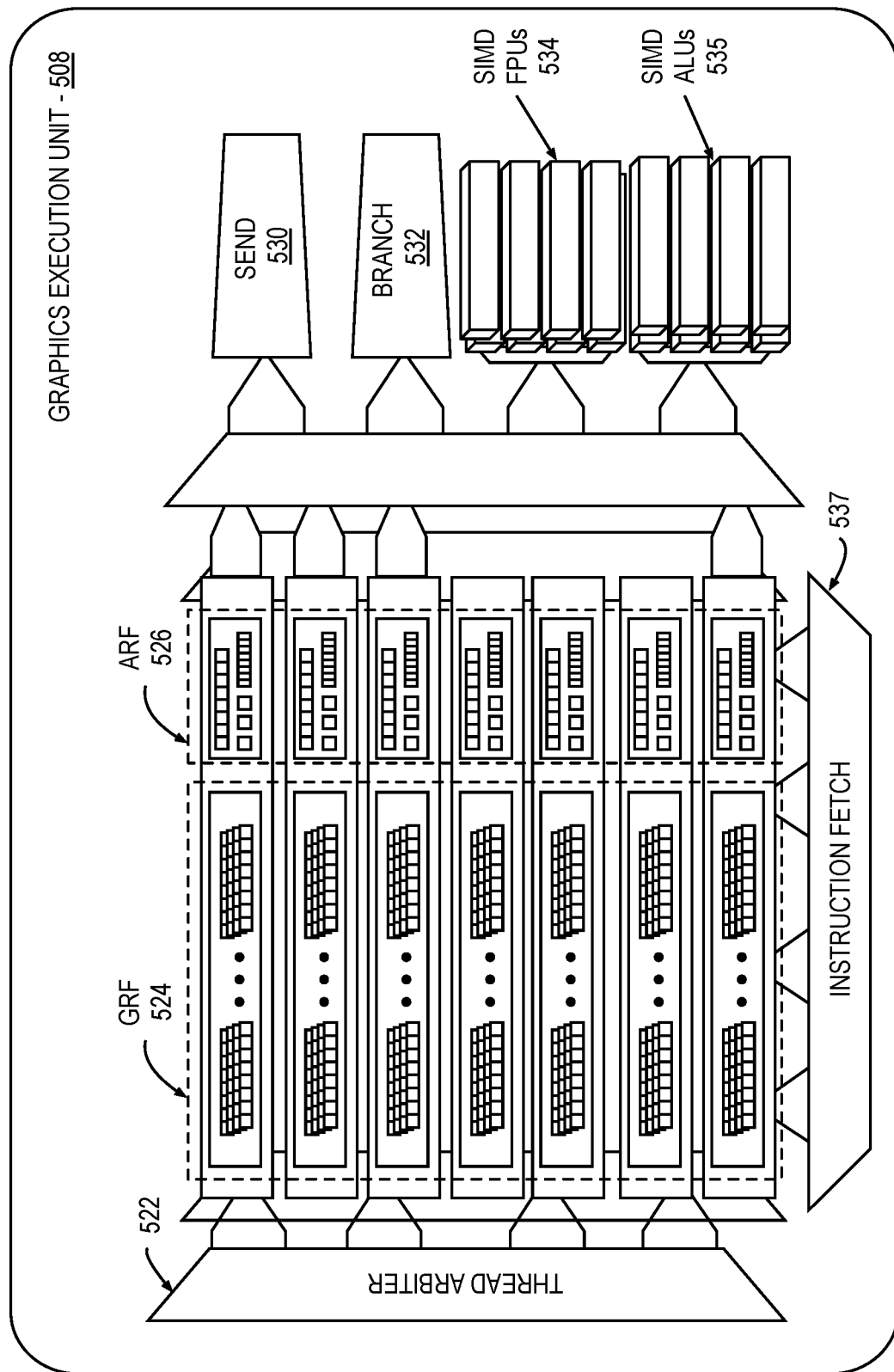

FIG. 5A-5B illustrate thread execution logic 500 including an array of processing elements employed in a graphics processor core according to embodiments described herein. Elements of FIG. 5A-5B having the same reference numbers (or names) as the elements of any other figure herein can operate or function in any manner similar to that described elsewhere herein, but are not limited to such. FIG. 5A-5B illustrates an overview of thread execution logic 500, which may be representative of hardware logic illustrated with each sub-core 221A-221F of FIG. 2B. FIG. 5A is representative of an execution unit within a general-purpose graphics processor, while FIG. 5B is representative of an execution unit that may be used within a compute accelerator.

As illustrated in FIG. 5A, in some embodiments thread execution logic 500 includes a shader processor 502, a thread dispatcher 504, instruction cache 506, a scalable execution unit array including a plurality of graphics execution units 508A-508N, a sampler 510, shared local memory 511, a data cache 512, and a data port 514. In one embodiment the scalable execution unit array can dynamically scale by enabling or disabling one or more execution units (e.g., any of graphics execution units 508A, 508B, 508C, 508D, through 508N-1 and 508N) based on the computational requirements of a workload. In one embodiment the included components are interconnected via an interconnect fabric that links to each of the components. In some embodiments, thread execution logic 500 includes one or more connections to memory, such as system memory or cache memory, through one or more of instruction cache 506, data port 514, sampler 510, and graphics execution units 508A-508N. In some embodiments, each execution unit (e.g. 508A) is a stand-alone programmable general-purpose computational unit that is capable of executing multiple simultaneous hardware threads while processing multiple data elements in parallel for each thread. In various embodiments, the array of graphics execution units 508A-508N is scalable to include any number individual execution units.

In some embodiments, the graphics execution units 508A-508N are primarily used to execute shader programs. A shader processor 502 can process the various shader programs and dispatch execution threads associated with the shader programs via a thread dispatcher 504. In one embodiment the thread dispatcher includes logic to arbitrate thread initiation requests from the graphics and media pipelines and instantiate the requested threads on one or more execution unit in the graphics execution units 508A-508N. For example, a geometry pipeline can dispatch vertex, tessellation, or geometry shaders to the thread execution logic for processing. In some embodiments, thread dispatcher 504 can also process runtime thread spawning requests from the executing shader programs.

In some embodiments, the graphics execution units 508A-508N support an instruction set that includes native support for many standard 3D graphics shader instructions, such that shader programs from graphics libraries (e.g., Direct 3D, OpenGL, Vulkan, etc.) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 508A-508N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the graphics execution units 508A-508N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various embodiments can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in graphics execution units 508A-508N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs), Floating Point Units (FPUs), or other logic units (e.g., tensor cores, ray tracing cores, etc.) for a particular graphics processor. In some embodiments, graphics execution units 508A-508N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 54-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused graphics execution unit 509A-509N having thread control logic (507A-507N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 509A-509N includes at least two execution units. For example, fused execution unit 509A includes a first EU 508A, second EU 508B, and thread control logic 507A that is common to the first EU 508A and the second EU 508B. The thread control logic 507A controls threads executed on the fused graphics execution unit 509A, allowing each EU within the fused execution units 509A-509N to execute using a common instruction pointer register.

One or more internal instruction caches (e.g., 506) are included in the thread execution logic 500 to cache thread instructions for the execution units. In some embodiments, one or more data caches (e.g., 512) are included to cache thread data during thread execution. Threads executing on the execution logic 500 can also store explicitly managed data in the shared local memory 511. In some embodiments, a sampler 510 is included to provide texture sampling for 3D operations and media sampling for media operations. In some embodiments, sampler 510 includes specialized texture or media sampling functionality to process texture or media data during the sampling process before providing the sampled data to an execution unit.

During execution, the graphics and media pipelines send thread initiation requests to thread execution logic 500 via thread spawning and dispatch logic. Once a group of geometric objects has been processed and rasterized into pixel data, pixel processor logic (e.g., pixel shader logic, fragment shader logic, etc.) within the shader processor 502 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 502 then executes an application programming interface (API)-supplied pixel or fragment shader program. To execute the shader program, the shader processor 502 dispatches threads to an execution unit (e.g., 508A) via thread dispatcher 504. In some embodiments, shader processor 502 uses texture sampling logic in the sampler 510 to access texture data in texture maps stored in memory. Arithmetic operations on the texture data and the input geometry data compute pixel color data for each geometric fragment, or discards one or more pixels from further processing.

In some embodiments, the data port 514 provides a memory access mechanism for the thread execution logic 500 to output processed data to memory for further processing on a graphics processor output pipeline. In some embodiments, the data port 514 includes or couples to one or more cache memories (e.g., data cache 512) to cache data for memory access via the data port.

In one embodiment, the execution logic 500 can also include a ray tracer 505 that can provide ray tracing acceleration functionality. The ray tracer 505 can support a ray tracing instruction set that includes instructions/functions for ray generation. The ray tracing instruction set can be similar to or different from the ray-tracing instruction set supported by the ray tracing cores 245 in FIG. 2C.

FIG. 5B illustrates exemplary internal details of an execution unit 508, according to embodiments. A graphics execution unit 508 can include an instruction fetch unit 537, a general register file array (GRF) 524, an architectural register file array (ARF) 526, a thread arbiter 522, a send unit 530, a branch unit 532, a set of SIMD floating point units (FPUs) 534, and in one embodiment a set of dedicated integer SIMD ALUs 535. The GRF 524 and ARF 526 includes the set of general register files and architecture register files associated with each simultaneous hardware thread that may be active in the graphics execution unit 508. In one embodiment, per thread architectural state is maintained in the ARF 526, while data used during thread execution is stored in the GRF 524. The execution state of each thread, including the instruction pointers for each thread, can be held in thread-specific registers in the ARF 526.

In one embodiment the graphics execution unit 508 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads. The number of logical threads that may be executed by the graphics execution unit 508 is not limited to the number of hardware threads, and multiple logical threads can be assigned to each hardware thread.

In one embodiment, the graphics execution unit 508 can co-issue multiple instructions, which may each be different instructions. The thread arbiter 522 of the graphics execution unit 508 can dispatch the instructions to one of the send unit 530, branch unit 532, or SIMD FPU(s) 534 for execution. Each execution thread can access 128 general-purpose registers within the GRF 524, where each register can store 32 bytes, accessible as a SIMD 8-element vector of 32-bit data elements. In one embodiment, each execution unit thread has access to 4 Kbytes within the GRF 524, although embodiments are not so limited, and greater or fewer register resources may be provided in other embodiments. In one embodiment the graphics execution unit 508 is partitioned into seven hardware threads that can independently perform computational operations, although the number of threads per execution unit can also vary according to embodiments. For example, in one embodiment up to 16 hardware threads are supported. In an embodiment in which seven threads may access 4 Kbytes, the GRF 524 can store a total of 28 Kbytes. Where 16 threads may access 4 Kbytes, the GRF 524 can store a total of 64 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 530. In one embodiment, branch instructions are dispatched to a dedicated branch unit 532 to facilitate SIMD divergence and eventual convergence.

In one embodiment the graphics execution unit 508 includes one or more SIMD floating point units (FPU(s)) 534 to perform floating-point operations. In one embodiment, the FPU(s) 534 also support integer computation. In one embodiment the FPU(s) 534 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 54-bit floating-point. In some embodiments, a set of 8-bit integer SIMD ALUs 535 are also present, and may be specifically optimized to perform operations associated with machine learning computations.

In one embodiment, arrays of multiple instances of the graphics execution unit 508 can be instantiated in a graphics sub-core grouping (e.g., a sub-slice). For scalability, product architects can choose the exact number of execution units per sub-core grouping. In one embodiment the execution unit 508 can execute instructions across a plurality of execution channels. In a further embodiment, each thread executed on the graphics execution unit 508 is executed on a different channel.

Figure 6:
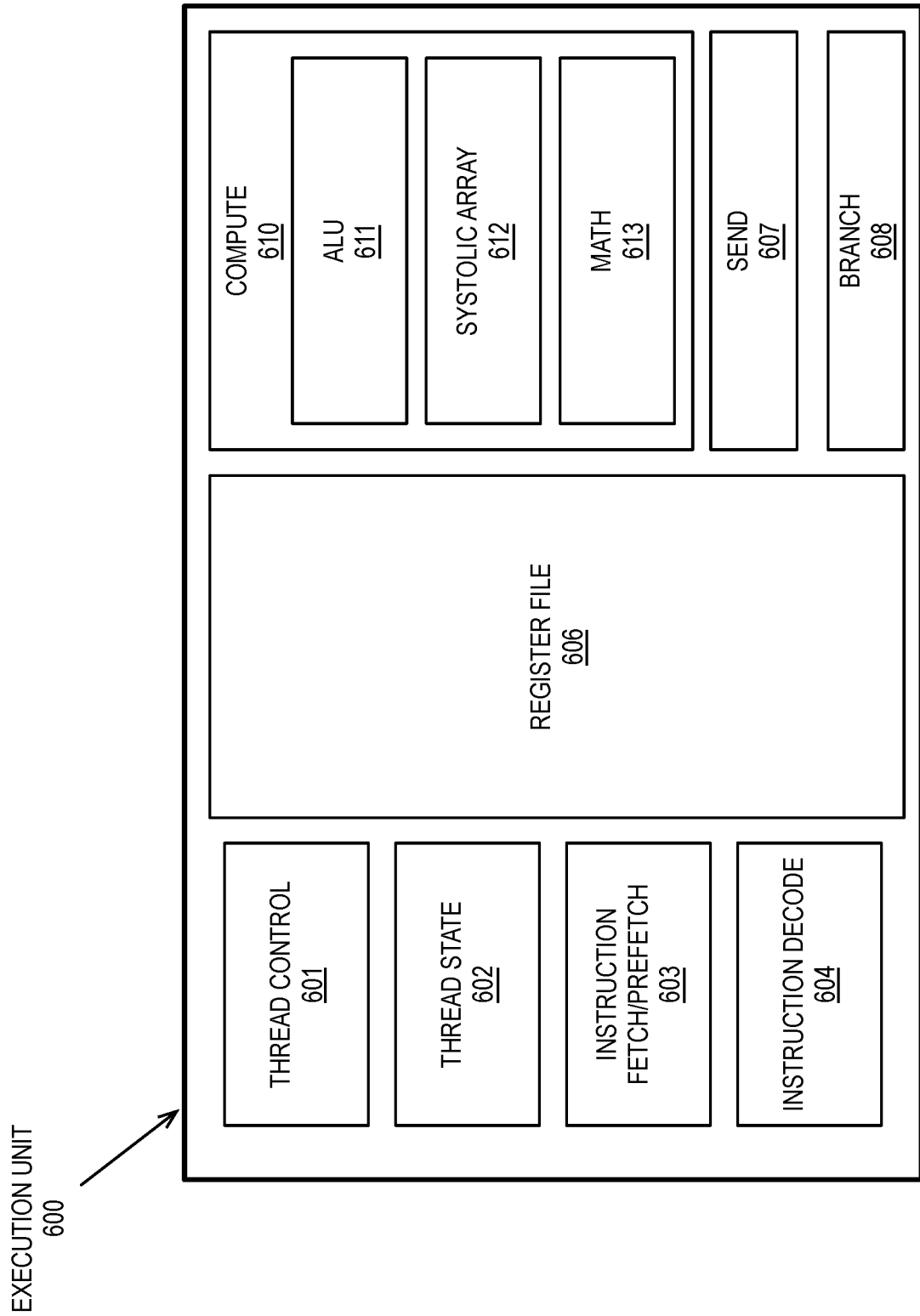
FIG. 6 illustrates an additional execution unit, according to an embodiment.

FIG. 6 illustrates an additional execution unit 600, according to an embodiment. The execution unit 600 may be a compute-optimized execution unit for use in, for example, a compute engine tile 340A-340D as in FIG. 3C, but is not limited as such. Variants of the execution unit 600 may also be used in a graphics engine tile 310A-310D as in FIG. 3B. In one embodiment, the execution unit 600 includes a thread control unit 601, a thread state unit 602, an instruction fetch/prefetch unit 603, and an instruction decode unit 604. The execution unit 600 additionally includes a register file 606 that stores registers that can be assigned to hardware threads within the execution unit. The execution unit 600 additionally includes a send unit 607 and a branch unit 608. In one embodiment, the send unit 607 and branch unit 608 can operate similarly as the send unit 530 and a branch unit 532 of the graphics execution unit 508 of FIG. 5B.

The execution unit 600 also includes a compute unit 610 that includes multiple different types of functional units. The compute unit 610 can include an ALU 611, a systolic array 612, and a math unit 613. The ALU 611 includes an array of arithmetic logic units. The ALU 611 can be configured to perform 64-bit, 32-bit, and 16-bit integer and floating point operations across multiple processing lanes and data channels and for multiple hardware and/or software threads. The ALU 611 can perform integer and floating point operations simultaneously (e.g., within the same clock cycle).

The systolic array 612 includes a W wide and D deep network of data processing units that can be used to perform vector or other data-parallel operations in a systolic manner. In one embodiment the systolic array 612 can be configured to perform various matrix operations, including as dot product, outer product, and general matrix-matrix multiplication (GEMM) operations. In one embodiment the systolic array 612 supports 16-bit floating point operations, as well as 8-bit, 4-bit, 2-bit, and binary integer operations. The systolic array 612 can be configured to accelerate specific machine learning operations, in addition to matrix multiply operations. In such embodiments, the systolic array 612 can be configured with support for the bfloat (brain floating point) 16-bit floating point format or a tensor float 32-bit floating point format (TF32) that have different numbers of mantissa and exponent bits relative to Institute of Electrical and Electronics Engineers (IEEE) 754 formats.

The systolic array 612 includes hardware to accelerate sparse matrix operations. In one embodiment, multiplication operations for sparse regions of input data can be bypassed at the processing element level by skipping multiply operations that have a zero value operand. In on embodiment, sparsity within input matrices can be detected and operations having known output values can be bypassed before being submitted to the processing elements of the systolic array 612. Additionally, the loading of zero value operands into the processing elements can be bypassed and the processing elements can be configured to perform multiplications on the non-zero value input elements. Output can be generated in a compressed (e.g., dense) format, with associated decompression or decoding metadata. The output can be cached in the compressed format. The output can be maintained in the compressed format when written to local memory or host system memory. The output may also be decompressed before being written to local memory or host system memory.

In one embodiment, the systolic array 612 includes hardware to enable operations on sparse data having a compressed representation. A compressed representation of a sparse matrix stores non-zero values and metadata that identifies the positions of the non-zero values within the matrix. Exemplary compressed representations include but are not limited to compressed tensor representations such as compressed sparse row (CSR), compressed sparse column (CSC), compressed sparse fiber (CSF) representations. Support for compressed representations enable operations to be performed on input in a compressed tensor format without requiring the compressed representation to be decompressed or decoded. In such embodiment, operations can be performed only on non-zero input values and the resulting non-zero output values can be mapped into an output matrix. In some embodiments, hardware support is also provided for machine-specific lossless data compression formats that are used when transmitting data within hardware or across system busses. Such data may be retained in a compressed format for sparse input data and the systolic array 612 can used the compression metadata for the compressed data to enable operations to be performed on only non-zero values, or to enable blocks of zero data input to be bypassed for multiply operations.

In one embodiment, a math unit 613 can be included to perform a specific subset of mathematical operations in an efficient and lower-power manner than the ALU 611. The math unit 613 can include a variant of math logic that may be found in shared function logic of a graphics processing engine provided by other embodiments (e.g., math logic 422 of the shared function logic 420 of FIG. 4). In one embodiment the math unit 613 can be configured to perform 32-bit and 64-bit floating point operations.

The thread control unit 601 includes logic to control the execution of threads within the execution unit. The thread control unit 601 can include thread arbitration logic to start, stop, and preempt execution of threads within the execution unit 600. The thread state unit 602 can be used to store thread state for threads assigned to execute on the execution unit 600. Storing the thread state within the execution unit 600 enables the rapid pre-emption of threads when those threads become blocked or idle. The instruction fetch/prefetch unit 603 can fetch instructions from an instruction cache of higher-level execution logic (e.g., instruction cache 506 as in FIG. 5A). The instruction fetch/prefetch unit 603 can also issue prefetch requests for instructions to be loaded into the instruction cache based on an analysis of currently executing threads. The instruction decode unit 604 can be used to decode instructions to be executed by the compute units. In one embodiment, the instruction decode unit 604 can be used as a secondary decoder to decode complex instructions into constituent micro-operations.

The execution unit 600 additionally includes a register file 606 that can be used by hardware threads executing on the execution unit 600. Registers in the register file 606 can be divided across the logic used to execute multiple simultaneous threads within the compute unit 610 of the execution unit 600. The number of logical threads that may be executed by the graphics execution unit 600 is not limited to the number of hardware threads, and multiple logical threads can be assigned to each hardware thread. The size of the register file 606 can vary across embodiments based on the number of supported hardware threads. In one embodiment, register renaming may be used to dynamically allocate registers to hardware threads.

FIG. 7 is a block diagram illustrating graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, the graphics processor instruction formats 700 described and illustrated are macro-instructions, in that they are instructions supplied to the execution unit, as opposed to micro-operations resulting from instruction decode once the instruction is processed. Thus, a single instruction may cause hardware to perform multiple micro-operations.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math instruction group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands. The illustrated opcode decode 740, in one embodiment, can be used to determine which portion of an execution unit will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 8:
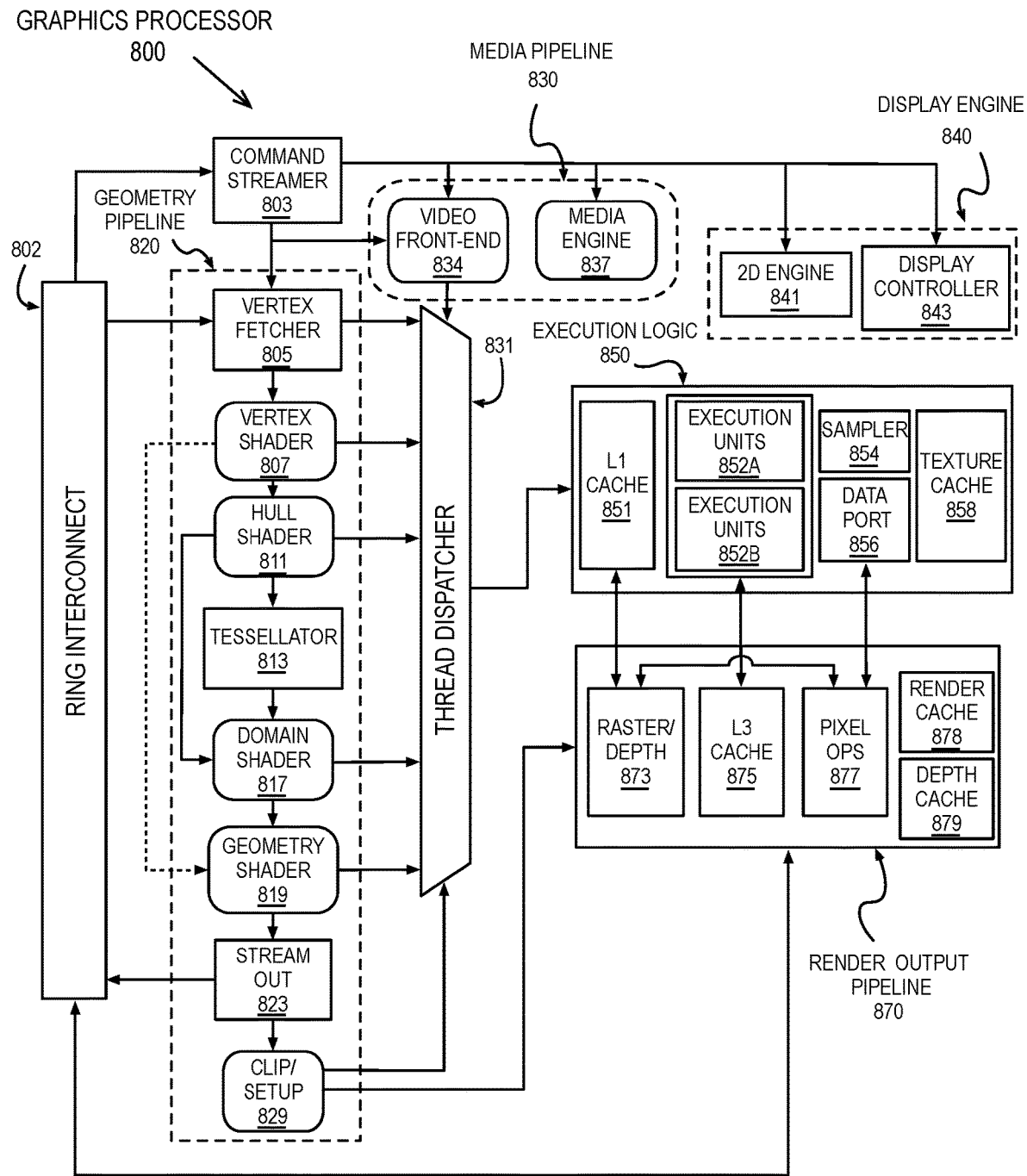
FIG. 8 is a block diagram of a graphics processor according to another embodiment.
Figure 9:
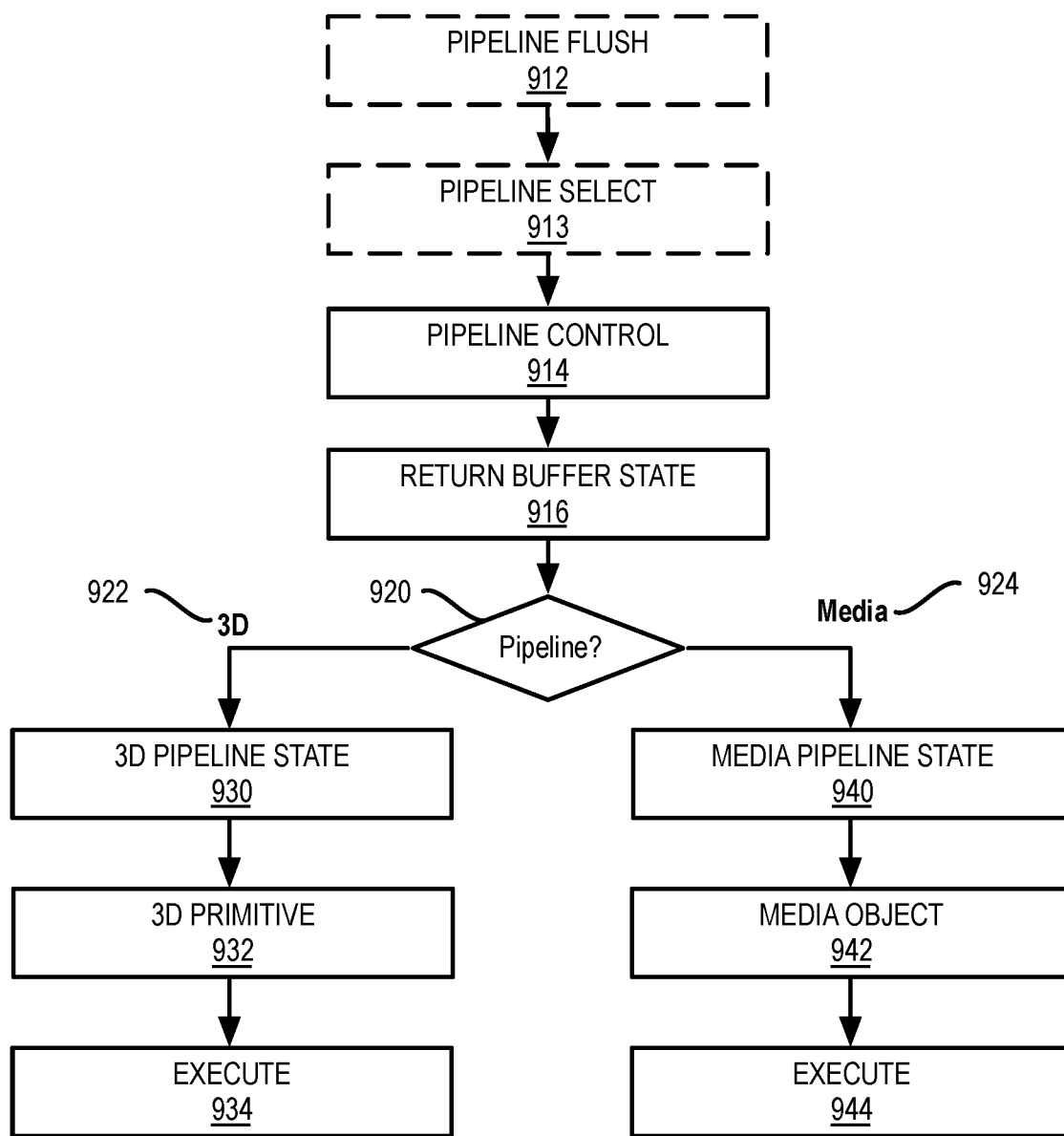
FIG. 9A-9B illustrate a graphics processor command format and command sequence, according to some embodiments.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed. The tessellation components can operate based on data received from the vertex shader 807.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 that may be used to program graphics processing pipelines according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and a data field 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word. Other command formats can be used.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands related to the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
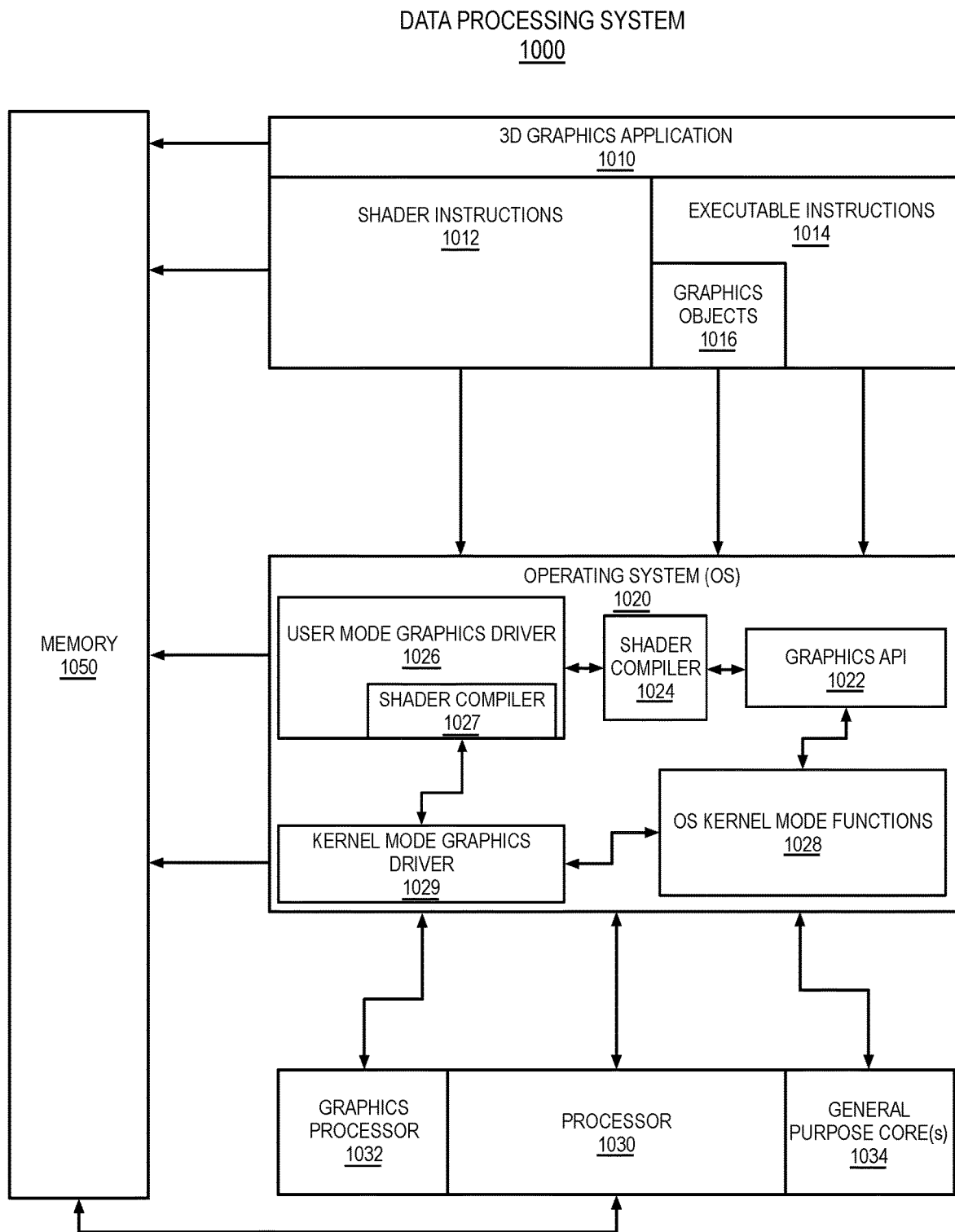
FIG. 10 illustrates exemplary graphics software architecture for a data processing system according to some embodiments.

FIG. 10 illustrates an exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High-Level Shader Language (HLSL) of Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
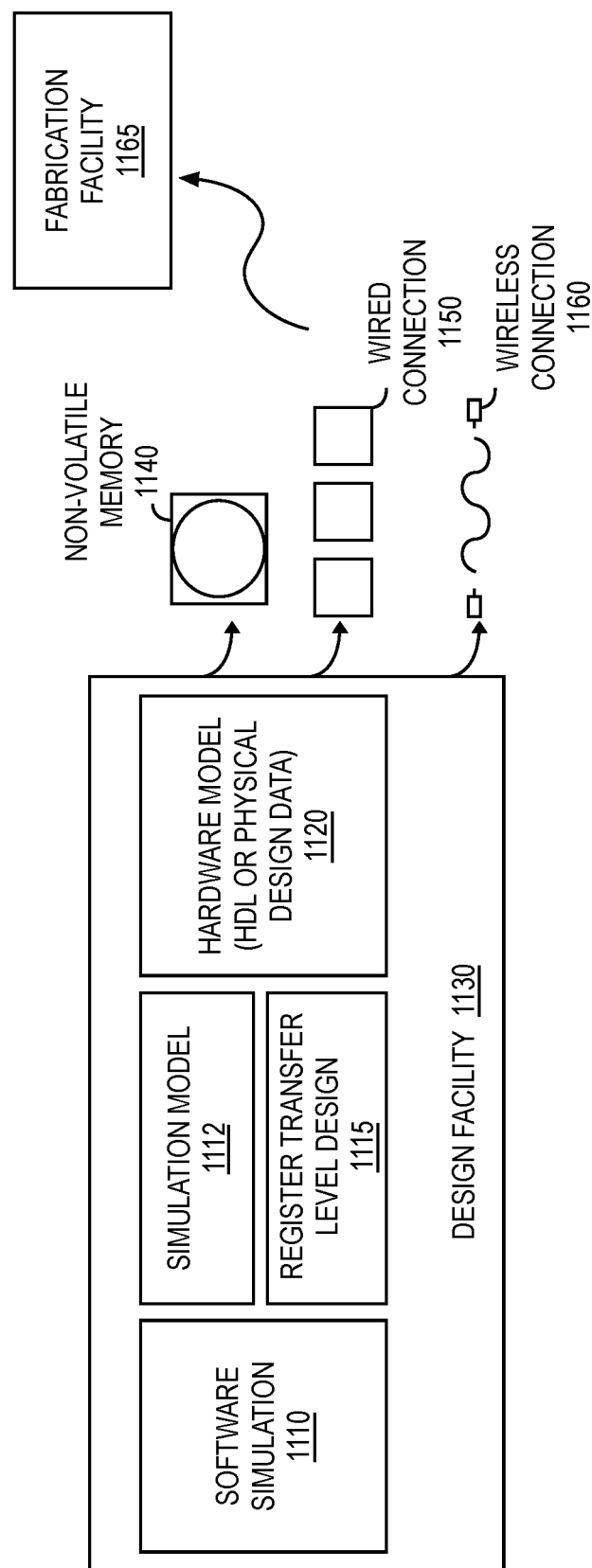
FIG. 11A is a block diagram illustrating an IP core development system, according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
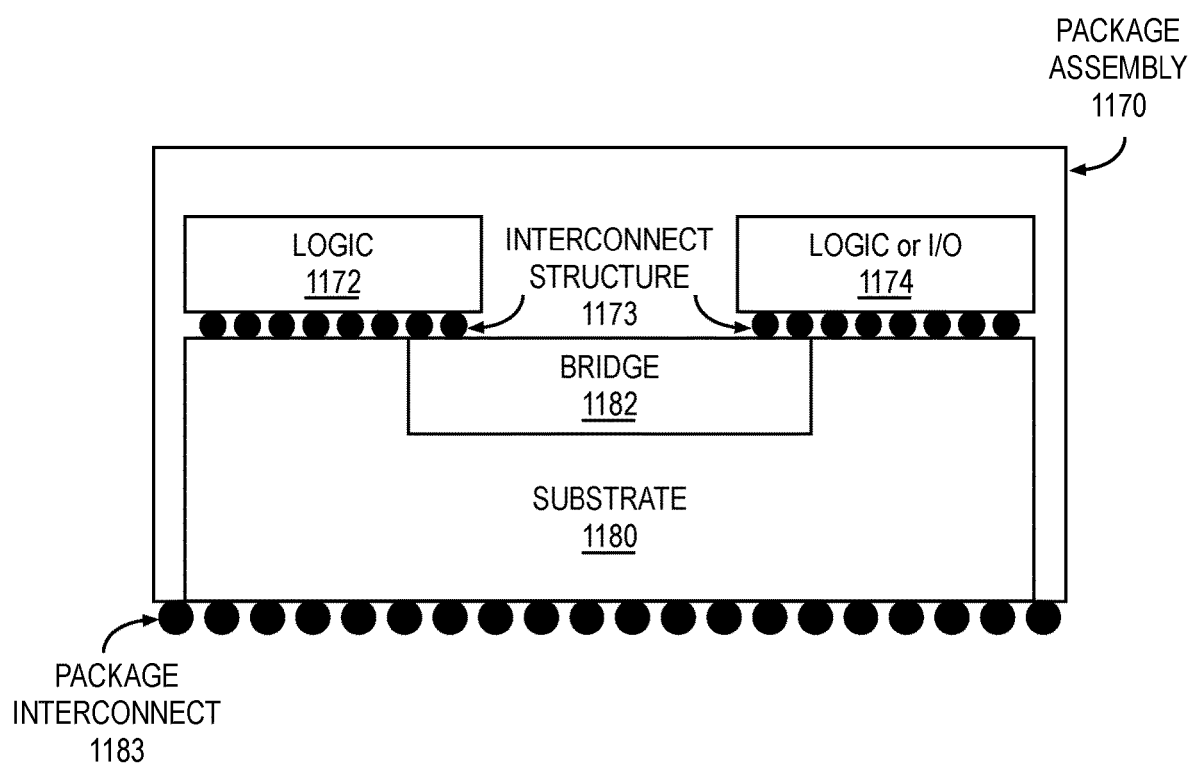
FIG. 11B illustrates a cross-section side view of an integrated circuit package assembly, according to some embodiments described herein.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 11C:
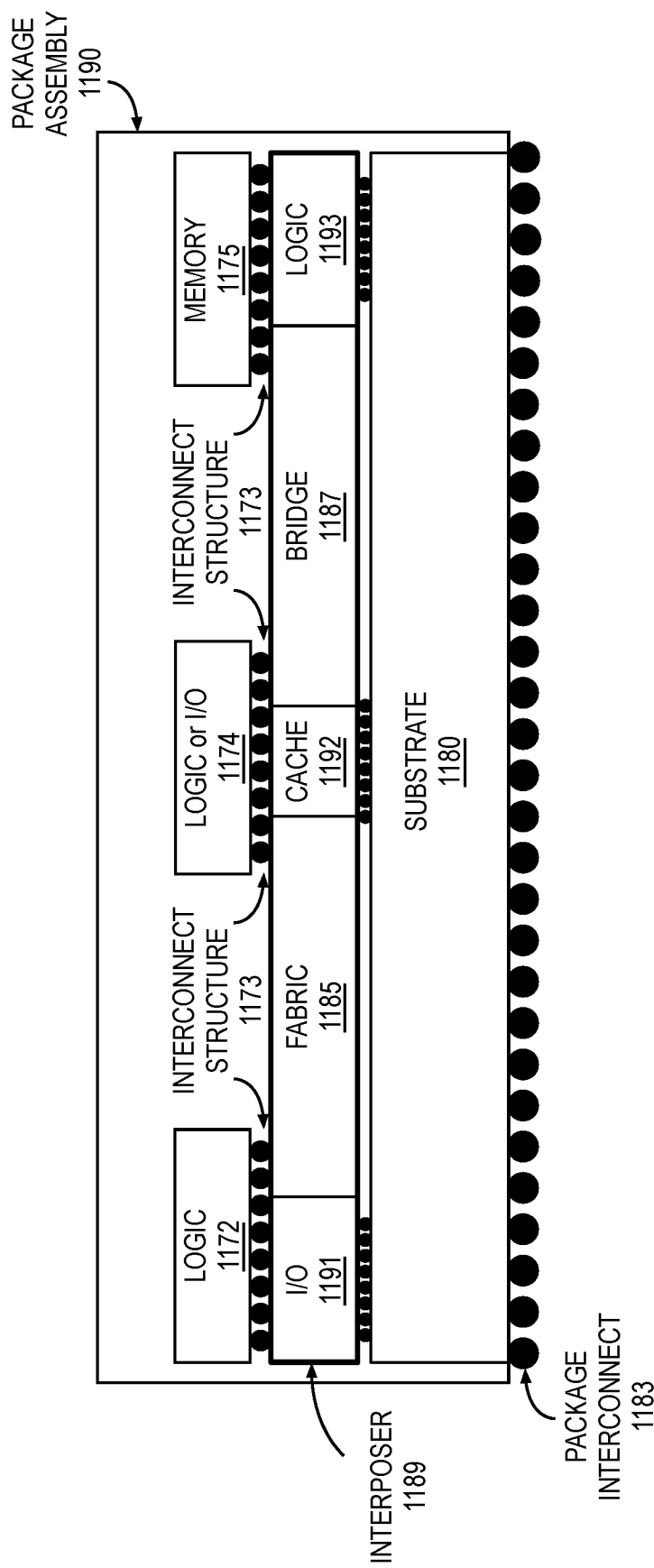
FIG. 11C illustrates a package assembly that includes multiple units of hardware logic chiplets connected to a substrate.

FIG. 11C illustrates a package assembly 1190 that includes multiple units of hardware logic chiplets connected to a substrate 1180. A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

In various embodiments a package assembly 1190 can include components and chiplets that are interconnected by a fabric 1185 and/or one or more bridges 1187. The chiplets within the package assembly 1190 may have a 2.5D arrangement using Chip-on-Wafer-on-Substrate stacking in which multiple dies are stacked side-by-side on a silicon interposer 1189 that couples the chiplets with the substrate 1180. The substrate 1180 includes electrical connections to the package interconnect 1183. In one embodiment the silicon interposer 1189 is a passive interposer that includes through-silicon vias (TSVs) to electrically couple chiplets within the package assembly 1190 to the substrate 1180. In one embodiment, silicon interposer 1189 is an active interposer that includes embedded logic in addition to TSVs. In such embodiment, the chiplets within the package assembly 1190 are arranged using 3D face to face die stacking on top of the active interposer 1189. The active interposer 1189 can include hardware logic for I/O 1191, cache memory 1192, and other hardware logic 1193, in addition to interconnect fabric 1185 and a silicon bridge 1187. The fabric 1185 enables communication between the various logic chiplets 1172, 1174 and the logic 1191, 1193 within the active interposer 1189. The fabric 1185 may be an NoC interconnect or another form of packet switched fabric that switches data packets between components of the package assembly. For complex assemblies, the fabric 1185 may be a dedicated chiplet enables communication between the various hardware logic of the package assembly 1190.

Bridge structures 1187 within the active interposer 1189 may be used to facilitate a point to point interconnect between, for example, logic or I/O chiplets 1174 and memory chiplets 1175. In some implementations, bridge structures 1187 may also be embedded within the substrate 1180. The hardware logic chiplets can include special purpose hardware logic chiplets 1172, logic or I/O chiplets 1174, and/or memory chiplets 1175. The hardware logic chiplets 1172 and logic or I/O chiplets 1174 may be implemented at least partly in configurable logic or fixed-functionality logic hardware and can include one or more portions of any of the processor core(s), graphics processor(s), parallel processors, or other accelerator devices described herein. The memory chiplets 1175 can be DRAM (e.g., GDDR, HBM) memory or cache (SRAM) memory. Cache memory 1192 within the active interposer 1189 (or substrate 1180) can act as a global cache for the package assembly 1190, part of a distributed global cache, or as a dedicated cache for the fabric 1185.

Each chiplet can be fabricated as separate semiconductor die and coupled with a base die that is embedded within or coupled with the substrate 1180. The coupling with the substrate 1180 can be performed via an interconnect structure 1173. The interconnect structure 1173 may be configured to route electrical signals between the various chiplets and logic within the substrate 1180. The interconnect structure 1173 can include interconnects such as, but not limited to bumps or pillars. In some embodiments, the interconnect structure 1173 may be configured to route electrical signals such as, for example, input/output (I/O) signals and/or power or ground signals associated with the operation of the logic, I/O and memory chiplets. In one embodiment, an additional interconnect structure couples the active interposer 1189 with the substrate 1180.

In some embodiments, the substrate 1180 is an epoxy-based laminate substrate. The substrate 1180 may include other suitable types of substrates in other embodiments. The package assembly 1190 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, a logic or I/O chiplet 1174 and a memory chiplet 1175 can be electrically coupled via a bridge 1187 that is configured to route electrical signals between the logic or I/O chiplet 1174 and a memory chiplet 1175. The bridge 1187 may be a dense interconnect structure that provides a route for electrical signals. The bridge 1187 may include a bridge substrate composed of glass or a suitable semiconductor material. Electrical routing features can be formed on the bridge substrate to provide a chip-to-chip connection between the logic or I/O chiplet 1174 and a memory chiplet 1175. The bridge 1187 may also be referred to as a silicon bridge or an interconnect bridge. For example, the bridge 1187, in some embodiments, is an Embedded Multi-die Interconnect Bridge (EMIB). In some embodiments, the bridge 1187 may simply be a direct connection from one chiplet to another chiplet.

Figure 11D:
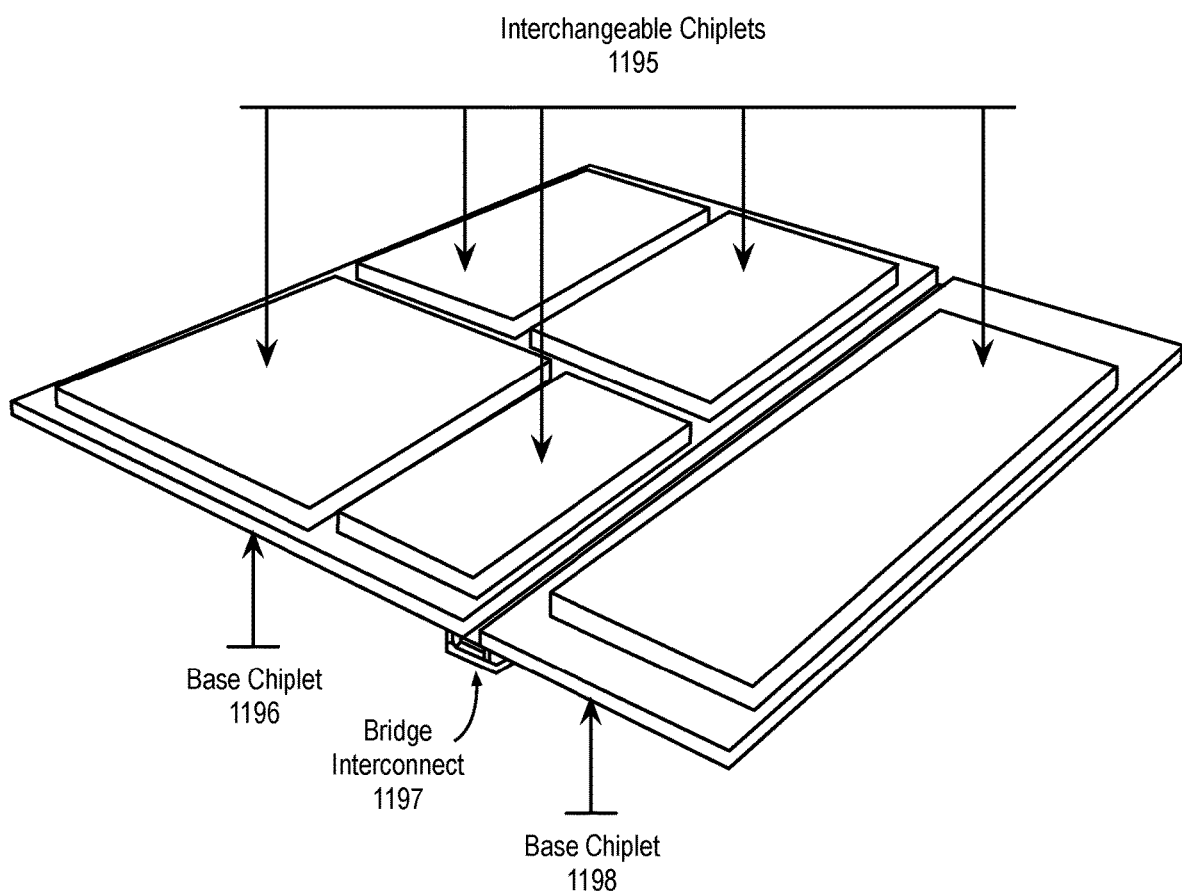
FIG. 11D illustrates a package assembly including interchangeable chiplets, according to an embodiment.

FIG. 11D illustrates a package assembly 1194 including interchangeable chiplets 1195, according to an embodiment. The interchangeable chiplets 1195 can be assembled into standardized slots on one or more base chiplets 1196, 1198. The base chiplets 1196, 1198 can be coupled via a bridge interconnect 1197, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 1196, 1198, which can be fabricated using a different process technology relative to the interchangeable chiplets 1195 that are stacked on top of the base chiplets. For example, the base chiplets 1196, 1198 can be fabricated using a larger process technology, while the interchangeable chiplets can be manufactured using a smaller process technology. One or more of the interchangeable chiplets 1195 may be memory (e.g., DRAM) chiplets. Different memory densities can be selected for the package assembly 1194 based on the power, and/or performance targeted for the product that uses the package assembly 1194. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 12:
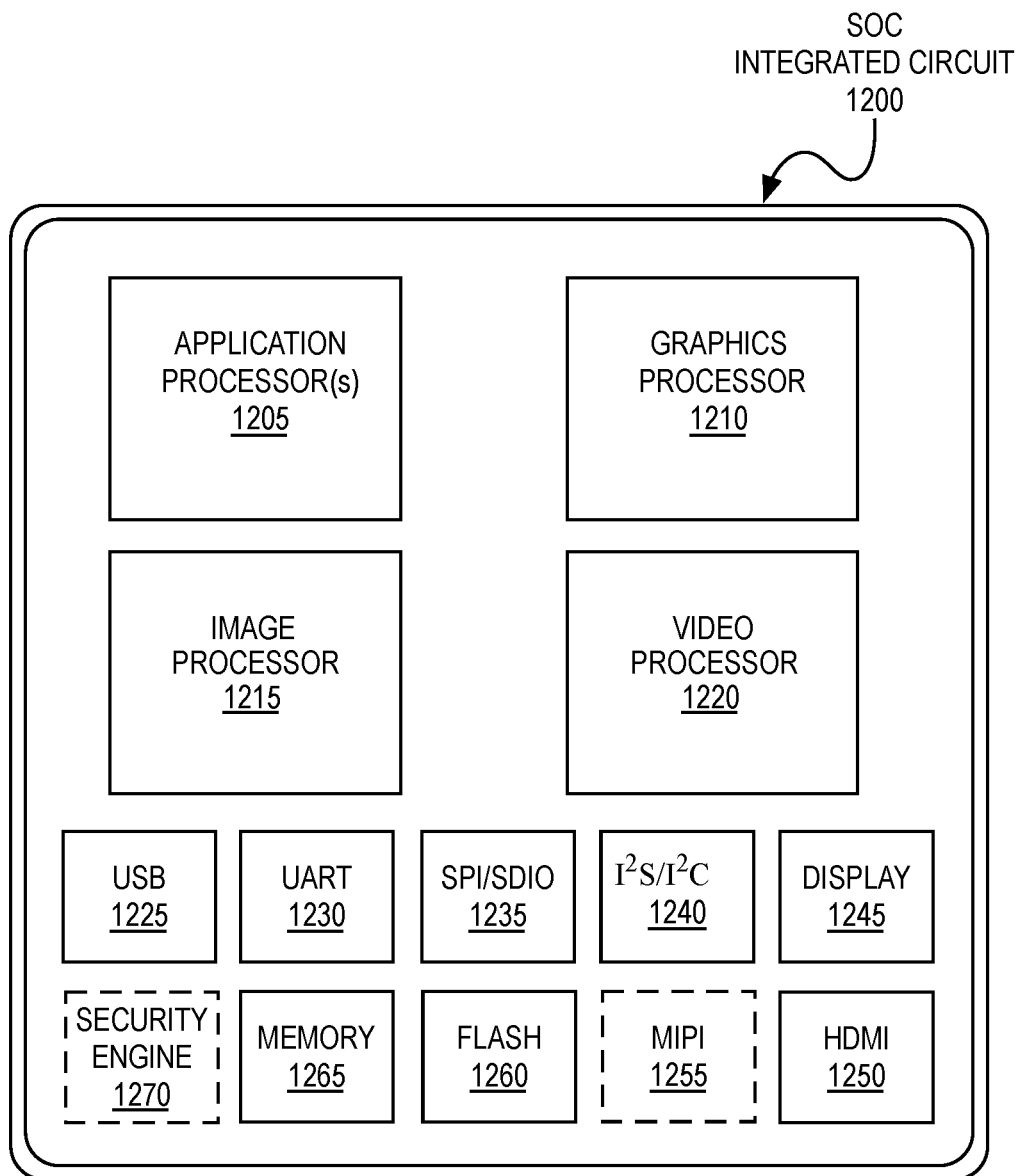
FIG. 12 illustrates an exemplary integrated circuits that may be fabricated using one or more IP cores, according to various embodiments described herein.
Figure 13A:
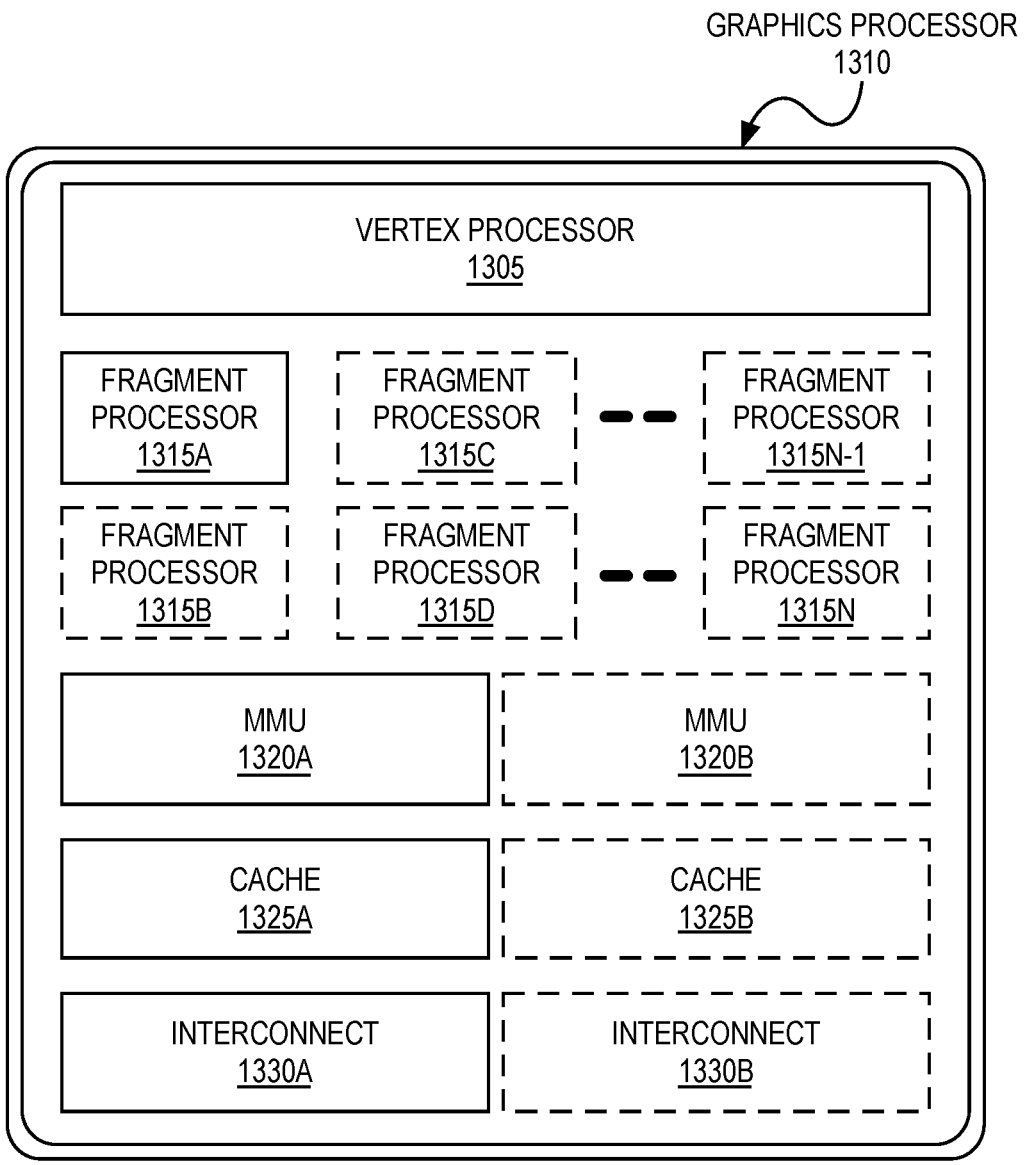
FIG. 13A-13B illustrates exemplary graphics processors that may be fabricated using one or more IP cores, according to various embodiments described herein.
Figure 13B:
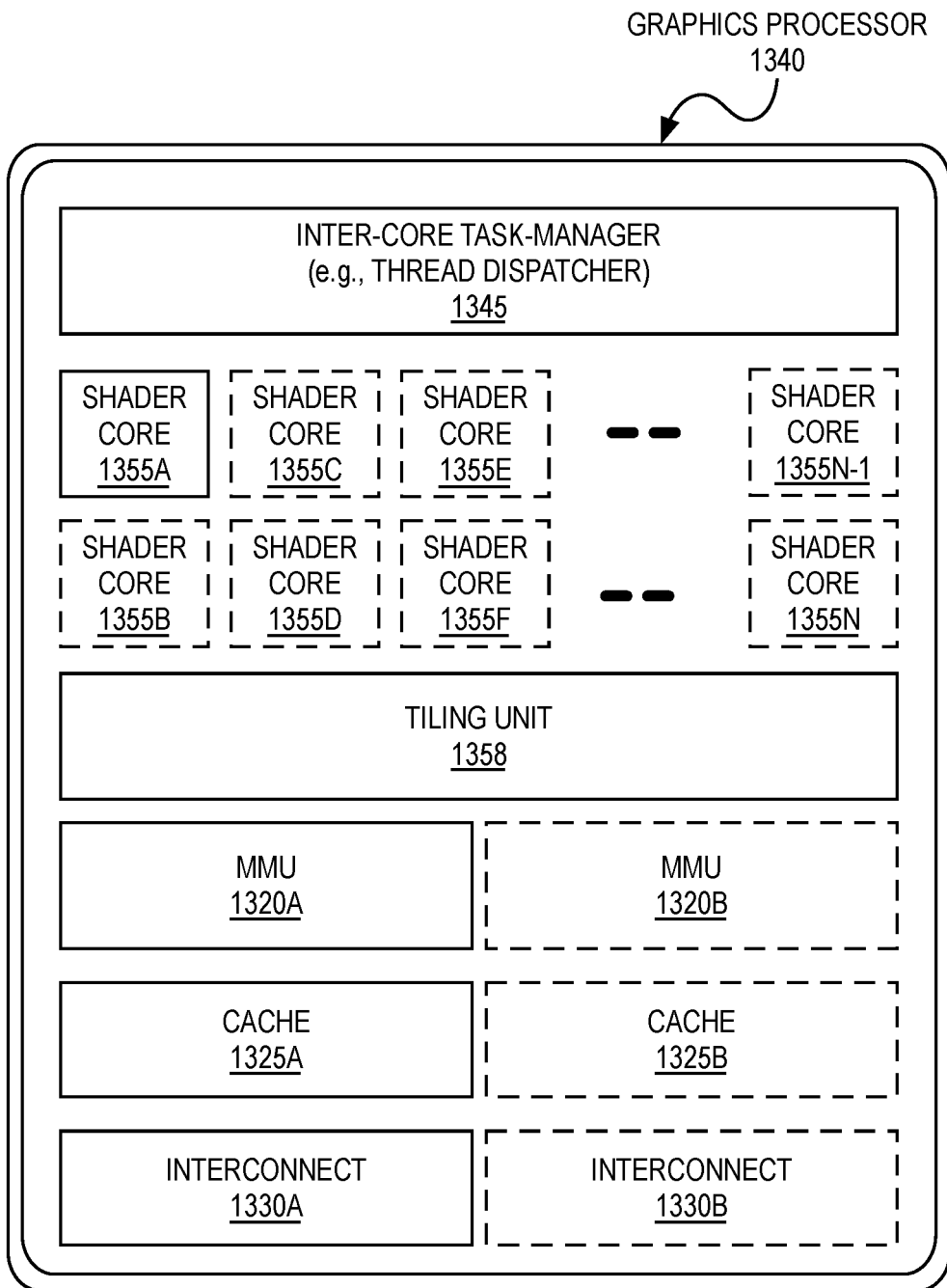

FIG. 12 and FIG. 13A-13B illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of graphics processor 1310 and graphics processor 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, cache(s) 1325A-1325B, and circuit interconnect(s) 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The unified shader core architecture is also configurable to execute direct compiled high-level GPGPU programs (e.g., CUDA). The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

System Architecture for Cloud Gaming

Figure 14:
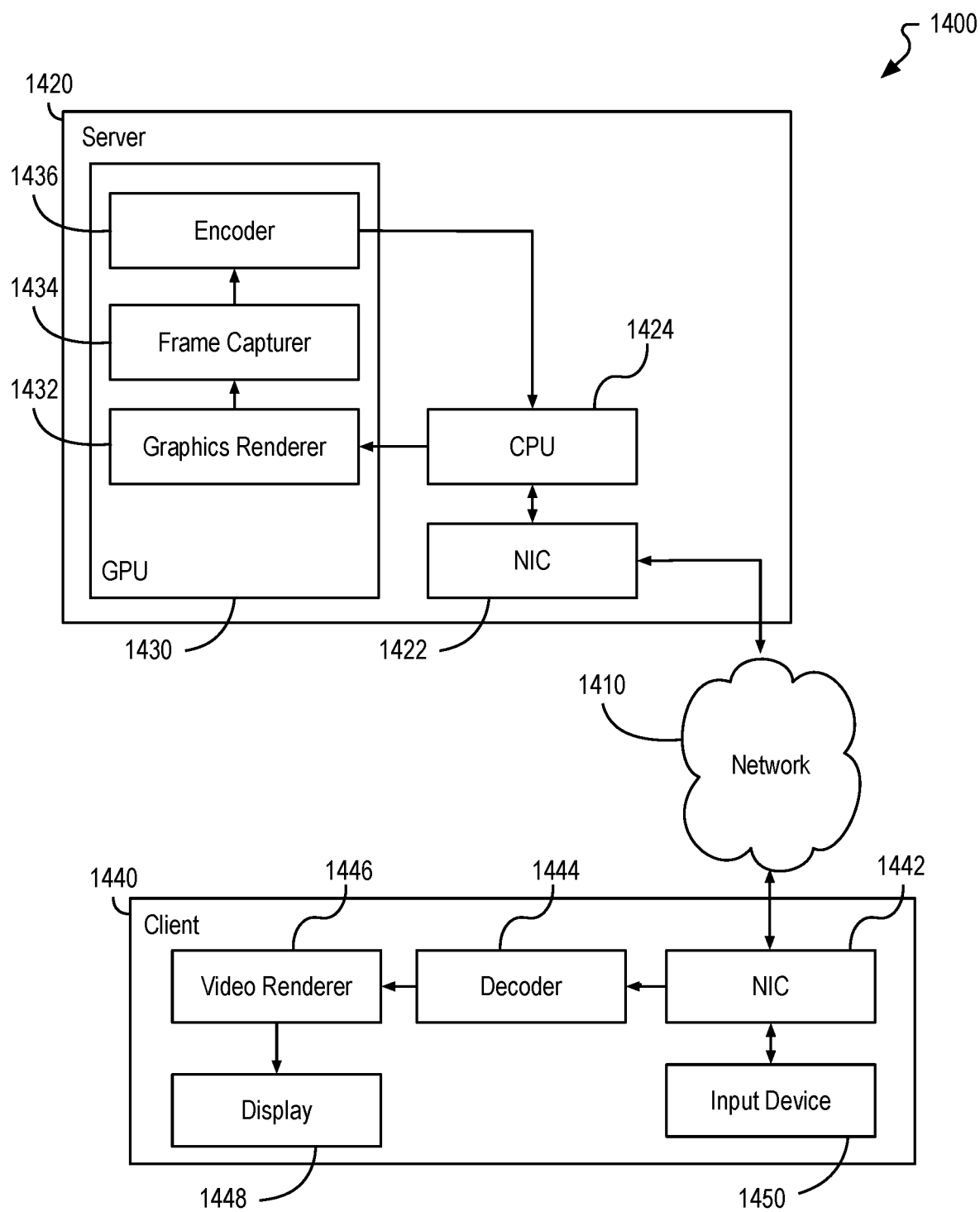
FIG. 14 illustrates a frame encode and decode for a cloud gaming system.

FIG. 14 illustrates a frame encode and decode for a cloud gaming system 1400. The client 1440 may generally be a consumer of graphics (e.g., gaming, virtual reality/VR, augmented reality/AR) content that is housed, processed and rendered on the server 1420. The illustrated server 1420, which may be scalable, has the capacity to provide the graphics content to multiple clients simultaneously (e.g., by leveraging parallel and apportioned processing and rendering resources). The server 1420 includes a graphics processor 1430 (e.g., GPU), a host processor 1424 (e.g., CPU) and a network interface controller (NIC) 1422. The NIC 1422 may receive a request from the client 1440 for graphics content. The request from the client 1440 may cause the graphics content to be retrieved from memory via an application executing on the host processor 1424. The host processor 1424 may carry out high level operations such as, for example, determining position, collision and motion of objects in a given scene. Based on the high-level operations, the host processor 1424 may generate rendering commands that are combined with the scene data and executed by the graphics processor 1430. The rendering commands may cause the graphics processor 1430 to define scene geometry, shading, lighting, motion, texturing, camera parameters, etc., for scenes to be presented via the client 1440.

More particularly, the illustrated graphics processor 1430 includes a graphics renderer 1432 that executes rendering procedures according to the rendering commands generated by the host processor 1424. The output of the graphics renderer 1432 may be a stream of raw video frames that are provided to a frame capturer 1434. The illustrated frame capturer 1434 is coupled to an encoder 1436, which may compress/format the raw video stream for transmission over the network 1410. The encoder 1436 may use a wide variety of video compression algorithms such as, for example, the H.264 standard from the International Telecommunication Union Telecommunication Standardization Sector (ITUT), the MPEG4 Advanced Video Coding (AVC) Standard from the International Organization for the Standardization/International Electrotechnical Commission (ISO/IEC), and so forth.

The illustrated client 1440, which may be a desktop computer, notebook computer, tablet computer, convertible tablet, wearable device, mobile internet device, smartphone device, personal digital assistant, media player, etc., includes an NIC 1442 to receive the transmitted video stream from the server 1420. The NIC 1422, may include the physical layer and the basis for the software layer of the network interface in the client 1440 in order to facilitate communications over the network 1410. The client 1440 may also include a decoder 1444 that employs the same formatting/compression scheme of the encoder 1436. Thus, the decompressed video stream may be provided from the decoder 1444 to a video renderer 1446. The illustrated video renderer 1446 is coupled to a display 1448 that visually presents the graphics content.

The client 1440 can conduct real-time interactive data streaming that includes the collection of user input from an input device 1450 and delivery of the user input to the server 1420 via the network 1410. This real-time interactive component of cloud gaming may pose challenges with regard to latency. Described herein is a cloud gaming system that enables non-latency sensitive games to be executed in a cloud datacenter, while more latency sensitive games are executed on servers at the edge of the cloud gaming network. The edge servers can be distributed geographically, enabling a server to be selected that has a relatively lower latency to the client device. Where a client device includes a high-performance GPU and/or for extremely latency sensitive games, graphics operations for a cloud-based game can be performed directly on the client device. In such scenario, both the server 1420 and client 1440 can reside on the same computing device, with the network 1410 being an internal network connection on the client.

Figure 15:
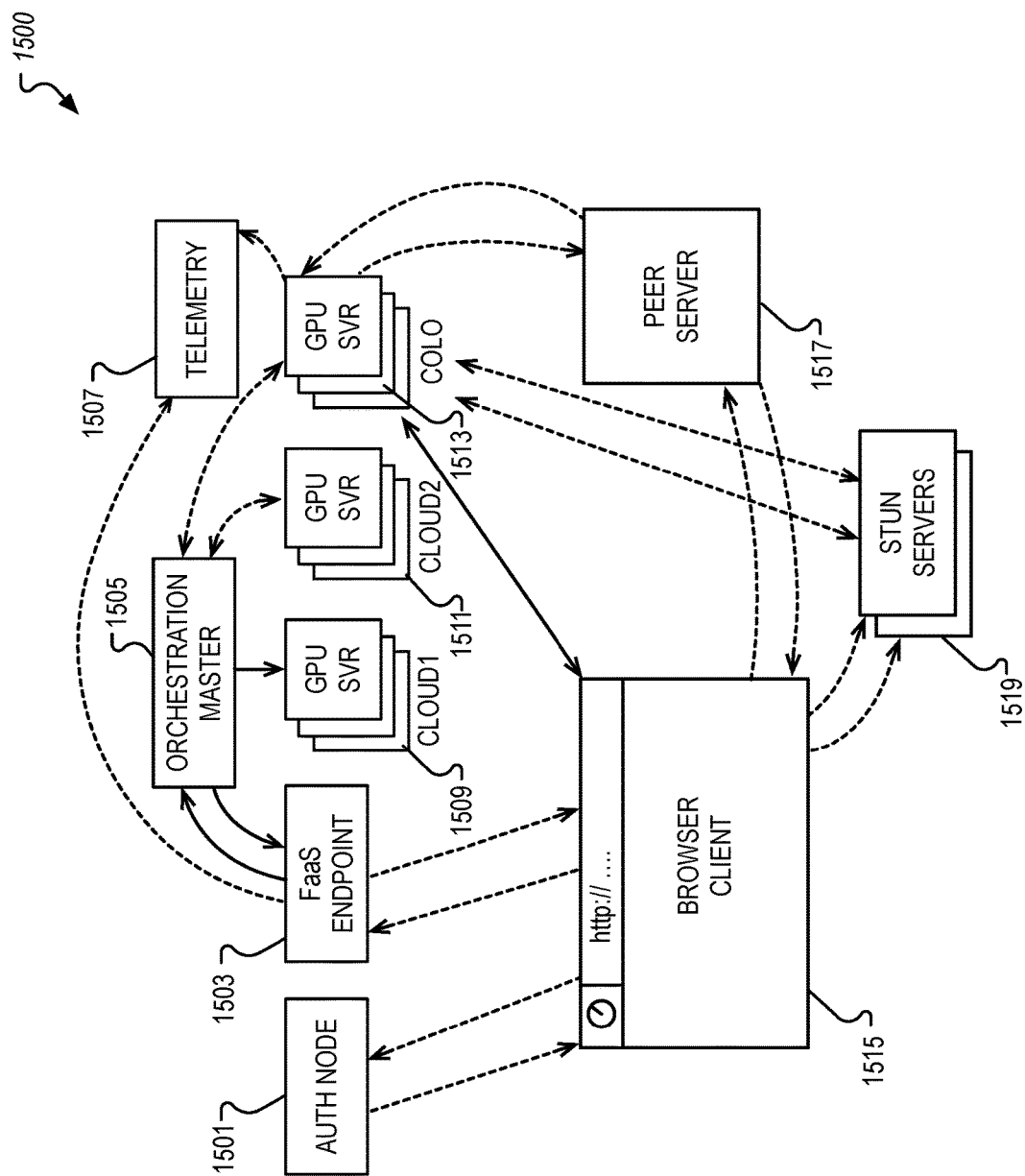
FIG. 15 illustrates a cloud gaming system in which game servers are distributed across multiple cloud and datacenter systems.

FIG. 15 illustrates a cloud gaming system 1500 in which game servers are distributed across multiple cloud and datacenter systems. The cloud gaming system 1500 includes a cloud authentication node 1501 and a function as a service (FaaS) endpoint 1503, which are each in electronic communication with a browser client 1515. The cloud gaming system 1500 also includes a telemetry server 1507 that receives system telemetry from the FaaS endpoint 1503 and GPU servers that are executing game applications. The cloud gaming system 1500 additionally includes a peer server 1517 and STUN servers 1519 that facilitate the establishment of a network connection between clients and the GPU servers.

In one embodiment the cloud gaming system 1500 includes an orchestration master 1505 that manages execution nodes and storage containers for the cloud gaming system 1500, as well as multiple sets of GPU servers 1509, 1511, 1513. The multiple sets of GPU servers can reside on different cloud networks associated with different cloud services providers or colocation datacenters. For example, a first set of GPU servers 1509 can be provided by a first cloud service provider (e.g., Microsoft Azure). A second set of GPU servers 1511 can be provided by a second cloud service provider (e.g., Amazon Web Services). A third set of GPU servers 1513 can be colocated servers hosted at one or more colocation data centers. In one embodiment the cloud gaming system 1500 is implemented in part using Kubernetes, although not all embodiments are limited as such. In such embodiments, the orchestration master 1505 can be a Kubernetes master and the GPU servers can include kubelet node agents.

During operation, the browser client 1515, or another cloud gaming client, such as a cloud gaming client application, can communicate with the cloud authentication node 1501 to authenticate the client with the cloud gaming system 1500. The cloud authentication node 1501 returns an authorization token to the browser client 1515. The browser client 1515 can use the authorization token request a game launch via the FaaS endpoint 1503. The FaaS endpoint 1503 communicates with the orchestration master 1505 to start a game. The games can be launched from a container that runs on a game server. The orchestration master 1505 selects a server from the sets of GPU servers 1509, 1511, 1513 to become the game server for the game to be launched. In one embodiment, the orchestration master 1505 can initiate execution of a pod on the selected GPU server. The pod is a grouping of containerized components provided by or more containers that are located on the same server. Containers within a pod can share resources. The orchestration master 1505 then returns a unique session ID to the FaaS endpoint 1503. The FaaS endpoint 1503 then provides the unique session ID to the browser client 1515 and the GPU server that is selected from the sets of GPU servers 1509, 1511, 1513.

The browser client 1515 can then communicate with one or more session traversal of User Datagram Protocol (UDP) through Network Address Translator (NAT) servers (e.g., STUN servers 1519) to enable the browser client to connect to a GPU server in the sets of GPU servers 1509, 1511, 1513. For example, the STUN servers 1519 enable the browser client 1515 and the selected GPU server to determine their respective public IP addresses. In one embodiment, the public IP address returned to the GPU server is the public IP address associated with pod associated with the game to be executed by the GPU server. The browser client 1515 and the selected GPU server can reach register with the peer server 1517 using a <session ID, public IP> tuple, where the session ID is the unique session ID provided by the FaaS endpoint 1503 and the public IP is the public IP provided by the STUN server 1519. The peer server 1517 informs the browser client 1515 of the existence of the selected GPU server. The peer server 1517 also informs the selected GPU server of the existence of the browser client 1515. Once informed of each other's existence, the browser client 1515 and the selected GPU server can establish a UDP WebRTC connection to enable gameplay to begin. During gameplay, the FaaS endpoint 1503 and the selected GPU server (illustrated as selected from a colocated set of GPU servers 1513) can transmit telemetry to the telemetry server 1507.

Figure 16:
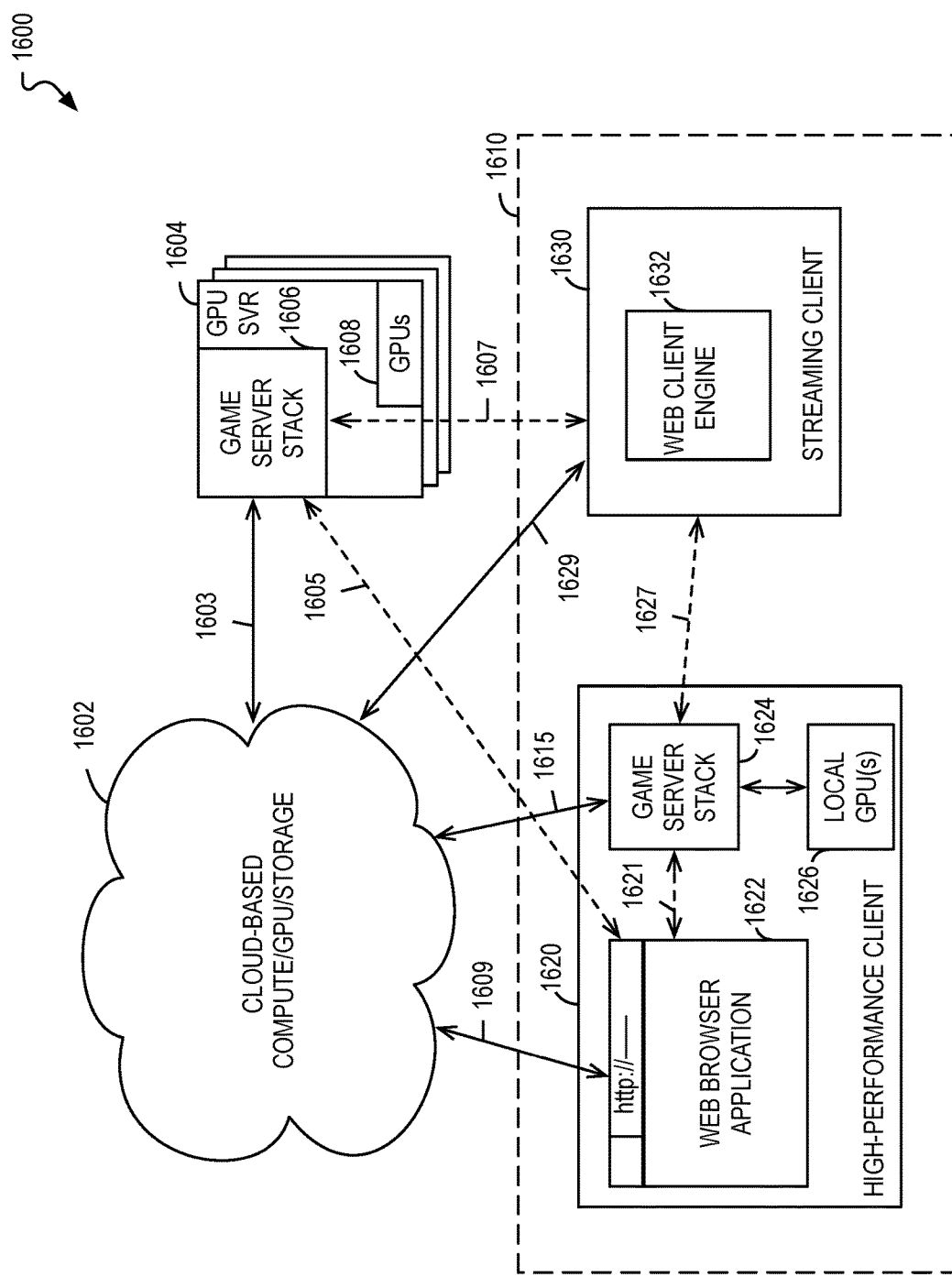
FIG. 16 illustrates a cloud gaming system in which graphics processing operations can be performed using cloud, edge, or client-based compute resources.

FIG. 16 illustrates a cloud gaming system 1600 in which graphics processing operations can be performed using cloud, edge, or client-based compute resources. In one embodiment the system includes a cloud-based compute, GPU, and storage system 1602 that is coupled, via a wide area network (WAN), such as the Internet, to edge GPU servers 1604 and one or more end clients (e.g., high-performance client 1620, streaming client 1630) within a client endpoint 1610, such as a home network of a user of the cloud gaming system 1600. The cloud gaming system 1600 described herein enables a game application, without modification, to be executed using remote (e.g., cloud, edge) compute and/or GPU resources. Games that require a high level of graphics processing capability can be played on a streaming client 1630, such as a thin client with limited graphics processing capabilities relative to a high-performance computing device. The streaming client 1630 can be, for example, a television or television set top box, a gaming console, a streaming-based gaming console, or a media streaming device. The streaming client 1630 can include a web browser or a streaming application that includes a web client engine 1632 that is used to connect with a server of the cloud-based compute, GPU, and storage system 1602 or an edge network GPU server 1604 and receive a stream of game application frames from those servers.

In one embodiment the cloud-based compute, GPU, and storage system 1602 can include a set of interconnected datacenters that house a large number of compute and storage resources. The cloud-based compute, GPU, and storage system 1602 can provide storage resources on which application data for games provided by the cloud gaming system 1600 may be stored. For certain games, compute and/or GPU resources of the cloud-based compute, GPU, and storage system 1602 can be used to execute those games. In particular, games that are not extremely latency sensitive can be executed using compute or GPU resources of the cloud-based compute, GPU, and storage system 1602.

For games that are latency sensitive, compute and/or GPU resources of a GPU server 1604 that is located at the edge of the cloud gaming system 1600 can be used. In one embodiment, the GPU server 1604 can be located at a datacenter that is proximate to the end user, which reduces the perceived input latency associated with the executed game application. The GPU server 1604 can include a set of high-performance GPUs 1608 that can be used to execute a game server stack 1606. In one configuration, graphics processing operations for a single instance of a game can be performed by a single GPU or a portion of a GPU (e.g., GPU tile). In other configurations, multiple GPU tiles and/or multiple GPUs can cooperatively execute a game application. For example, graphics driver managed implicit multi-GPU processing can be performed. For games that include support for explicit multi-GPU processing, graphics processing for the game can be distributed across multiple graphics processing devices.

For games that are extremely latency sensitive, the cloud gaming system 1600 described herein also enables local graphics processing for cloud-based games when the client endpoint 1610 includes a high-performance client 1620, such as a desktop or laptop gaming system with a powerful graphics processor. The cloud gaming system 1600 can enable at least a portion of the graphics processing activities for the game to be executed by one or more local GPUs 1626 on the high-performance client 1620 when a cloud-based game is played on the high-performance client 1620. In one embodiment, graphics processing for games that are played on the streaming client 1630 within the client endpoint 1610 can also be performed on the high-performance client 1620, with output rendered on the high-performance client 1620 being streamed to the streaming client 1630.

When graphics operations of a game are to be performed on a high-performance client 1620, a version of the game server stack 1624 can be retrieved from the cloud-based compute, GPU, and storage system 1602. The game server stack 1624 can then execute using one or more local GPUs 1626 on the high-performance client 1620. The game can be played via a web browser application 1622 or a dedicated streaming client that is configured to communicate with the game server stack, the cloud-based compute, GPU, and storage system 1602, and/or one or more GPU servers 1604.

In one embodiment, the various clients and servers of the cloud gaming system 1600 can communicate via network links 1603, 1605, 1607, 1609, 1615, 1629. In one embodiment, network link 1603 established between the GPU servers 1604 and the cloud-based compute, GPU, and storage system 1602 enable the GPU servers 1604 to access remote storage that stores games to be executed by the GPU servers 1604 and to receive control signals to launch and terminate game applications. Game data retrieved from the cloud-based storage can be cached by the GPU servers 1604.

Rendered frames for the application can be streamed to the streaming client 1630 (via network link 1607) or high-performance client 1620 (via network link 1605). Where a game application is executed at least in part on the high-performance client 1620, a network link 1621 can be used to enable communication between the web browser application 1622 and the game server stack 1624. Network link 1609 can be used to launch a game application and the output of the game server stack 1624 can be streamed to the web browser application 1622 over network link 1621. Network link 1615 enables the game server stack 1624 to access application data for the game to be executed. Where a game is played on the streaming client 1630 and executed on the high-performance client 1620, a network link 1627 can be established to stream rendered frames to the streaming client 1630. The streaming client 1630 can use network link 1629 to launch a cloud game to be played via the streaming client. In one embodiment, network links 1603, 1609, 1615, and 1629, which are used to transmit application data and control signals, use a connection-oriented protocol, such as transmission control protocol (TCP). In one embodiment, network links 1605, 1607, 1621, and 1627, which are used to stream rendered game output, use a connectionless protocol, such as the user datagram protocol (UDP).

The game application can be encapsulated into a game server stack 1606 without requiring modifications to the game application. The game server stack 1606 can include a compartmentalized, containerized, and/or virtualized game application, along with the associated resources and APIs used to execute the game application. In one embodiment, the libraries and APIs used by the game application are modified to enable the game to work in a cloud gaming environment, as detailed in FIG. 17A-17B.

Figure 17A:
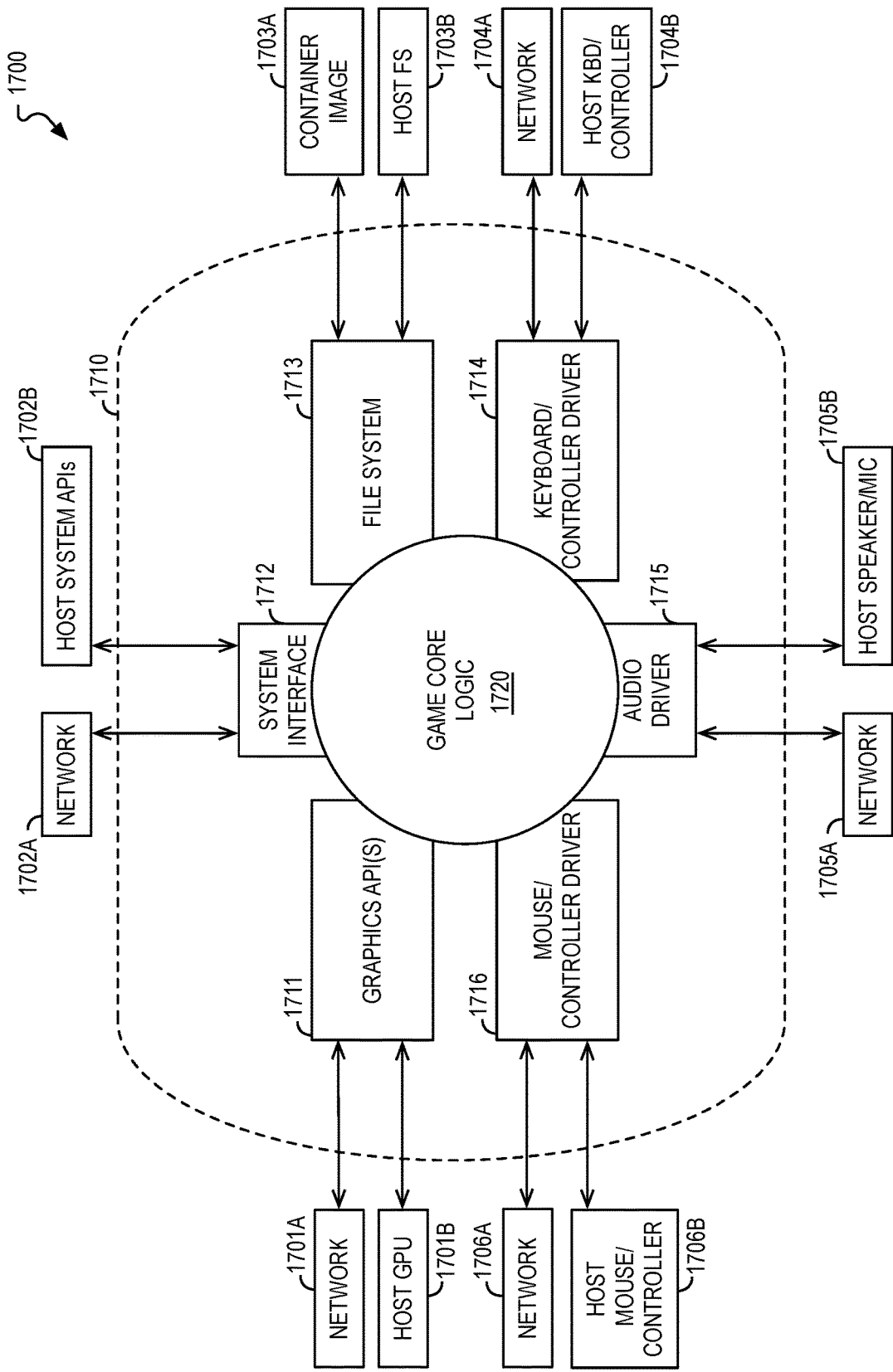
FIG. 17A-17B illustrates a system and method of encapsulation for a game application to enable the game to be played on a server and/or client device.
Figure 17B:
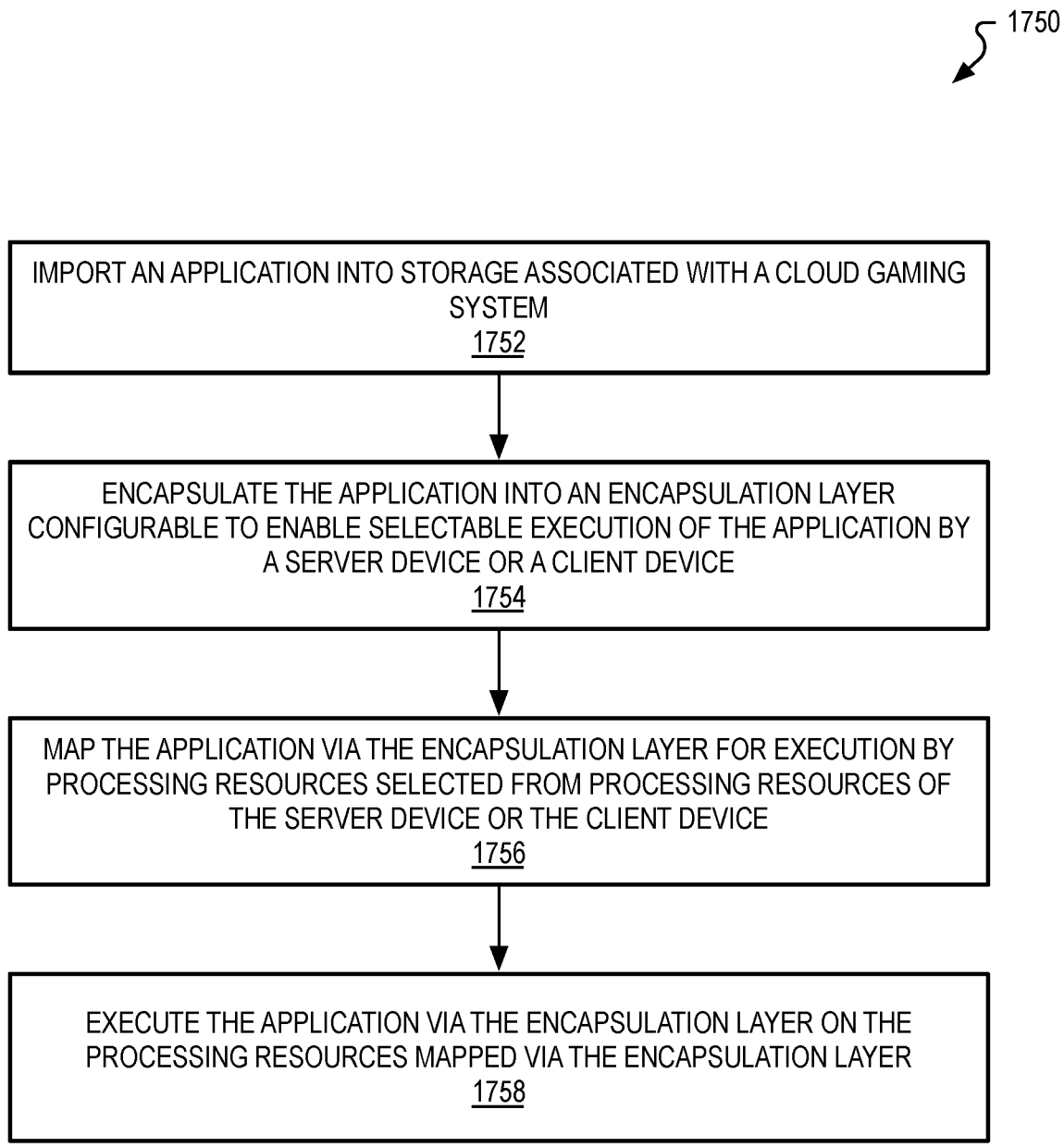

FIG. 17A-17B illustrates a system 1700 and method 1750 of encapsulation for a game application to enable the game to be played on a server and/or client device. FIG. 17A illustrates a system 1700 to encapsulate a cloud-based game intro an encapsulation layer that enables the cloud-based game to be executed on a server or client device. FIG. 17B illustrates a method 1750 to encapsulate a cloud-based game.

As shown in FIG. 17A, the game server stack for a cloud-based game includes a container image. The container image includes application files and libraries that are executed as the process 1710 of the game application. The process 1710 of the game application includes the game core logic 1720 and encapsulations 1701-1705 of an encapsulation layer that selectively relays API commands made by the game core logic 1720. The encapsulation layer includes encapsulations for one or more graphics APIs 1711, a system interface 1712, a file system 1713, a keyboard driver 1714, an audio driver 1715, and mouse and/or controller drivers 1716. The encapsulations can appear to the game core logic 1720 as the libraries, frameworks, and interfaces that are normally used by the game core logic 1720. The encapsulations can then relay those commands either to the host system components or to a remote computing device that is connected via a network interface.

For example, the encapsulation for the one or more graphics APIs 1711 can receive API calls made by the game core logic 1720 to a graphics API (e.g., Direct 3D, OpenGL, Vulkan) and relay those commands to a remote device connected over the network 1701A and/or the host GPU 1701B. Encapsulation for the system interface 1712 can receive system interface commands and send those commands to the network 1702A for relay to a remote device or to the appropriate host system APIs 1702B. Encapsulation for the file system 1713 can receive file system commands and satisfy those commands by accessing a container image 1703A that contains cloud game data or relay those commands to the host file system 1703B. Encapsulation for a keyboard driver 1714 can send or receive keyboard input from the network 1704A or from a host keyboard or game controller 1704B. Encapsulation for an audio driver 1715 can send or receive audio data via the network 1705A or from a host speaker/microphone 1705B. Encapsulation for an audio driver 1715 can send or receive audio data via the network 1705A or from a host speaker/microphone 1705B. Encapsulation for a mouse or game controller driver 1716 can send or receive audio data via the network 1706A or from a host mouse or game controller 1706B. Whether commands from the game core logic 1720 is sent to the local APIs or over the network is dependent in part on whether the game application is being executed on a server or client.

When the game application is executed on one or more cloud servers or on an edge server, graphics processing for the game is performed on the server or servers and the rendered output is transmitted to the cloud gaming client via the network. Remote and/or locally cached container data can store application data, configuration data, and/or save game data. Configuration data for a game may be stored on the server or servers or may be stored on the client. In one embodiment, a subset of client folders can be voluntarily mapped by the user to the server to allow the user to store a subset of game data, such as configuration data or save game data on a client and have that data accessible to the remotely executed game application. Such folders may be automatically or manually synchronized between the client and the server, allowing remote save or configuration files to be accessible locally or local save or configuration files to be backed up remotely.

When the game application is executed on a high-performance client, at least a portion of the instructions in the game server stack can be transmitted to and executed locally on the client. The encapsulation for the one or more graphics APIs 1711 receives commands from the game core logic 1720 and send those commands to one or more GPUs on the high-performance client. Accesses to the file system are relayed by the encapsulation for the file system 1713 to the container image that contain game application data or the file system of the high-performance client, depending on the game and system configuration. As with remotely executed games, a portion of the game files, such as configuration data and save game data, can be stored on the client, on the server, or synchronized between the client and the server. In one embodiment, output of the one more GPUs can be presented directly to a display window on the client. Output can also be encoded by the game server stack and transmitted to a web browser or streaming client application that is executed on the client. The data transmission between the game server stack and the browser/streaming client can be via inter-process communication or via a virtual network connection on the high-performance client. In one embodiment, output of the one or more GPUs can be encoded and transmitted to a networked streaming client that is connected with the high-performance client.

As shown in FIG. 17B, a method 1750 of encapsulating a cloud-based game includes operations to import an application into storage associated with a cloud gaming system (1752). Importing the application can occur on a cloud server when the application is integrated into the cloud gaming system. In one embodiment, importing the application can occur on a client device to enable a user to import a locally stored game to enable remote execution of the game via servers of the cloud gaming system. The method further includes to encapsulate the application into an encapsulation layer, where the encapsulation layer is configurable to enable selectable execution of the application by a server device of the cloud gaming system or a client device of the cloud gaming system (1754). In one embodiment, the encapsulated application includes core logic and multiple encapsulations associated with an encapsulation layer. The encapsulation layer is configured to selectively relay API commands made by the core logic. The method additionally includes to map the application, via the encapsulation layer, for execution by processing resources selected from a set of processing resources including processing resources of the server device a of the cloud gaming system and processing resources of the client device of the cloud gaming system (1756). The method further includes to execute the application via the encapsulation layer on the processing resources mapped via the encapsulation layer (1758). The application can be executed via the encapsulation layer on a server of the cloud gaming system or on a client device of the cloud gaming system after resources on the client device are mapped via the encapsulation layer.

Figure 18:
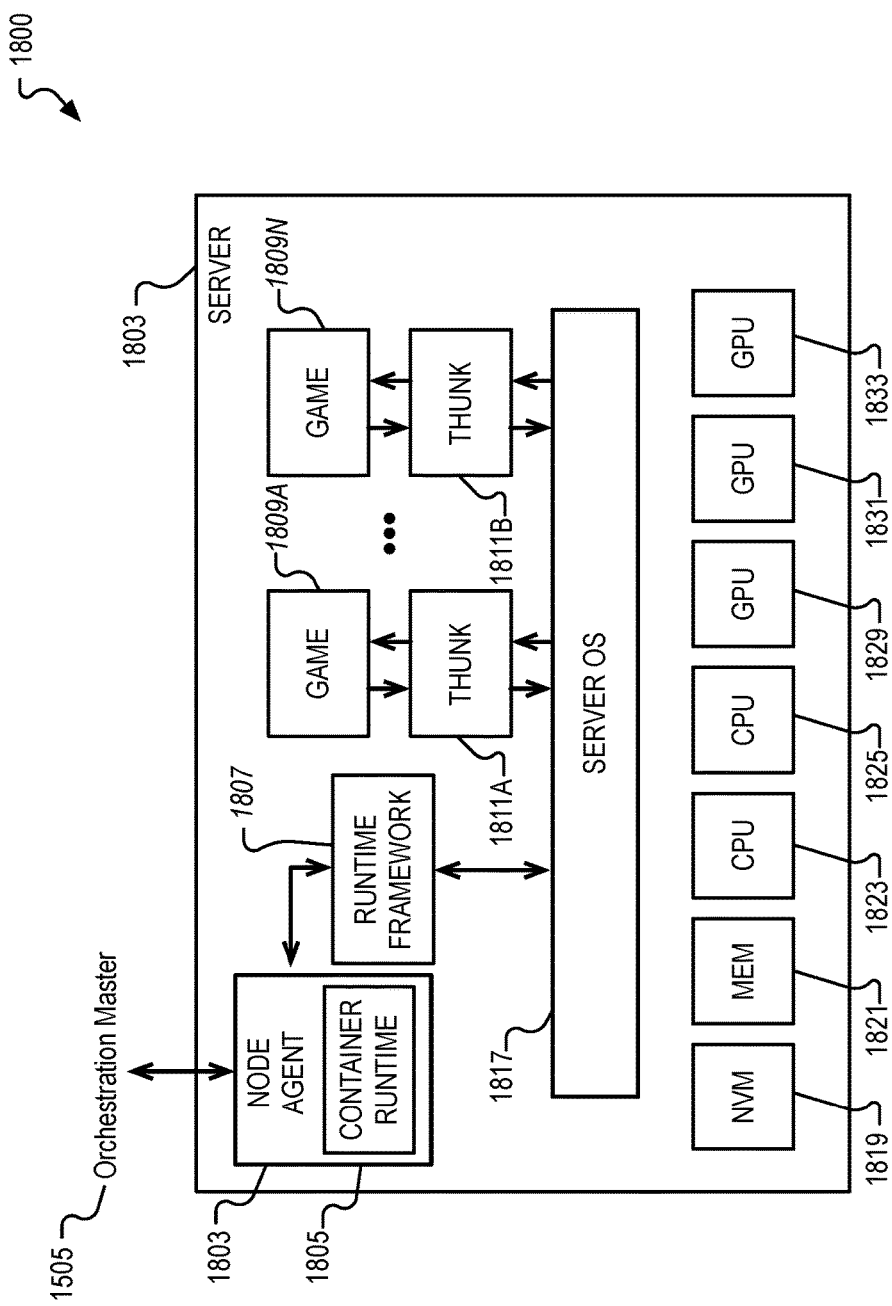
FIG. 18 illustrates an exemplary server, according to an embodiment.

FIG. 18 illustrates an exemplary server 1800, according to an embodiment. The illustrated server 1800 is representative of one embodiment, and in other embodiments configurations may differ. The server 1800 can be used as a GPU server as described herein, and includes non-volatile memory (NVM 1819), system memory (MEM 1821), a set of central processing units (CPU 1823, CPU 1825), and a set of graphics processing units (GPU 1829, 1831, 1833). The set of central processing units can execute a server operating system (server OS 1817). The server operating system can communicate with a compatible runtime framework 1807 that provides a software execution environment that enables execution of software associated with a node agent 1803. The node agent 1803 communicates with the orchestration master 1505 and includes a container runtime 1805 that facilitates execution of game application pods. The orchestration master 1505 can manage the lifecycle of a game via control of the containers associated with the game application. The game application pods executed via the container runtime 1805 are related to the game server stacks 1606, 1624 of FIG. 16. The containers provide a consistent packaging mechanism for game applications, configurations and dependencies.

The containerized game applications can be executed by the server OS 1817 via the runtime framework 1807 without requiring the use of a hypervisor. Multiple containerized game applications (e.g., game 1809A-1809N) can be executed concurrently, with API commands issued by the games 1809A-1809N managed and filtered via thunk layers 1811A-1811B that are associated with API encapsulation layers shown in FIG. 17A. In one embodiment the thunk layers enable isolation between the various games executed by the server 1800. For example, when a game 1809A-1809N is to use a standard operating system API, the thunk layers 1811A-1811B provide alternate implementations of those libraries. Furthermore, if a game 1809A-1809N attempts to access a file on a local file system, the file access may be redirected towards a cloud-based file system. Game accesses, for example, to a local keyboard, may actually be serviced by a remote keyboard.

Furthermore, when a user is to play a game 1809A-1809N from a different machine, the game can start up using the same save game data, as the data is stored in the cloud. Filesystem read/writes can be re-directed to a central place. In one configuration, some files will be coming from remote storage, while others can be stored locally. Progressive download can be used to bring in assets as needed. While assets are being downloaded, the game can be remotely executed and streamed to the client.

Figure 19:
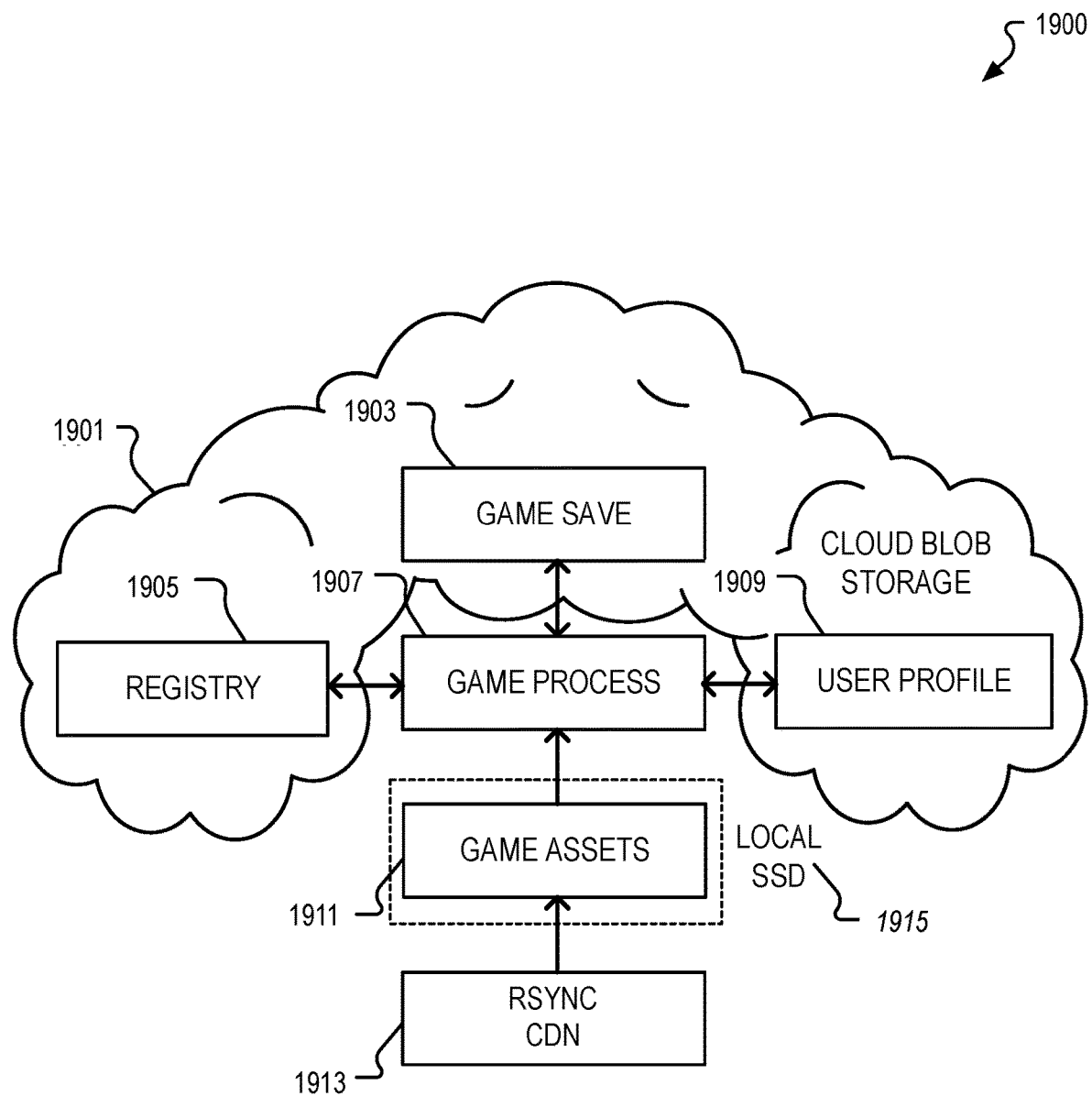
FIG. 19 illustrates a hybrid file system that can be used to enable a consistent gaming experience for locally and remotely executed games.

FIG. 19 illustrates a hybrid file system 1900 that can be used to enable a consistent gaming experience for locally and remotely executed games. In one embodiment, cloud blob storage 1901 can be used to store game and/or system registry data 1905, game save data 1903, and user profile data 1909. Data in the cloud blob storage 1901 is universally accessible to a game process 1907 whether the game process 1907 is executed by a cloud server, an edge server, or a high-performance client. Based on the user profile data 1909, game save data 1903 and game and/or system registry data 1905 can be mapped to the game process 1907 executed by the user. A remote sync 1913 can be used to enable game assets 1911 to be remotely synced from a content delivery network (CDN) to local storage (e.g., local SSD 1915) and accessed by the game process 1907. In one embodiment, the local SSD 1915 may be flash memory or other non-volatile memory that is dedicated to or directly coupled with a graphics processor. The remote sync 1913 can be performed when provisioning a remote server for game execution. The remote sync 1913 can also be performed in the background to a high-performance client during a remote gaming session. The remote sync 1913 can continue at a higher priority after the client terminates a remote gaming session. In one embodiment, the local SSD 1915 may be a GPU attached SSD that is directly connected to a graphics processor device.

Figure 20:
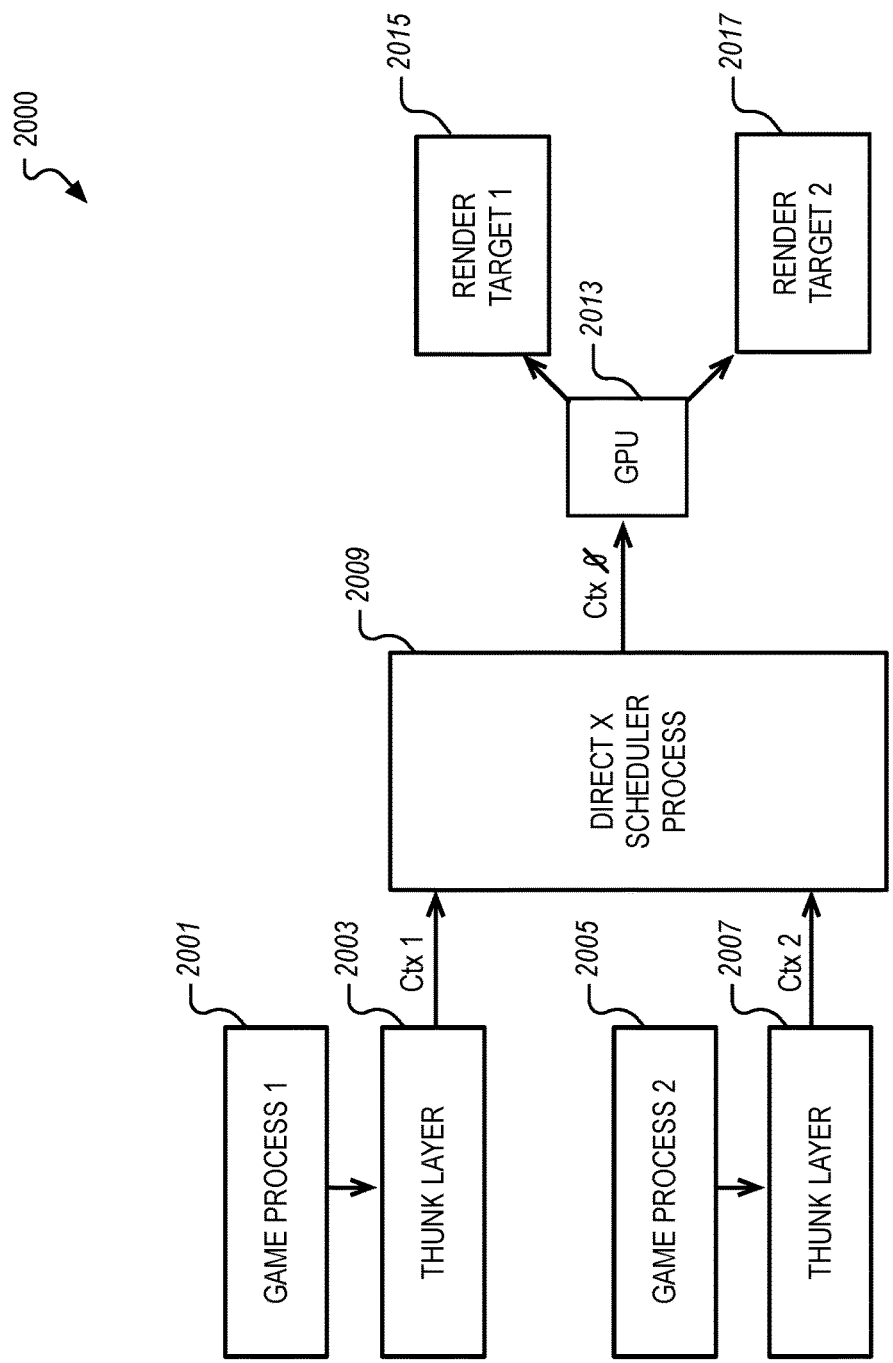
FIG. 20 illustrates a cloud gaming system in which command streams from multiple games can be combined into a single context.

FIG. 20 illustrates a cloud gaming system 2000 in which command streams from multiple games can be combined into a single context. Rendering work can be scheduled to minimize jitter in frame production. Resources between game instances can be shared. This concept can also be enhanced by the use of on-GPU non-volatile memory.

For example, a game process 2001 can communicate with a 3D API scheduler process (e.g., direct X scheduler process 2009) via a thunk layer 2003 using a first context (Ctx 1). An additional game process 2005 can communicate with the 3D API via a thunk layer 2007 using a second context (Ctx 2). The 3D API scheduler, using a third context (Ctx 0) can aggregate commands from the different games into a single context on the GPU 2013. Using the single context, the GPU can render to multiple render targets 2015, 2017, with each render target associated with a separate game. Combining the multiple games into the single context can be performed via operations at the thunk layer, which can add an additional layer of logic and abstraction into the 3D API scheduler process. Cloud gaming system 2100 of FIG. 21 illustrates that this concept can be extended to enable multiple servers to share network attached GPUs.

Figure 21:
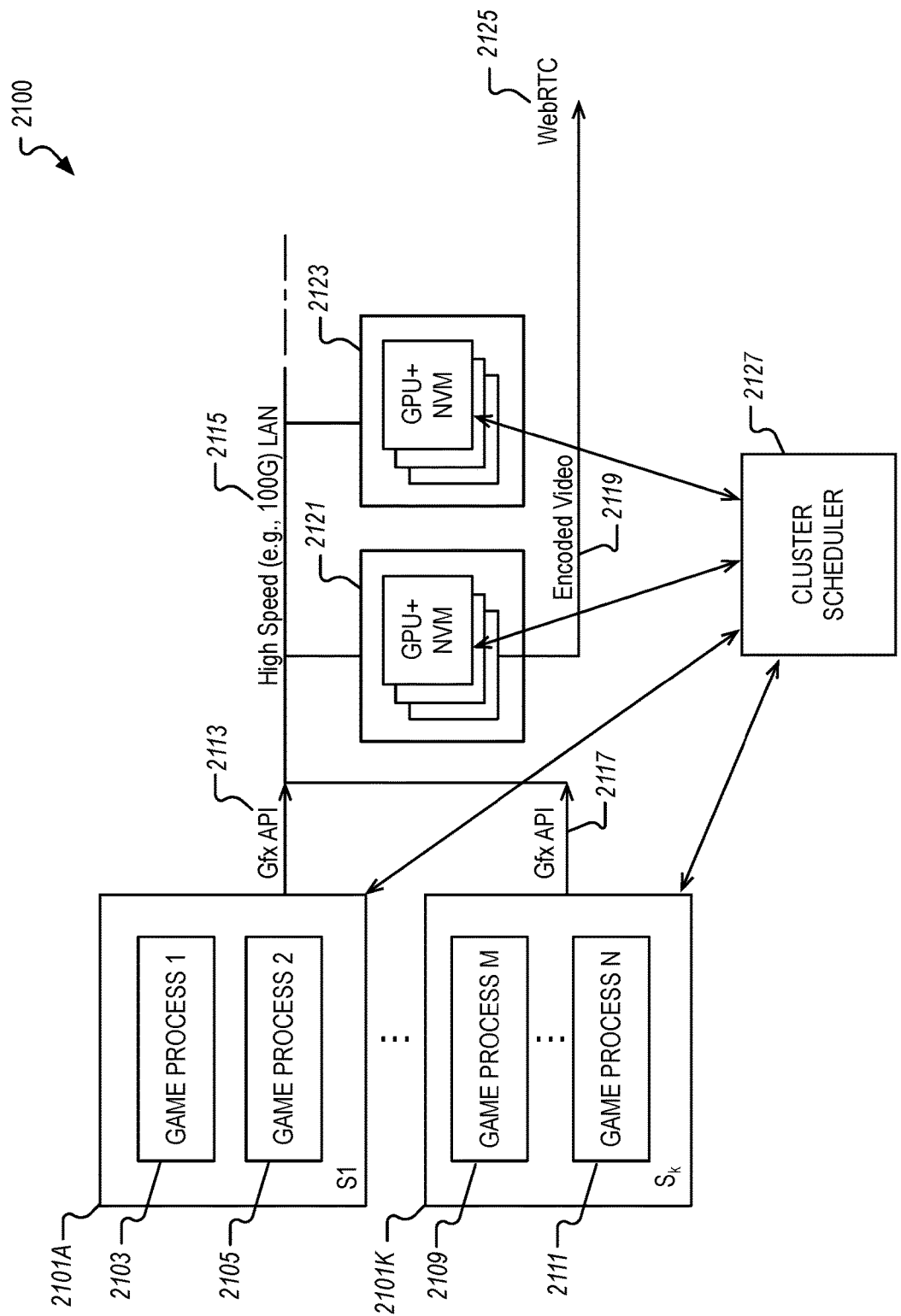
FIG. 21 illustrates a cloud gaming system to enable GPU sharing across multiple server devices.

FIG. 21 illustrates a cloud gaming system 2100 including GPU sharing across multiple server devices. GPU sharing illustrated in FIG. 20 can be extended beyond one server, which enables non-GPU servers 2101A-2101K to use network-attached GPUs 2121, 2123 within one data center. Commands (Gfx API 2113, 2117) from the non-GPU servers 2101A-2101K for hosted game processes (game process 2103, game process 2105, game process 2109, through game process 2111, etc.) can be streamed to the network-attached GPUs 2121, 2123. A cluster scheduler 2127 is used that has accurate knowledge of resources residing on each GPU 2121, 2123. The cluster scheduler performs real-time routing of draw commands (e.g., Gfx API 2113, 2117). Each frame can be rendered on a different GPU. For the generation of encoded video 2119 a single video encoding context can be shared across the GPU cluster. The encoded video 2119 can be encoded in a variety of formats described herein. GPU and video encoding performance can be adjusted dynamically based on WebRTC 2125 APIs.

Figure 22:
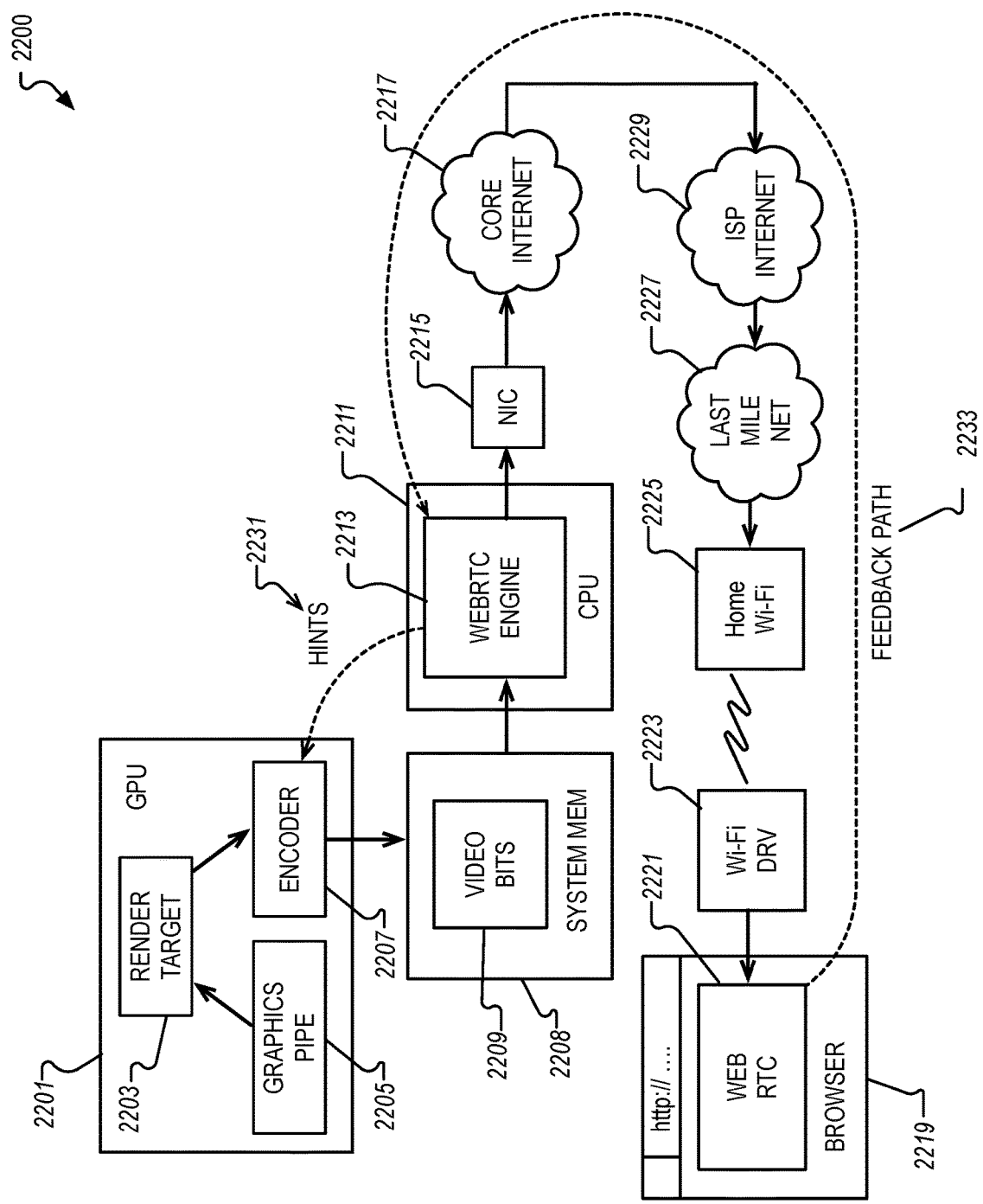
FIG. 22 illustrates a cloud gaming system including end-to-end path optimization.

FIG. 22 illustrates a cloud gaming system 2200 including end-to-end path optimization. In one embodiment, the cloud gaming system 2200 can make use of WebRTC (Real time Communications) can be used to enable end to end path optimization. WebRTC may be made available on all endpoints (thin clients, all browsers). Because networks are dynamically changing, it is important to enable a real-time response in the case of a critical network condition. The use of Wi-Fi as a last-meter delivery mechanism is the biggest culprit of network condition changes. Various options are available to use WebRTC to optimize cloud gaming solution.

In one embodiment, a GPU 2201 can include a render target 2203 to which a graphics pipeline 2205 writes frame data for a game. The data of the render target 2203 can be encoded by an encoder 2207 and written as video data bits 2209 to system memory 2208. A WebRTC engine 2213 executed by a CPU 2211 can provide hints 2231 back to the encoder 2207 to optimize the encoding process based on WebRTC network feedback processed by the WebRTC engine 2213. The encoded video bits 2209 can be transmitted via a network interface controller (NIC 2215) over the Internet (e.g., core Internet 2217) to the internet service provider (ISP) of the user (e.g., ISP Internet 2229). The data is then relayed over a last mile network 2227 to the home network (e.g., home Wi-Fi 2225). In the case of the use of a wireless network, wireless network data can be processed by the Wi-Fi driver 2223 on a client computing device, which may relay the data to a web browser 2219 that acts as a streaming client for the cloud gaming service. The web browser 2219 can include WebRTC 2221 logic that can provide network feedback over a feedback path 2233 to the WebRTC engine 2213.

In one embodiment, WebRTC network feedback is enhanced using signals from the Wi-Fi driver 2223. Additionally, reinforcement learning can be used to build a model of path to the home network of each client, such that each client receives streaming data over an optimized path. The use of Wi-Fi 6 may also help with predictability. Cloud gaming service logic can be added to access points to enhance the predictability and metrics gathering associated with those access points. Where 5G networks are in use, hooks may be added into the 5G control plane to implement quality of service techniques. Furthermore, the system can be configured to make use of network hints. Slice-based encoding and dynamic resolution changes can be used based on hints as to network health.

Figure 23:
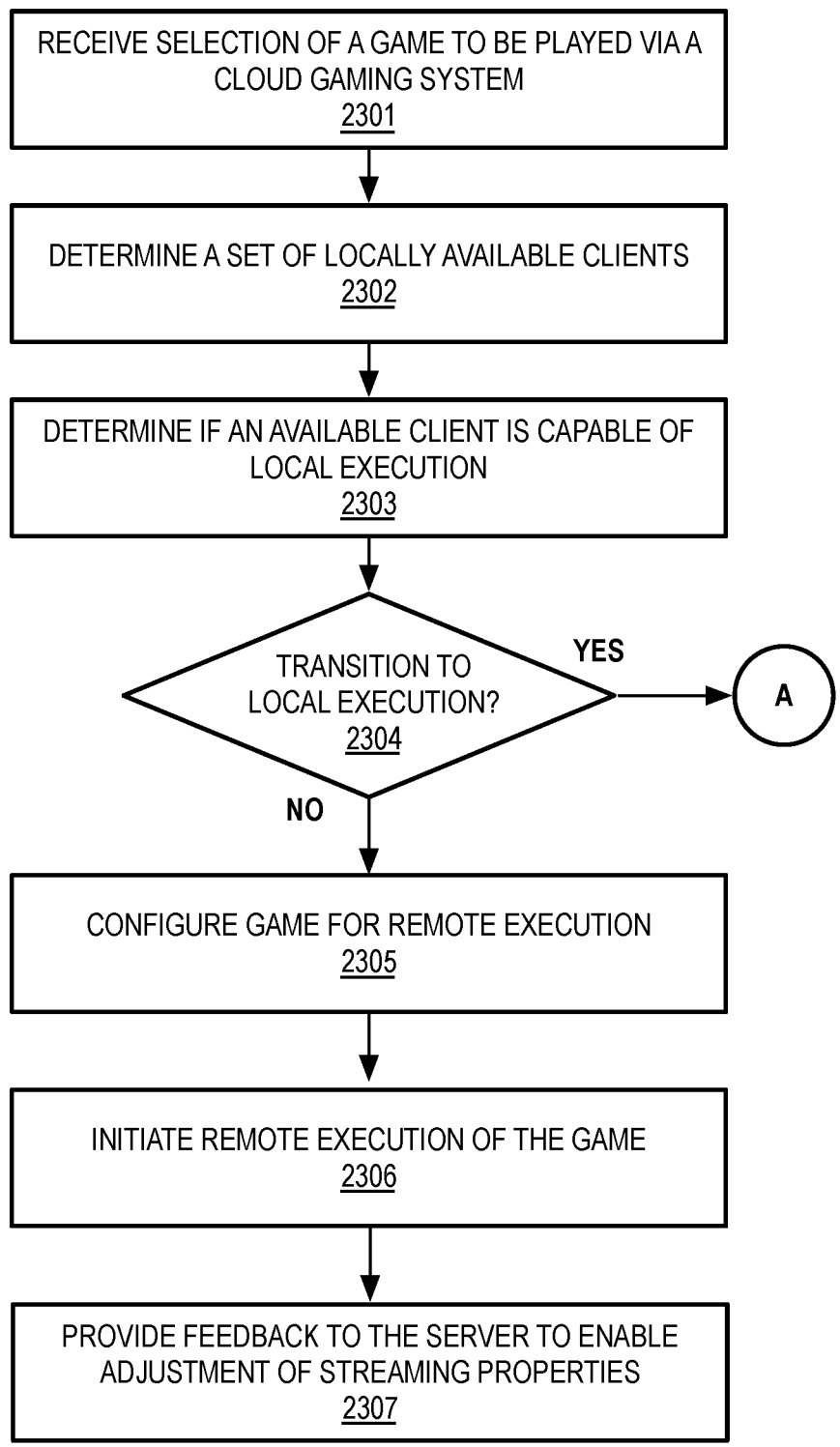
FIG. 23A-23B illustrate methods of configuring local or remote execution of a cloud-base game.
Figure 23B:
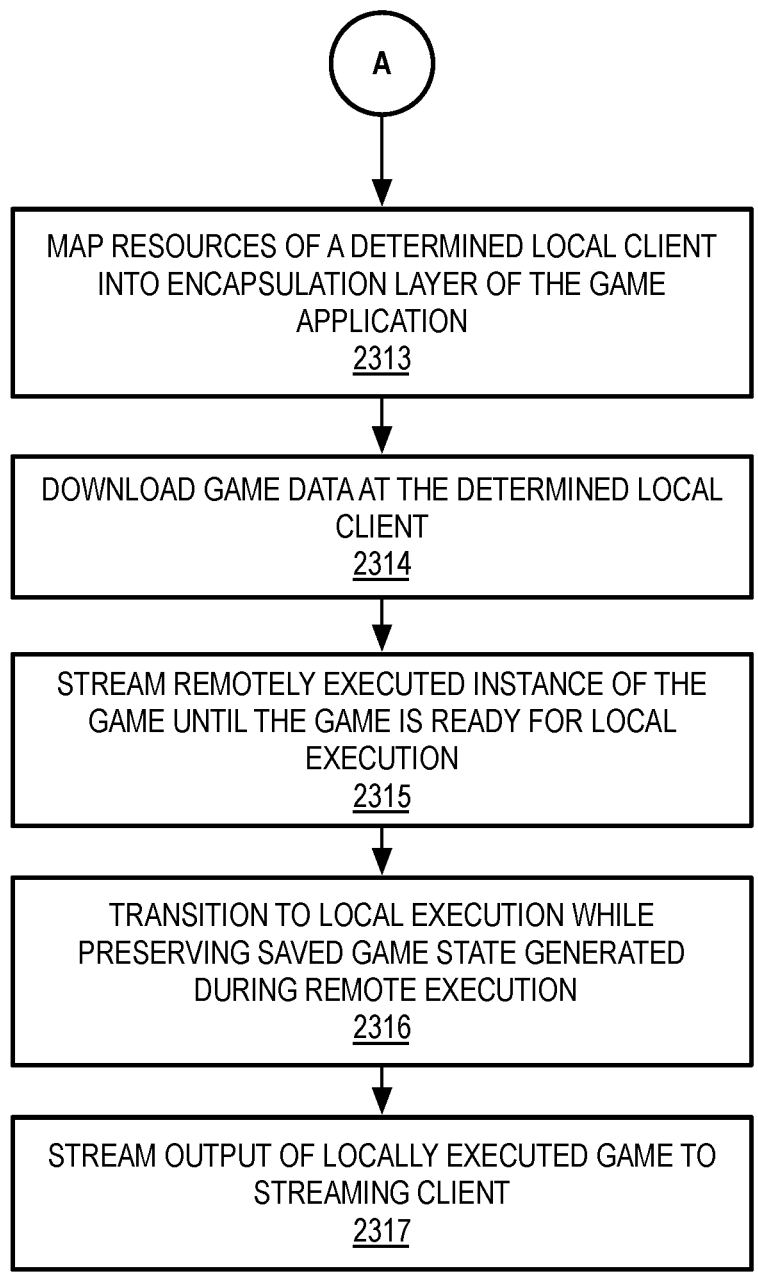

FIG. 23A-23B illustrate methods 2300, 2310 of configuring local or remote execution of a cloud-base game. FIG. 23A illustrates a method 2300 on a client device of performing remote execution of the cloud-based game. FIG. 23B illustrates a method 2310 on a client device of configuring local execution of the cloud-based game.

As shown in FIG. 23A, method 2300 includes an operation to receive selection of a game to be played via a cloud gaming system (block 2301). The selection can be received at a browser application or streaming client application and transmitted to the cloud gaming system via a network. The cloud gaming system, at the client or at a server device, can determine a set of locally available clients (block 2302). The set of locally available clients can be local clients that are registered with a user profile, such as a set of devices that have been previously used to connect to the cloud gaming system. The set of client devices may also include clients that are discoverable and accessible over a local network to the computing device from which the user is executing the game streaming client. The method 2300 additionally includes operations to determine whether a locally available client is capable of local execution. A locally available client may be considered capable of local execution if the client has a graphics processor having sufficient processing capability for the selected game and sufficient available storage for the game. If it is determined that a locally available client is capable of local execution (block 2303), the method 2300 can proceed to transition to local execution ("yes", 2304), which is detailed by method 2310 in FIG. 23B. Otherwise, the client can configure the game for remote execution (block 2305). The client can then initiate remote execution of the game (block 2306).

When remote execution is configured, the cloud gaming client can perform operations to cause the server to map selected client resources at the server through the encapsulation layer to enable the server to access any client-based resources that will be accessed by the server. Mapping selected client resources to the server enables, for example, audio input received at the client device and keyboard/mouse/controller input provided at the client device to relayed to the server. In one embodiment, network ports associated with the client device can be mapped to network ports on a remote server. Network output generated by the game, such as telemetry data for racing games, can be relayed to the cloud gaming client for consumption by software-based accessories that are configurable to display or perform operations based on the telemetry data. For games that make use of shared memory to output telemetry data, a memory buffer may be associated with the cloud gaming client and data within that buffer can be synchronized with a buffer on the remote server. The cloud gaming client can also perform operations to cause the server to cache selected client resources on the server, for example, if any client-based files are to be used by the server-based game application. For example, game configuration data stored on the client, such as key mapping or input device configuration, can be cached on the server and used to configure execution of the game. The cloud gaming client can then perform operations to launch the game on the server and stream output to the client application of the cloud gaming system.

During remote execution, the client can provide feedback to the server to enable adjustment of the streaming properties used by the server (block 2307). The feedback can be WebRTC network feedback as detailed in FIG. 22, including feedback from a Wi-Fi driver if the client is connected to the network via a wireless connection. Feedback can include metrics including but not limited to round trip latency and packet loss. As network latency increases, the server may take steps to reduce the amount of time required to render a frame. Adjustment of the streaming properties can include adjusting processor frequencies of the graphics processors that are assigned to execute the game application. Adjustment of streaming properties can also include dynamic adjustment of rendering settings for the game. Encoding properties for video encoding for game output may also be adjusted.

As shown in FIG. 23B, when local execution is enabled, the cloud gaming client can perform method 2310. Method 2310 includes for the client to map resources of a determined local client into the encapsulation layer of the game application (block 2313). Mapping client resources into the encapsulation layer includes operations to map server resources to the client to enable the client to access server-based resources, such as a file system container that includes the game server stack. For example, a hybrid file system 1900 as in FIG. 19 can be configured. The cloud gaming client can then perform operations to download game data at the determined local client (block 2314). This operation can include caching selected server resources on the client.

While the game data is being downloaded, the encapsulation layer for a different instance of the game can be configured to enable remote execution of the game. Remote gameplay can then begin immediately by streaming the remotely executed instance of the game until the game is ready for local execution (block 2315). Initially streaming the game can enable rapid startup of a game via remote execution while game assets are synced to the client device. Feedback (e.g., WebRTC, etc.) can be provided to the server during the initial remote execution stage. Once the game is ready for local execution, gameplay can transition to local execution while preserving saved game state that was generated during remote execution (block 2316). In one embodiment the transition can occur at the next launch of the game after local execution is ready. In one embodiment, some games can be configured for runtime transition from a remotely executed instance to the locally executed instance. For other games, a re-launch or exit and restart of the game is to be performed. Once the local transition is performed, output of the locally executed game can be streamed to a streaming client (block 2317), which may be on the same computing device in which the game is executed or a different streaming device on the same local network.

Additional Exemplary Computing Device

Figure 24:
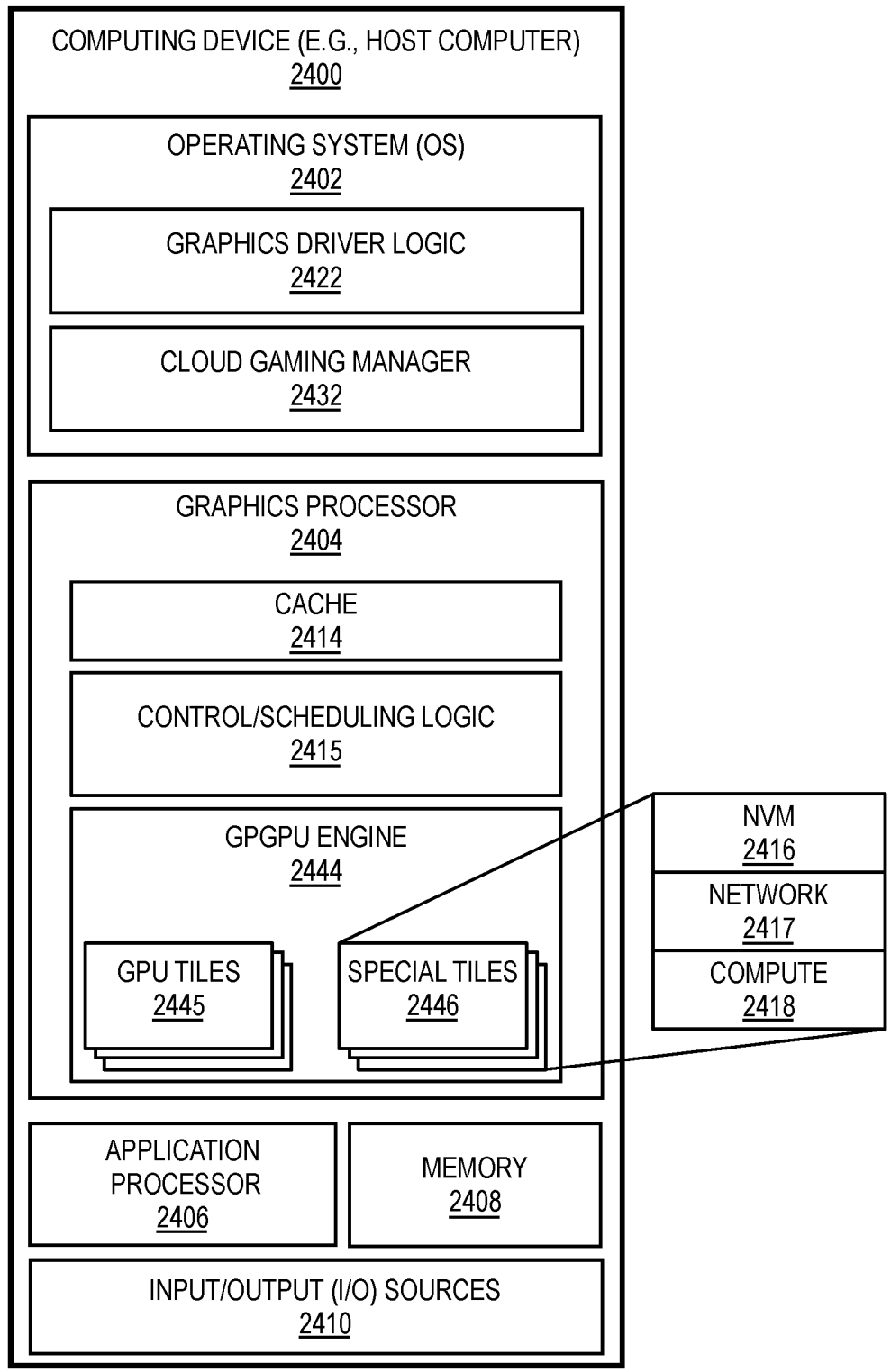
FIG. 24 is a block diagram of a computing device including a graphics processor, according to an embodiment.

FIG. 24 is a block diagram of a computing device 2400 including a graphics processor 2404, according to an embodiment. Versions of the computing device 2400 may be or be included within a communication device such as a set-top box (e.g., Internet-based cable television set-top boxes, etc.), global positioning system (GPS)-based devices, etc. The computing device 2400 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2400 includes a mobile computing device employing an integrated circuit ("IC"), such as system on a chip ("SoC" or "SOC"), integrating various hardware and/or software components of computing device 2400 on a single chip. The computing device 2400 can be a computing device that includes the processing system 100 as in of FIG. 1 and can be used as client and/or server elements of the cloud gaming system described herein.

The computing device 2400 includes a graphics processor 2404. The graphics processor 2404 represents any graphics processor described herein. In one embodiment, the graphics processor 2404 includes a cache 2414, which can be a single cache or divided into multiple segments of cache memory, including but not limited to any number of L1, L2, L3, or L4 caches, render caches, depth caches, sampler caches, and/or shader unit caches. In one embodiment the graphics processor 2404 also includes control and scheduling logic 2415. The control and scheduling logic 2415 can be firmware executed by a microcontroller within the graphics processor 2404. The graphics processor 2404 also includes a GPGPU engine 2444 that includes one or more graphics engine(s), graphics processor cores, and other graphics execution resources as described herein. Such graphics execution resources can be presented in the forms including but not limited to execution units, shader engines, fragment processors, vertex processors, streaming multiprocessors, graphics processor clusters, or any collection of computing resources suitable for the processing of graphics resources or image resources, or performing general purpose computational operations in a heterogeneous processor. The processing resources of the GPGPU engine 2444 can be included within multiple tiles of hardware logic connected to a substrate, as illustrated in FIG. 11B-11D. The GPGPU engine 2444 can include GPU tiles 2445 that include graphics processing and execution resources, caches, samplers, etc. The GPGPU engine 2444 can also include and one or more special tiles 2446 that include, for example, non-volatile memory 2416, network processing resources 2417, and/or general-purpose compute resources 2418.

As illustrated, in one embodiment, and in addition to the graphics processor 2404, the computing device 2400 may further include any number and type of hardware components and/or software components, including, but not limited to an application processor 2406, memory 2408, and input/output (I/O) sources 2410. The application processor 2406 can interact with a hardware graphics pipeline, as illustrated with reference to FIG. 3A, to share graphics pipeline functionality. Processed data is stored in a buffer in the hardware graphics pipeline and state information is stored in memory 2408. The resulting data can be transferred to a display controller for output via a display device, such as the display device 318 of FIG. 3A. The display device may be of various types, such as Cathode Ray Tube (CRT), Thin Film Transistor (TFT), Liquid Crystal Display (LCD), Organic Light Emitting Diode (OLED) array, etc., and may be configured to display information to a user via a graphical user interface.

The application processor 2406 can include one or processors, such as processor(s) 102 of FIG. 1 and may be the central processing unit (CPU) that is used at least in part to execute an operating system (OS) 2402 for the computing device 2400. The OS 2402 can serve as an interface between hardware and/or physical resources of the computing device 2400 and one or more users. The OS 2402 can include driver logic for various hardware devices in the computing device 2400. The driver logic can include graphics driver logic 2422, which can include the user mode graphics driver 1026 and/or kernel mode graphics driver 1029 of FIG. 10. The OS 2402 can also include a cloud gaming manager 2432, which may be an application, library, and/or framework that enables hybrid execution of cloud-based gaming applications.

It is contemplated that in some embodiments the graphics processor 2404 may exist as part of the application processor 2406 (such as part of a physical CPU package) in which case, at least a portion of the memory 2408 may be shared by the application processor 2406 and graphics processor 2404, although at least a portion of the memory 2408 may be exclusive to the graphics processor 2404, or the graphics processor 2404 may have a separate store of memory. The memory 2408 may comprise a pre-allocated region of a buffer (e.g., framebuffer); however, it should be understood by one of ordinary skill in the art that the embodiments are not so limited, and that any memory accessible to the lower graphics pipeline may be used. The memory 2408 may include various forms of random-access memory (RAM) (e.g., SDRAM, SRAM, etc.) comprising an application that makes use of the graphics processor 2404 to render a desktop or 3D graphics scene. A memory controller hub, such as memory controller 116 of FIG. 1, may access data in the memory 2408 and forward it to graphics processor 2404 for graphics pipeline processing. The memory 2408 may be made available to other components within the computing device 2400. For example, any data (e.g., input graphics data) received from various I/O sources 2410 of the computing device 2400 can be temporarily queued into memory 2408 prior to their being operated upon by one or more processor(s) (e.g., application processor 2406) in the implementation of a software program or application. Similarly, data that a software program determines should be sent from the computing device 2400 to an outside entity through one of the computing system interfaces, or stored into an internal storage element, is often temporarily queued in memory 2408 prior to its being transmitted or stored.

The I/O sources can include devices such as touchscreens, touch panels, touch pads, virtual or regular keyboards, virtual or regular mice, ports, connectors, network devices, or the like, and can attach via a platform controller hub 130 as referenced in FIG. 1. Additionally, the I/O sources 2410 may include one or more I/O devices that are implemented for transferring data to and/or from the computing device 2400 (e.g., a networking adapter); or, for a large-scale non-volatile storage within the computing device 2400 (e.g., hard disk drive). User input devices, including alphanumeric and other keys, may be used to communicate information and command selections to graphics processor 2404. Another type of user input device is cursor control, such as a mouse, a trackball, a touchscreen, a touchpad, or cursor direction keys to communicate direction information and command selections to GPU and to control cursor movement on the display device. Camera and microphone arrays of the computing device 2400 may be employed to observe gestures, record audio and video and to receive and transmit visual and audio commands.

I/O sources 2410 configured as network interfaces can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2400 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one, or a combination of one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of non-transitory machine-readable media suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Reference herein to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow can be performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used herein is for the purpose of describing particular embodiments only and is not intended to be limiting as to all embodiments. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Described herein is a cloud-based gaming system in which graphics processing operations of a cloud-based game can be performed on a client device. Client-based graphics processing can be enabled in response to a determination that the client includes a graphics processor having a performance that exceeds a minimum threshold. When a game is remotely executed and streamed to a client, the client is configurable to provide network feedback that can be used to adjust execution and/or encoding for the game.

One embodiment provides for a non-transitory machine-readable medium storing instructions to cause one or more processors of an electronic device to perform operations comprising determining one or more capabilities of a graphics processor of the electronic device, enabling local execution of at least a portion of graphics processing operations of a gaming application associated with a cloud-based gaming service in response to a determination that the one or more capabilities of the graphics processor exceed a threshold, retrieving at least a portion of a cloud-based game hosted by the cloud-based gaming service, and executing one or more graphics processing operations of the cloud-based game via the graphics processor of the electronic device. In one embodiment, the operations further comprise, while retrieving at least a portion of a cloud-based game hosted by the cloud-based gaming service, receiving an output stream of a remotely executed instance of the cloud-based game, the output stream adjusted based on a web-based real-time communication metrics.

One embodiment provides for a system comprising the non-transitory machine readable medium described above.

One embodiment provides for a method comprising mapping an application, via an encapsulation layer, for execution by processing resources selected from a set of processing resources including processing resources of a server device of a cloud gaming system and processing resources of a client device of the cloud gaming system, executing the application via the encapsulation layer on the processing resources mapped via the encapsulation layer, and streaming output of execution of the application to a client application of the cloud gaming system. The method further comprises importing the application into storage associated with a cloud gaming system and encapsulating the application into the encapsulation layer. The encapsulation layer can be configurable to enable selectable execution of the application by the server device of the cloud gaming system and a client device of the cloud gaming system. In one embodiment, an encapsulated application includes core logic and multiple encapsulations associated with an encapsulation layer. The encapsulation layer is configured to selectively relay API commands made by the core logic. The multiple encapsulations associated with the encapsulation layer include a file system encapsulation, an input device encapsulation, a graphics programming interface encapsulation, an audio device encapsulation, and a system interface encapsulation. Other types of encapsulations may also be performed. In one embodiment, mapping the application, via the encapsulation layer, includes mapping an encapsulation to a resource selected from a set of resources including a resource of a host device or a resource of a remote device.

In a further embodiment, the method comprises mapping an encapsulation layer of a first instance of the application for execution by a client of the cloud gaming system, initiating transfer of data associated with the first instance of the application to the client of the cloud gaming system, mapping an encapsulation layer of a second instance of the application for execution by a server of the cloud gaming system, and initiating execution of the second instance of the application on a server of the cloud gaming system. Streaming output of execution of the application to the client application of the cloud gaming system can include streaming output of the second instance of the application during transfer of data associated with the first instance of the application. The client device can provide network feedback to the server of the cloud gaming system during execution of the second instance of the application. In one embodiment, after completion of the transfer of data associated with the first instance of the application, initiating execution of the first instance of the application on the client of the cloud gaming system and streaming execution of the first instance of the application to the client application of the cloud gaming system. The first instance of the application can be executed on a first client of the cloud gaming system and the client application of the cloud gaming system can execute on a second client of the cloud gaming system.

One embodiment provides performed on an electronic device, where the method comprises determining one or more capabilities of a graphics processor of the electronic device, enabling local execution of at least a portion of graphics processing operations of a gaming application associated with a cloud-based gaming service in response to a determination that the one or more capabilities of the graphics processor exceed a threshold, retrieving at least a portion of a cloud-based game hosted by the cloud-based gaming service, and executing one or more graphics processing operations of the cloud-based game via the graphics processor of the electronic device. In a further embodiment, determining the one or more capabilities of the electronic device includes determining capabilities of the graphics processor of the client device and a network associated with the client device. Determining capabilities of the graphics processor of the client device includes determining an amount of memory associated with the graphics processor of the client device or determining a bandwidth associated with the memory. Determining the one or more capabilities of the graphics processor can also include determining a fill rate of the graphics processor. Determining capabilities of a network associated with the client device includes determining a network latency between the electronic device and a server of the cloud gaming system. Retrieving at least a portion of a cloud-based game hosted by the cloud-based gaming service includes mapping resources of a server of the cloud gaming system to the electronic device and caching selected resources of the server on the electronic device. The selected resources of the server of the cloud gaming system includes executable logic associated with a cloud-based game and one or more assets associated with the cloud-based game. The method can additionally comprise, while retrieving at least a portion of a cloud-based game hosted by the cloud-based gaming service, receiving an output stream of a remotely executed instance of the cloud-based game. After caching the selected resources of the server on the electronic device, execution of the cloud-based game can be transitioned from the remotely executed instance to a locally executed instance. In one embodiment, transitioning can from remote to local execution can be performed without exiting or restarting the cloud-based game.

One embodiment provides a method comprising determining to perform remote execution of a cloud-based game, determining a latency sensitivity of the cloud-based game, and based on the latency sensitivity, determining to execute the game using a remote execution resource selected from a set of remote execution resources, the remote execution resources including a cloud-based server and an edge server, wherein the cloud-based server is selected for a latency insensitive cloud-based game and the edge server is selected for a latency sensitive game. The method additionally includes receiving a stream of output of remote execution of the cloud-based game from the remote execution resource.

In various embodiments, determining a latency sensitivity of the cloud-based game includes determining a latency sensitivity category assigned to the cloud-based game. Furthermore, determining to perform remote execution of the cloud-based game can include determining to execute at least a portion of graphics processing operations for the cloud-based game on a client computing device, mapping a container containing resources of the cloud-based game to a file system of the client computing device, and transferring resources within the container to the client computing device. The method further includes, while transferring the resources within the container, executing at least a portion of the graphics processing operations for the cloud-based game at the cloud-based server or the edge server and streaming output of the graphics processing operations executed at the cloud-based server or the edge server to the client device. Executing at least a portion of the graphics processing operations for the cloud-based game at the cloud-based server or the edge server can include mapping resources on the client computing device to the cloud-based server or the edge server. The mapped resources on the client device can include data that is specific to the cloud-based game.

One embodiment provides a non-transitory machine-readable medium storing instructions to cause one or more processors of an electronic device to perform a method as described herein.

One embodiment provides a system comprising one or more processors including a graphics processor and a memory device that stores instructions to perform a method as described herein.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A method comprising:
   mapping an application, via an encapsulation layer, for execution by processing resources selected from a set of processing resources including processing resources of a server device of a cloud gaming system and processing resources of a client device of the cloud gaming system;
   executing the application via the encapsulation layer on the processing resources mapped via the encapsulation layer; and
   streaming output of execution of the application to a client application of the cloud gaming system.

2. The method as in claim 1, further comprising:
   importing the application into storage associated with a cloud gaming system; and
   encapsulating the application into the encapsulation layer, the encapsulation layer configurable to enable selectable execution of the application by the server device of the cloud gaming system and a client device of the cloud gaming system.

3. The method as in claim 1, wherein an encapsulated application includes core logic and multiple encapsulations associated with an encapsulation layer and wherein the encapsulation layer is configured to selectively relay API commands made by the core logic.

4. The method as in claim 3, wherein the multiple encapsulations associated with the encapsulation layer include a file system encapsulation, an input device encapsulation, a graphics programming interface encapsulation, an audio device encapsulation, and a system interface encapsulation.

5. The method as in claim 1, wherein mapping the application, via the encapsulation layer, includes mapping an encapsulation to a resource selected from a set of resources including a resource of a host device or a resource of a remote device.

6. The method as in claim 1, further comprising:
   mapping an encapsulation layer of a first instance of the application for execution by a client of the cloud gaming system;
   initiating transfer of data associated with the first instance of the application to the client of the cloud gaming system;
   mapping an encapsulation layer of a second instance of the application for execution by a server of the cloud gaming system; and
   initiating execution of the second instance of the application on a server of the cloud gaming system.

7. The method as in claim 6, wherein streaming output of execution of the application to the client application of the cloud gaming system includes streaming output of the second instance of the application during transfer of data associated with the first instance of the application.

8. The method as in claim 6, further comprising providing network feedback to the server of the cloud gaming system during execution of the second instance of the application.

9. The method as in claim 6, further comprising:
   after completion of the transfer of data associated with the first instance of the application, initiating execution of the first instance of the application on the client of the cloud gaming system; and
   streaming execution of the first instance of the application to the client application of the cloud gaming system.

10. The method as in claim 9, wherein the first instance of the application is executed on a first client of the cloud gaming system and the client application of the cloud gaming system executes on a second client of the cloud gaming system.

11. A non-transitory machine-readable medium storing instructions which, when executed by one or more processors, cause the one or more processors to perform operations comprising:
    mapping an application, via an encapsulation layer, for execution by processing resources selected from a set of processing resources including processing resources of a server device of a cloud gaming system and processing resources of a client device of the cloud gaming system;
    executing the application via the encapsulation layer on the processing resources mapped via the encapsulation layer; and
    streaming output of execution of the application to a client application of the cloud gaming system.

12. The non-transitory machine-readable medium as in claim 11, wherein an encapsulated application includes core logic and multiple encapsulations associated with an encapsulation layer, wherein the encapsulation layer is configured to selectively relay API commands made by the core logic, and wherein the multiple encapsulations associated with the encapsulation layer include a file system encapsulation, an input device encapsulation, a graphics programming interface encapsulation, an audio device encapsulation, and a system interface encapsulation.

13. The non-transitory machine-readable medium as in claim 11, wherein mapping the application, via the encapsulation layer, includes mapping an encapsulation to a resource selected from a set of resources including a resource of a host device or a resource of a remote device.

14. The non-transitory machine-readable medium as in claim 11, the operations further comprising:
    mapping an encapsulation layer of a first instance of the application for execution by a client of the cloud gaming system;
    initiating transfer of data associated with the first instance of the application to the client of the cloud gaming system;
    mapping an encapsulation layer of a second instance of the application for execution by a server of the cloud gaming system;
    initiating execution of the second instance of the application on a server of the cloud gaming system, wherein streaming output of execution of the application to the client application of the cloud gaming system includes streaming output of the second instance of the application during transfer of data associated with the first instance of the application;
    after completion of the transfer of data associated with the first instance of the application, initiating execution of the first instance of the application on the client of the cloud gaming system; and streaming execution of the first instance of the application to the client application of the cloud gaming system.

15. The non-transitory machine-readable medium as in claim 14, the operations further comprising providing network feedback to the server of the cloud gaming system during execution of the second instance of the application.

16. The non-transitory machine-readable medium as in claim 14, wherein the first instance of the application is executed on a first client of the cloud gaming system and the client application of the cloud gaming system executes on a second client of the cloud gaming system.

17. A data processing system comprising:
a memory device;
one or more processors to execute instructions from the memory device to cause the one or more processors to:
map an application, via an encapsulation layer, for execution by processing resources selected from a set of processing resources including processing resources of a server device of a cloud gaming system and processing resources of a client device of the cloud gaming system;
execute the application via the encapsulation layer on the processing resources mapped via the encapsulation layer; and
stream output of execution of the application to a client application of the cloud gaming system.

18. The data processing system as in claim 17, wherein an encapsulated application includes core logic and multiple encapsulations associated with an encapsulation layer, wherein the encapsulation layer is configured to selectively relay API commands made by the core logic, and wherein the multiple encapsulations associated with the encapsulation layer include a file system encapsulation, an input device encapsulation, a graphics programming interface encapsulation, an audio device encapsulation, and a system interface encapsulation.

19. The data processing system as in claim 17, wherein to map the application, via the encapsulation layer, includes to map an encapsulation to a resource selected from a set of resources including a resource of a host device or a resource of a remote device.

20. The data processing system as in claim 17, wherein the one or more processors are further to:
map an encapsulation layer of a first instance of the application for execution by a client of the cloud gaming system;
initiate transfer of data associated with the first instance of the application to the client of the cloud gaming system;
map an encapsulation layer of a second instance of the application for execution by a server of the cloud gaming system;
initiate execution of the second instance of the application on a server of the cloud gaming system, wherein to stream output of execution of the application to the client application of the cloud gaming system includes to stream output of the second instance of the application during transfer of data associated with the first instance of the application;
after completion of the transfer of data associated with the first instance of the application, initiate execution of the first instance of the application on the client of the cloud gaming system; and
stream execution of the first instance of the application to the client application of the cloud gaming system.

* * * * *